United States Patent [19]

Reuther et al.

[11] Patent Number: 5,287,534
[45] Date of Patent: Feb. 15, 1994

[54] CORRECTING CROSSOVER DISTORTION PRODUCED WHEN ANALOG SIGNAL THRESHOLDS ARE USED TO REMOVE NOISE FROM SIGNAL

[75] Inventors: Thomas Reuther, Palo Alto, Calif.; Neil Bloomberg, Bowie; William J. Gist, Jr., Merrimack; Albra M. Welch, Bedford, both of N.H.

[73] Assignee: Digital Equipment Corporation, Maynard, Mass.

[21] Appl. No.: 775,681

[22] Filed: Nov. 8, 1991

Related U.S. Application Data

[60] Division of Ser. No. 650,457, Feb. 4, 1991, abandoned, which is a continuation of Ser. No. 461,122, Jan. 4, 1990, abandoned.

[51] Int. Cl.$^5$ .................................... H03M 1/00
[52] U.S. Cl. .................................... 395/800; 307/443
[58] Field of Search ............... 395/800; 328/162, 163, 328/165; 307/443, 542, 555

[56] References Cited

U.S. PATENT DOCUMENTS

| | | | |
|---|---|---|---|
| 3,585,507 | 6/1971 | Bickel | 328/116 |
| 3,742,202 | 6/1973 | Spreitzhofer | 235/183 |
| 3,760,282 | 9/1973 | Arnold et al. | 328/116 |

(List continued on next page.)

OTHER PUBLICATIONS

US Patent Application Serial No. 07/280,149 of Robert A. Curtis, Filed Dec. 5, 1988.
Data Sheet for National DP8344 Bi-Phase Communications Processor (BCP), National Semiconductor, Santa Clara, Calif.
IBM 3174/3274 Control Unit to Device Product Attachment Information handbook, International Business Machines Corporation, Armonk, N.Y.
DHU11 Interface Technical Manual, 2nd Edition, Nov., 1986, Document No. EK-DHU11-TM-002, Digital Equipment Corporation, Maynard, Mass.
Avatar RPA2000, Sales Brochure, Avatar Technologies Inc., Hopkinton, Mass., 1985.
Adacom CP-101, Sales Brochure, Adacom Corporation, Olathe, Kans., 1985.
Local Data VersaLynx channel card, Sales Brochure, Local Data Incorporated, Torrance, Calif., 1986.
Black Box C/A-1, Sales Brochure, Black Box Corporation, Pittsburgh, Pa., 1986.
IBM 3174 Asynchronous Emulation Adapter, Sales Brochure, International Business Machines Corporation, Armonk, N.Y.
LocalData InterLynx channel card, Sales Brochure, Local Data Incorporated, Torrance, Calif., 1985.
PCI 276, Sales Brochure, PCI Incorporated, Jan., 1986.

Primary Examiner—Parshotam S. Lall
Assistant Examiner—William M. Treat
Attorney, Agent, or Firm—Fish & Richardson

[57] ABSTRACT

Apparatus for coupling and decoupling a data terminal to a computer system of the kind that continues to interact with a device only while the computer system detects interaction by the device. The apparatus includes switching circuitry for connection between the data terminal and the computer system; the switching circuitry has a first mode in which a path is provided for interaction between the data terminal and the computer system, and a second mode in which the path is disabled and the data terminal may engage in other activities. The apparatus also includes communication circuitry, responsive to the switching circuitry, for interacting with the computer system at times when the path is disabled, in order to cause the computer system to continue to interact with the communication circuitry during those times and then to be immediately available for interaction with the data terminal when the path is again provided. In other aspects, multiple data terminals are served simultaneously from a single bi-phase communications processor of the kind having a RISC processor containing an integral coax interface, and crossover distortion is removed in the course of deriving a processed digital signal from positive and negative digital signal sample components that were formed by positive and negative threshold comparisons and which appear at a given sampling clock rate.

2 Claims, 57 Drawing Sheets

U.S. PATENT DOCUMENTS

| | | | |
|---|---|---|---|
| 3,890,471 | 6/1975 | Hachenburg | 370/85.14 |
| 3,939,432 | 2/1976 | Nelson | 328/13 |
| 4,035,733 | 7/1977 | Morrow et al. | 328/34 |
| 4,075,656 | 2/1978 | Beaulier | 358/13 |
| 4,159,470 | 6/1979 | Strojny et al. | 371/8.2 |
| 4,161,700 | 7/1979 | Fujikata et al. | 328/147 |
| 4,305,150 | 12/1981 | Richmond et al. | 371/6 |
| 4,306,194 | 12/1981 | Chapman | 328/150 |
| 4,339,823 | 7/1982 | Predina et al. | 375/20 |
| 4,347,498 | 8/1982 | Lee et al. | 340/825.02 |
| 4,398,154 | 8/1983 | Lee | 328/58 |
| 4,531,238 | 7/1985 | Rawson et al. | 359/178 |
| 4,536,740 | 8/1985 | Vinding | 340/347 DD |
| 4,588,905 | 5/1986 | Kojima | 307/269 |
| 4,697,098 | 9/1987 | Cloke | 307/354 |
| 4,731,878 | 3/1988 | Vaidya | 359/165 |
| 4,747,040 | 5/1988 | Blanset et al. | 395/650 |
| 4,771,188 | 9/1988 | Cheng et al. | 307/351 |
| 4,789,838 | 12/1988 | Cheng | 328/150 |
| 4,797,879 | 1/1989 | Habbab et al. | 359/123 |
| 4,819,080 | 4/1989 | Cucchietti et al. | 324/83 R |
| 4,823,122 | 4/1989 | Mann et al. | 340/825.28 |
| 4,835,486 | 5/1989 | Somerville | 330/10 |
| 4,837,704 | 6/1989 | Lengefeld | 364/478 |
| 4,882,547 | 11/1989 | Katz | 330/149 |
| 5,003,556 | 3/1991 | Curtis et al. | 375/104 |
| 5,023,892 | 6/1991 | Stoica | 375/118 |
| 5,045,728 | 9/1991 | Crafts | 307/443 |
| 5,055,706 | 10/1991 | Nakai et al. | 307/443 |

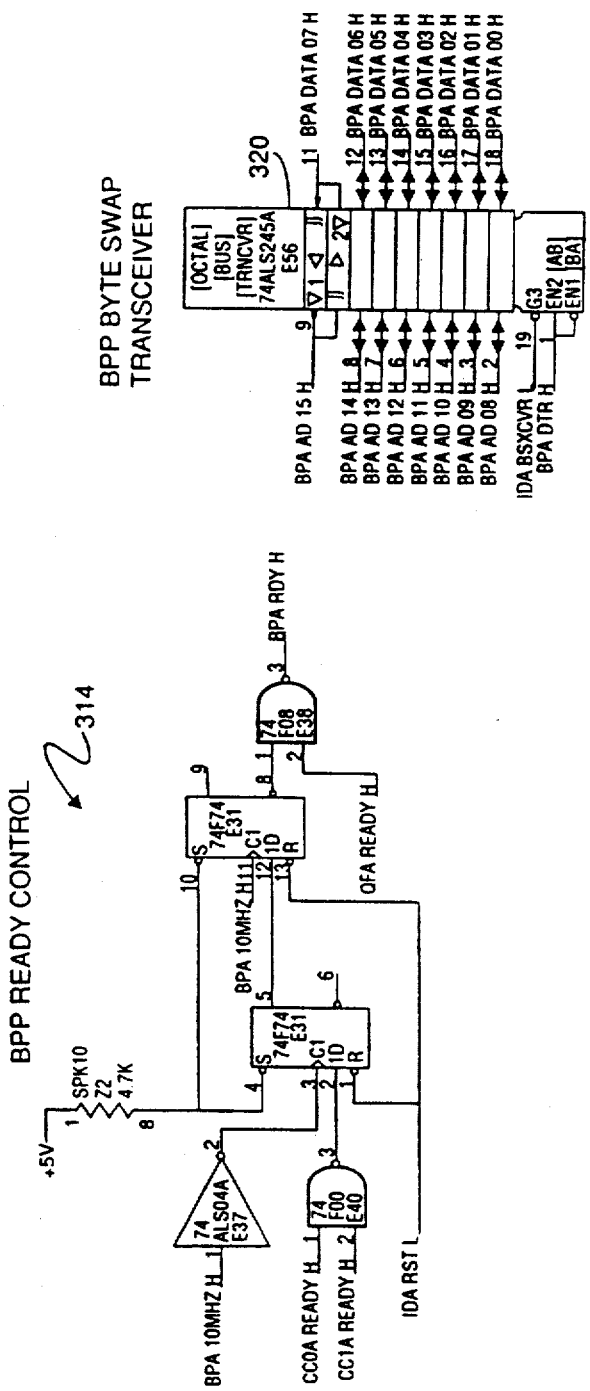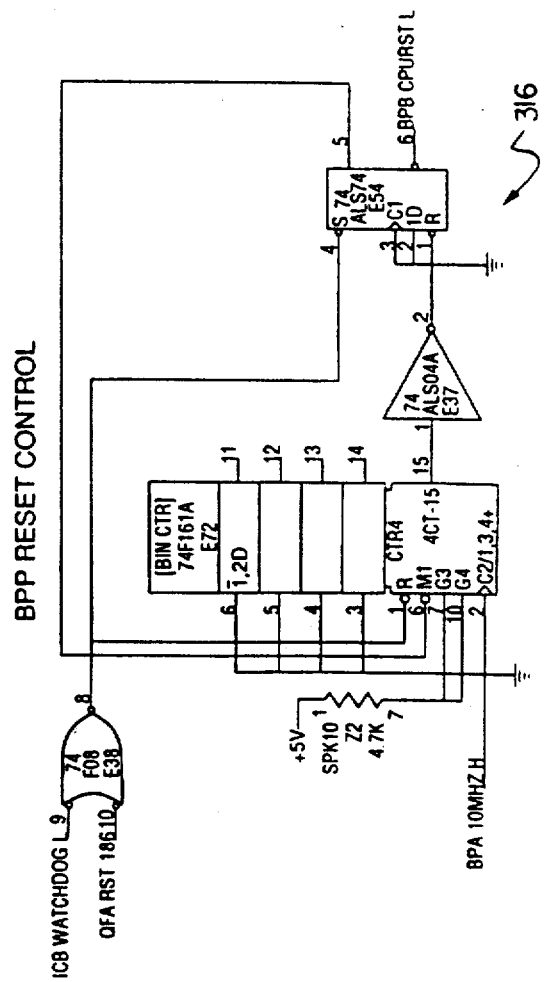
FIG. 8B

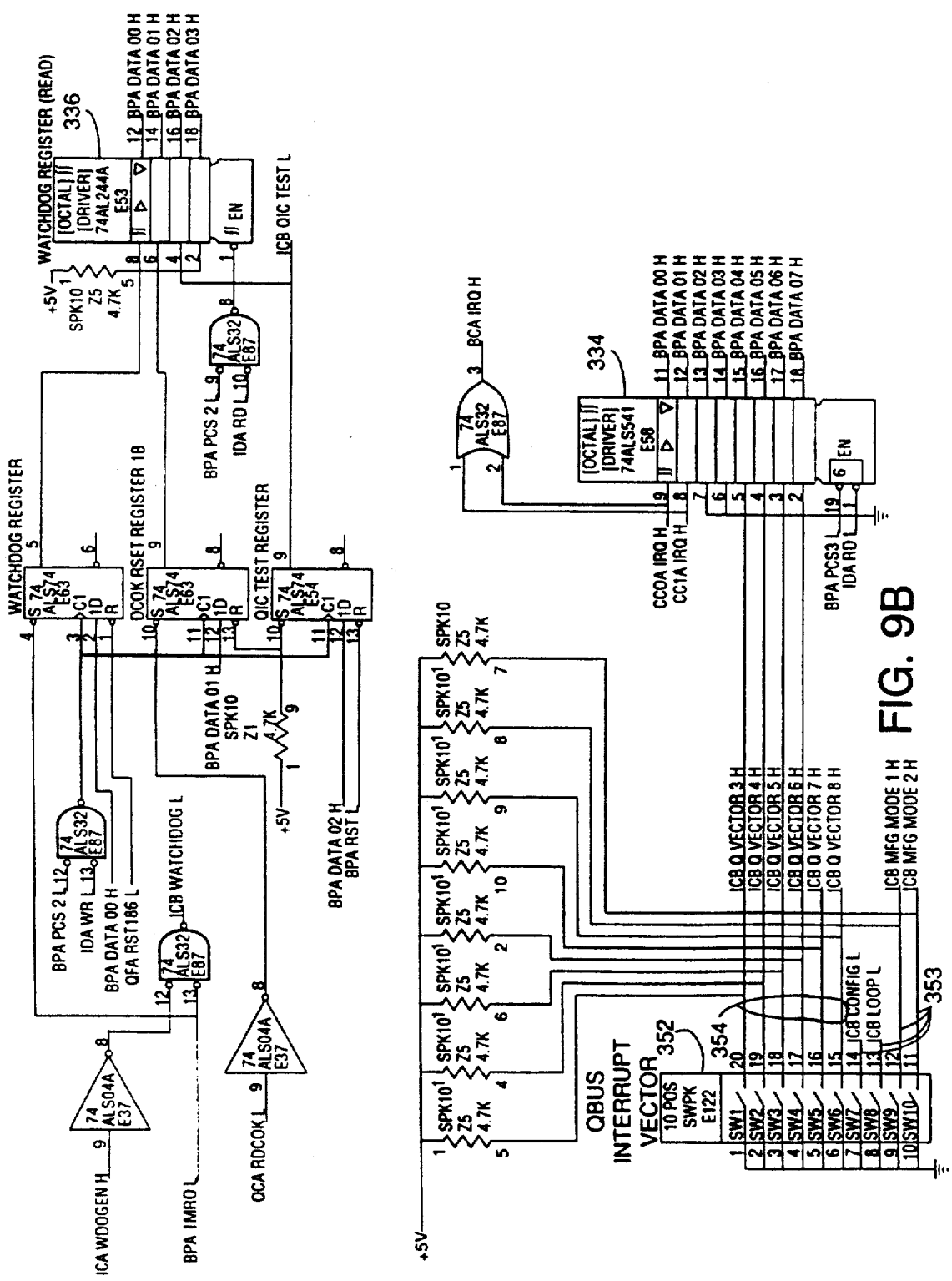

| Table 1: Hot-Key to VT Mode without CCU Session Screen Memory Refresh | | | |
|---|---|---|---|
| TC BCP Passthrough Switcher | Command Processor in the BPP (80186) | CC BCP Passthrough Switcher | Notes |
| | | detects Hot-Key sequence | 500 |
| | | waits for terminal's response to the next poll | 510 |
| | | opens Passthrough switch | 512 |
| | | issues commmand to BPP to wake-up the TC BCP Passthrough Switcher | 514 |
| | | puts CCU Session Listener to sleep and wakes up the CCU Session Responder | 516 |
| | responds to the command by changing the dispatch delay timer value in TC BCP memory | | 518 |
| signals for VT Terminal Emulator to clear VT Mode screen contents | | | 520 |
| releases control to VT Terminal Emulator | | | 522 |

FIG. 14

| Table 2: Hot-Key to VT Mode without CCU Session Screen Memory Refresh | | | |
|---|---|---|---|
| TC BCP Passthrough Switcher | Command Processor in the BPP (80186) | CC BCP Passthrough Switcher | Notes |
| | | detects Hot-Key sequence —530 | |
| | | waits for terminal's response to the next poll —532 | |
| | | opens Passthrough switch —534 | |
| | | clears CUNEWS flag on CC ZPAGE —536 | At this point a race starts. If the CCU changes the terminal screen contents, the change is not reflected on the screen of the terminal. Such a change would instead be reflected in CC BCP screen memory and might therefore get clobbered because that memory is being refreshed. |
| | | issues command to the BPP to tell the TC BCP to refresh CCU Session screen memory. —538 | |
| | responds to the command by setting a flag in TC BCP memory —540 | | |

FIG. 15A-1

| Table 2 (cont.): Hot-Key to VT Mode with CCU Session Screen Memory Refresh | | | |
|---|---|---|---|
| TC BCP Passthrough Switcher | Command Processor in the BPP (80186) | CC BCP Passthrough Switcher | Notes |
| | | issues command to BPP to wake-up the TC BCP —542 | |
| | | puts CCU Session Listener to sleep and wakes up the CCU Session Responder —544 | |
| | responds to the commmand by changing the dispatch delay timer value in TC BCP memory. —546 | | |
| reads address counter from terminal —548 | | | |
| issues command to BPP to transfer address counter value to CC BCP memory —550 | | | |
| | responds to the commmand by moving the specified memory contents to CC BCP memory —552 | | |
| reads contents of terminal screen into TC screen buffer —554 | | | |
| issues command to BPP to transfer screen buffer contents from TC screen buffer to CC screen buffer —556 | | | |

FIG. 15A-2

Table 2 (cont.): Hot-Key to VT Mode with CCU Session Screen Memory Refresh

| TC BCP Passthrough Switcher | Command Processor in the BPP (80186) | CC BCP Passthrough Switcher | Notes |
|---|---|---|---|
| | responds to the command by moving the specified memory contents ─558 | | |
| reads EAB contents into ─560 TC EAB buffer | | | This step not needed if terminal has no EAB. |
| issues commmand to BPP to transfer EAB ─562 buffer contents from TC EAB buffer to CC EAB buffer | | | This step not needed if terminal has no EAB. |
| | responds to the command by moving the ─564 specified memory contents | | This step not needed if terminal has no EAB.<br><br>At this point the aforementioned race is over. The contents of the screen have been moved into buffers in CC memory. If CUNEWS still says "nothing new" then we are OK. |
| issues command to BPP to copy ─566 CUNEWS from CC ZPAGE in CC memory to TC ZPAGE in TC memory | | | |
| | responds to the ─568 command by moving the specified byte | | |

FIG. 15B-1

| Table 2 (cont.): Hot-Key to VT Mode with CCU Session Screen Memory Refresh | | | |
|---|---|---|---|
| TC BCP Passthrough Switcher | Command Processor in the BPP (80186) | CC BCP Passthrough Switcher | Notes |
| signals for VT Terminal Emulator to clear VT Mode screen contents and VT Mode screen memory in TC BCP. —570 | | | |
| | checks CUNEWS. If CCU has changed screen contents since the passthrough switch was opened, then signal for VT Terminal Emulator to start in Control Screen with "3270 Mode screen image memory is obsolete, POR may be needed" message —572 | | |
| releases control to VT Terminal Emulator —574 | | | |

FIG. 15B-2

| Table 3: Hot-Key to 3270 Mode without POR | | | |
|---|---|---|---|
| TC BCP Passthrough Switcher | Command Processor in the BPP (80186) | CC BCP Passthrough Switcher | Notes |
| | | | This is the normal switch to 3270 Mode. The 3270 mode session screen contents must be transferred from CC BCP screen memory onto the terminal screen. |
| detects Hot-Key sequence, or exit from Control Screen to "3270 Mode, Do Not Send POR" | | | |
| | | | If the screen refresh must be retried, the steps following this point are repeated. |
| issues command to BPP to clear CUNEWS flag on CC ZPAGE in CC memory | | | |
| | responds to the command by changing the specified byte on the CC ZPAGE | | At this point a race starts. If the CCU changes screen memory contents, we can not be sure that the change will be reflected on the terminal's screen. |

FIG. 16A-1

| Table 3 (cont.): Hot-Key to 3270 Mode without POR | | | |
|---|---|---|---|
| TC BCP Passthrough Switcher | Command Processor in the BPP (80186) | CC BCP Passthrough Switcher | Notes |
| issues commmand to BPP to read from CC memory into TC memory some CCU Session screen parameters, e.g., cursor address | | | |
| | responds to the command by performing the specified transfer | | |
| issues command to BPP to read the contents of the CC screen buffer into the TC screen buffer | | | |
| | responds to the command by performing the specified transfer | | |
| issues command to BPP to read the contents of the CC EAB buffer into the TC EAB buffer | | | This step not needed if terminal has no EAB |
| | responds to the command by performing the specified transfer. | | This step not needed if terminal has no EAB |
| writes the screen buffer contents, and if necessary, the EAB buffer contents, to the terminal | | | |

FIG. 16A-2

| Table 3 (cont.): Hot-Key to 3270 Mode without POR | | | |
|---|---|---|---|
| TC BCP Passthrough Switcher | Command Processor in the BPP (80186) | CC BCP Passthrough Switcher | Notes |
| issues command to BPP to reset the CCU inactivity timer on the CC ZPAGE —600 | | | |
| | responds to the command by modifying the specified byte on the CC ZPAGE —602 | | |
| modifies its dispatch timer value on the TC ZPAGE so that when it issues the next command to the BPP, it will also be putting itself to sleep —604 | | | |
| issues command to BPP to tell CC Passthrough Switcher to enter 3270 Mode —606 | | | |
| | responds to the command by modifying the specified byte on the CC ZPAGE —608 | | |
| | | signals CCU Session Responder to close the passthrough switch —610 | |

FIG. 16B-1

| Table 3 (cont.): Hot-Key to 3270 Mode without POR | | | |
|---|---|---|---|
| TC BCP Passthrough Switcher | Command Processor in the BPP (80186) | CC BCP Passthrough Switcher | Notes |
| | | CCU Session Responder closes the passthrough switch immediately after transmitting the TTAR in response to the next poll command from the CCU —612 | |
| | | CCU Session Responder signals the CC Passthrough Switcher that the passthrough switch is closed —614 | |
| | | | At this point the aformentioned race is over. The passthrough switch is closed and any changes that the CCU now makes to the screen will actually be visible on the terminal's screen. |
| | | CC Passthrough Switcher checks CUNEWS: —616 | |

FIG. 16B-2

| Table 3 (cont.): Hot-Key to 3270 Mode without POR | | | |
|---|---|---|---|
| TC BCP Passthrough Switcher | Command Processor in the BPP (80186) | CC BCP Passthrough Switcher | Notes |
| | | If no screen updates were missed, then put the CCU Session Responder to sleep and wake-up the CCU Session Listener. 3270 Mode has been entered successfully. —618 | |
| | | If the screen contents are obsolete signal for the TC Passthrough Switcher to retry painting the terminal screen. Three retry attempts are allows. —620 | |
| | | If no more retries allowed, signal for the VT Terminal Emulator to display the Control Screen with the message "3270 Mode screen image is obsolete, POR may be needed" enter VT Mode. —622 | |

FIG. 16B-3

Table 4: Hot-Key to 3270 Mode with POR

| TC BCP Passthrough Switcher | Command Processor in the BPP (80186) | CC BCP Passthrough Switcher | Notes |
|---|---|---|---|
| | | | This switch to 3270 Mode is used when it is necessary to (re)initialize the 3270 Mode session. In this case it is not necessary to restore the 3270 Mode session screen contents. |
| detects exit from Control Screen to "3270 Mode send POR" —630 | | | |
| issues command to BPP to inform the CC Passthrough Switcher to expect a POR from the terminal —632 | | | |
| | responds to the command by modifying the specified byte on the CC ZPAGE —634 | | |
| clears the terminal screen —636 | | | |
| writes "Please wait" on the screen —638 | | | |
| sends Reset command to the teminal —640 | | | |
| issues command to BPP to clear the CCU inactivity timer on the CC ZPAGE —642 | | | |

FIG. 17-1

| Table 4 (cont.): Hot-Key to 3270 Mode with POR | | | |
|---|---|---|---|
| TC BCP Passthrough Switcher | Command Processor in the BPP (80186) | CC BCP Passthrough Switcher | Notes |
| | responds to the command by modifying the specified byte on the CC ZPAGE  —644 | | |
| modifies its dispatch timer value on the TC ZPAGE so that when it issues the next command to the BPP it will also be putting itself to sleep  —646 | | | |
| issues command to BPP to tell CC Passthrough Switcher to enter 3270 Mode  —648 | | | |
| | responds to the command by modifying the specified byte on the CC ZPAGE  —650 | | |
| | | closes the passthrough switch  —662 | |
| | | puts the CCU Session Responder to sleep and wakes up the CCU Session Listener  —664 | |

FIG. 17-2

CORRECTING CROSSOVER DISTORTION PRODUCED WHEN ANALOG SIGNAL THRESHOLDS ARE USED TO REMOVE NOISE FROM SIGNAL

This is a divisional of application Ser. No. 07/650,457, filed Feb. 2, 1991, now abandoned, which is a continuation of application Ser. No. 07/461,122, filed Jan. 4, 1990, now abandoned.

BACKGROUND OF THE INVENTION

This invention relates to interfacing terminals and computer systems.

Recently, the cost and size of computer hardware has been dramatically reduced, leading to the widespread use of large and complex interconnected networks of computers. In such networks, incompatible communication protocols may be used by different vendors for terminal-to-computer and computer-to-computer communications.

The incompatibility of protocols is particularly apparent when updating computing hardware and changing from one vendor to another (and one protocol to another). For example, consider a system including a mainframe and terminals manufactured by a first vendor. Ideally, if the system's managers wished to change hardware vendors, they would first purchase a new mainframe from the second vendor, and simply plug the new mainframe into the existing system. Thereafter, the existing terminals (from the first vendor) would be used with either the new or old mainframes. After the users were accustomed to the new mainframe, the old mainframe could be removed from the network, and new terminals (from the second vendor) could be purchased and used with the new mainframe.

During the transition period, it would be desirable to use existing terminals to access both mainframes, thus avoiding the additional cost of new terminals from the second vendor, and the inconvenience of having two terminals on every user's desk. Even if new terminals are purchased with the new mainframe, the users will still need to access the old mainframe until all activities have been transferred to the new mainframe.

It is not simple to connect one vendor's terminals to another vendor's mainframe. For example, consider the task of connecting a terminal manufactured by International Business machines Corporation of Armonk, New York (IBM), to a mainframe manufactured by Digital Equipment corporation (DEC) of Maynard, Mass. An issue that must be confronted in this case is that IBM terminals communicate with a so-called synchronous communication protocol, whereas DEC terminals communicate with an asynchronous communication protocol.

In an IBM system using a synchronous communication protocol, the "cluster control unit" (or CCU, which acts as a go-between for the terminals and the mainframe) regularly polls the terminals for new actions that have been performed by the user and transmits the results to the mainframe. The CCU also sends commands to the terminals which update their screens. The terminals must acknowledge each poll within a short time interval (approximately 5 μsec), by transmitting any recent keystrokes or other actions. Likewise, each screen update command must also be acknowledged. In contrast, in a DEC system using an asynchronous communication protocol, keystrokes or other actions are transmitted to a terminal server (TS) as they are received from the user. In a DEC asynchronous system, the terminal is never polled.

There are several known conversion devices that interconnect hardware from different vendors such as IBM and DEC. These conversion devices consist essentially of conversion hardware and (in the case of a converter interfacing IBM terminals to DEC and IBM mainframes) connections to the IBM terminal, the IBM CCU and the DEC TS. The conversion hardware routes (and, where necessary, converts to a form appropriate for the target main frame) the user's keystrokes and other terminal information to one or the other of the mainframes. Typically, to switch the terminal and converter between mainframes, the user enters a "hot key" sequence. To detect the hot key sequence, the conversion hardware "listens in" on all keystrokes entered by the user at the terminal, and switches mainframes when the hot key sequence is detected.

In known conversion devices, e.g., those that interconnect terminals to IBM and DEC mainframes, when the user switches "off" the IBM mainframe (to work on the DEC mainframe), from the IBM CCU's perspective, the terminal becomes totally unresponsive to polls or other commands. When the IBM CCU notices that the terminal is unresponsive (which occurs after about 15 unanswered polls), the CCU assumes that a communication error has occurred. As a result, the CCU kills the user's processes and logs the user out (i.e., the user's "session" is terminated). Thus, when a user switches "off" and back "on" the IBM mainframe, he must log back into the IBM system, and re-initialize any programs that were running.

SUMMARY OF THE INVENTION

In general, in one aspect, the invention features a method for removing crossover distortion in the course of deriving a processed digital signal from positive and negative digital signal sample components that were formed by positive and negative threshold comparisons and which appear at a given sampling clock rate, comprising A. for a current sampling clock period, forming a replica of the positive digital signal sample component that appeared two sampling clock periods earlier, B. forming the logical OR of the replica with the positive digital signal sample component appearing in the current sampling clock period, to restore portions of the signal lost to crossover distortion, C. forming the negation of the negative digital signal sample component appearing in the current sampling clock period, and D. forming the logical AND of the negation of the negative digital signal sample component with the result of step B, to form the processed digital signal.

Other advantages and features will become apparent from the following description of the preferred embodiment and from the claims.

DESCRIPTION OF THE PREFERRED EMBODIMENT

We first briefly describe the drawings.

FIGS. 8A through 8B are electrical schematics of the BPP controller and support hardware that control the operation of the BCP'S.

FIGS. 9A through 9F are electrical schematics of the I-Bus control circuitry that directs and controls data transfer between the BPP and the two BCP'S.

FIG. 14 is a parallel flow diagram illustrating a normal transition from IBM 3270 mode to DEC VT mode.

FIGS. 15A and 15B are parallel flow diagrams illustrating an error-condition transition from IBM 3270 mode to DEC VT mode. During the transition, the CC BCP screen memory is refreshed from the terminal screen memory.

FIGS. 16A through 16C are parallel flow diagrams illustrating a normal transition from DEC VT mode to IBM 3270 mode.

FIG. 17 is a parallel flow diagram illustrating an error-condition transition from DEC VT mode to IBM 3270 mode. During the transition the IBM session is re-initialized.

The invention provides apparatus to maintain the state of the interactions between an input device (e.g., terminal) and a computer system (e.g., CCU) even if the input device enters modes in which it is unresponsive to the computer system.

Figure 1:
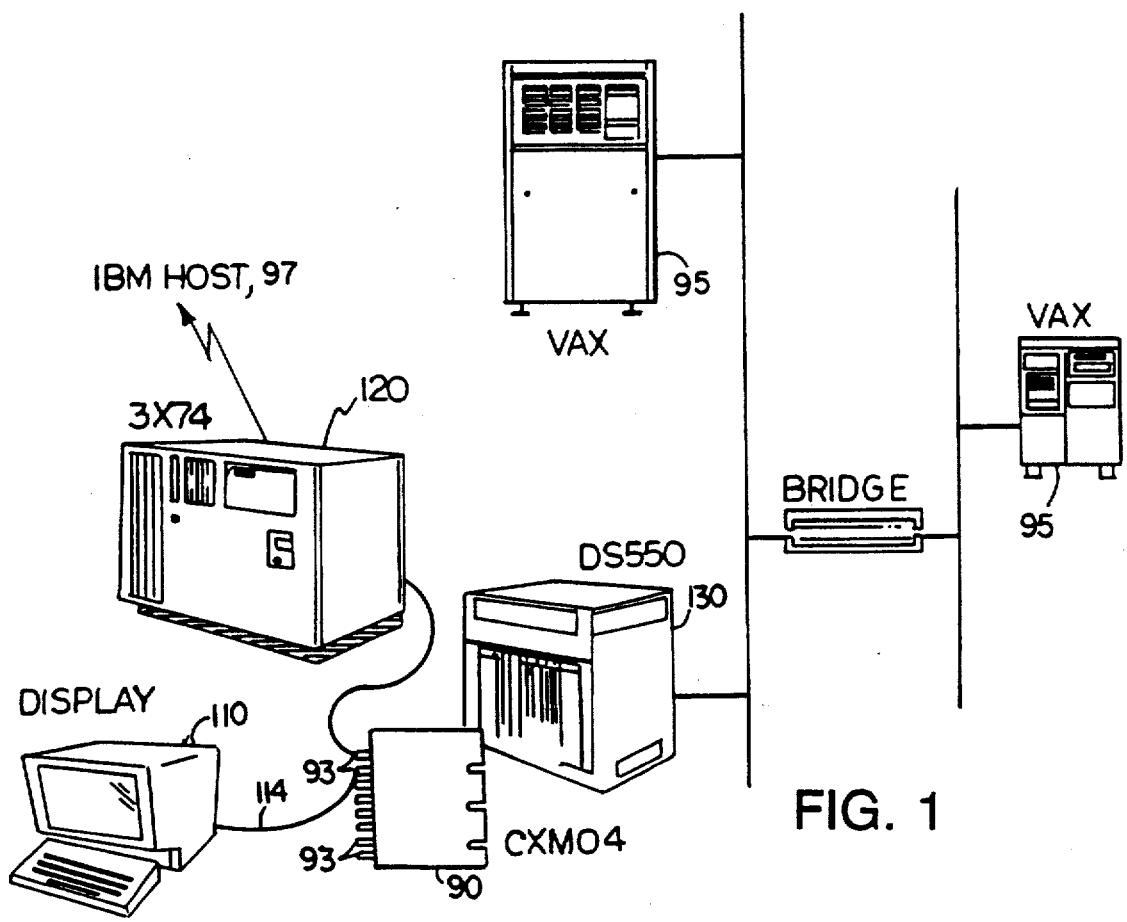
FIG. 1 is an illustration of a multi-vendor computer network including a terminal interface card for connecting a terminal to two computer systems.

Referring to FIG. 1, in one embodiment, a plug-in option card 90 is provided for a model DECServer 550 terminal server 130 (available from DEC, and hereafter referred to as a DS550 terminal server), whose function is to connect a number of DEC asynchronous terminals to one or more DEC mainframe computers. In this embodiment, card 90 allows an IBM model 3270 terminal 110 which uses a synchronous communication protocol to access applications running on a DEC mainframe (such as a VAX computer 95) through the DS550 terminal server, and also access other applications on IBM mainframe host 97 through an IBM CCU 120.

In use, the card 90 is connected in series between the CCU 120 and synchronous terminal 110, via coaxial cables 112, 114. In the embodiment of FIG. 1, card 90 may serve up to four terminals 110 by connections of this type. As illustrated, four ports are provided on card 90; each port has a terminal connector 92 and a CCU connector 93. To connect a terminal through a selected port of card 90, a first coaxial cable 114 is connected between the terminal 110 and the terminal connector 92 of the selected port; next, a second coaxial cable 112 is connected between the CCU 120 and the CCU connector 93 of the selected port.

Along with other circuitry, each port on card 90 includes a pass-through connection that can connect (in an electrically transparent fashion) that port's terminal connector 92 to that port's CCU connector 93. When closed, this pass-through electrically eliminates the card 90 from the series connection, and allows the terminal 110 to directly access IBM applications (through the CCU 120) without being affected by the card's existence. At any time, however, the user may hit a special hot-key sequence; in response, the pass-through connection is broken, and the terminal connector 92 is connected to the DS550 terminal server 130. Subsequently, the user can use the IBM terminal 110 to access DEC applications on the DEC computer 95. To facilitate this use, card 90 includes circuitry that performs DEC VT220 asynchronous terminal emulation, enabling the synchronous 3270 terminal 110 to simulate an asynchronous DEC VT220 terminal to the DS550 terminal server.

While the terminal 110 is interacting with the DS550 terminal server 130, the pass-through connection with the CCU 120 remains broken. In order to respond to the polls and other commands from the CCU 120 to keep the IBM session alive, card 90 includes circuitry and software that simulate the responses of a 3270 terminal.

Figure 2:
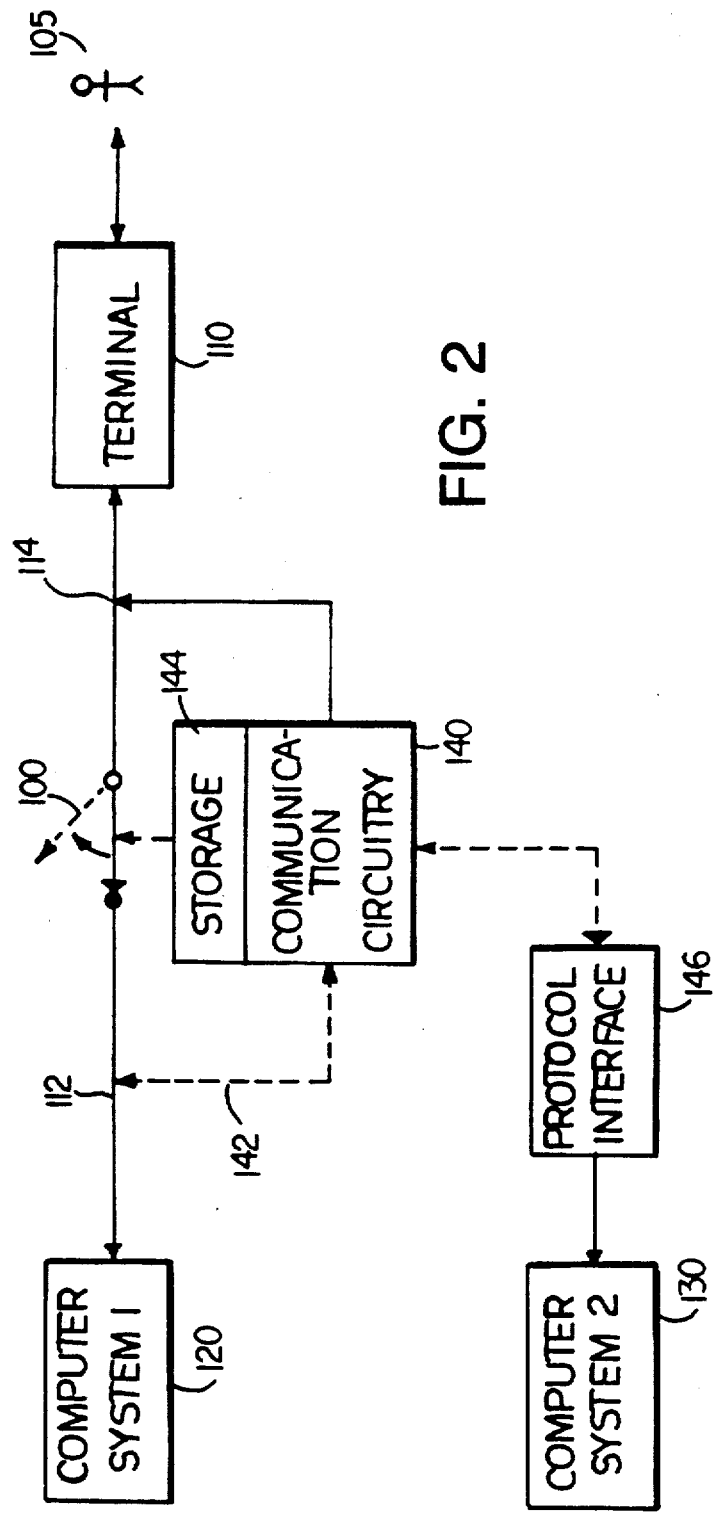
FIG. 2 is a block diagram of the terminal interface card of FIG. 1.

Referring to FIG. 2, in a functional representation of one port of card 90, a user 105 working at terminal 110 interacts with a first computer system 120 over links 112, 114 (via a closed switch 100) and also may interact with a second computer system 130. In our example, the terminal 110 is an IBM 3270 terminal and the computer system 120 is an IBM CCU and the mainframe to which it is connected. The links 112, 114 between the CCU and the 3270 terminal are coaxial cables.

When closed, switch 100 provides a direct connection between the user's terminal 110 and the IBM CCU 120. Thus, while the user is interacting with the first computer system, switch 100 is closed; while switch 100 is closed, the communications between the terminal 110 and the IBM CCU 120 are not affected in any way.

To allow the user 105 to disconnect from computer system 120, for example, to communicate with a second computer system 130 (e.g., the DS550 TS and the mainframe to which it is connected), switch 100 is opened (as illustrated by a dotted line). After switch 100 opens, to communicate with computer system 130, the keystrokes entered by the user 105 are received from the terminal 110 by communications circuitry 140, and then converted and forwarded via protocol interface 146 to the second computer system 130. Protocol interface 146 converts synchronous format messages from synchronous IBM terminal 110 to asynchronous format, ASCII-encoded messages for DEC asynchronous terminal server 130. Protocol interface 146 also performs the complementary conversion for messages from terminal server 130 to terminal 110.

While the switch 100 is open, communications between the terminal 110 and computer system 120 are necessarily broken off, and polls and other commands from computer system 120 are not answered by the terminal. If no other device takes the place of the terminal and answers the polls, and other commands the computer system 120 will eventually assume that a communication error has occurred, and will terminate the user's session.

To eliminate this possibility, communications circuitry 140 "impersonates" the terminal 110, responding to polls and other commands from computer system 120 while switch 100 is open. The responses are indicated by a dotted link 142 connecting communication circuitry 140 to link 112 (link 142 is dotted to indicate that it is only operational while the switch 100 is open, i.e., in the dotted position). The responses from the communication circuitry to computer system 120 are not equivalent to actions (such as keystrokes) that would cause a change in the state of the user's session; rather, the responses are equivalent to the responses that would be received from a terminal if no actions were being performed by the user. The responses are only what is necessary to convince the computer system 120 that the terminal 110 is still connected, and thus preserve the user's session.

Later, when the user 105 again wishes to interact with computer system 120, the switch 100 is closed, and link 142 is disabled. Thereafter, the user 105 may continue his interactions with computer system 120 as if terminal 110 had never been disconnected.

To perform the above functions, communications circuitry 140 must not only impersonate terminal 110 to the satisfaction of computer system 120, but also must allow the user 105 to return to his session in the state where he left it. In an IBM system, the terminal 110 (e.g., a 3270) is responsible for maintaining session state information, such as a stored representation of the current screen display. However, if the terminal 110 is then connected instead to the second computer system 130 (e.g., DEC), its screen is used to display the state of the interaction with the DEC computer system, and thus the stored information from the IBM session is lost. Because of this, for the user to be able to return to the IBM session exactly as it was left, the screen information must be stored in an auxiliary location, and reloaded to the terminal 110 when the switch 100 is later reclosed.

Also, because the terminal 110 is responsible for storing session information, computer system 120 (e.g., the IBM CCU) may occasionally send commands to the terminal 110 (or what the CCU thinks is the terminal but is actually communications circuit 140) to determine or modify the current session state. Therefore, to properly impersonate the terminal 110, the communications circuit 140 must have immediate access to, and control over, the stored state of the session (note that the communications circuit has only about 5 μsec to respond to polls or other commands). To accomplish this, storage 144 is provided to enable communication circuit 140 to maintain session state information. By accessing this storage in response to polls from computer system 120, communications circuit 140 can effectively impersonate terminal 110. Later, when the user switches back to computer system 120, the session information in storage 144 is downloaded to the terminal 110 to enable the user to continue the session with computer system 120.

In one embodiment, the information stored in storage 144 could be loaded from the terminal 110 each time the user switches from computer system 120 to computer system 130. Although this embodiment is operable, it is preferable to design communications circuit 140 to continuously monitor the information being transferred on links 114, 112, even while switch 100 is closed, and thus maintain a completely updated version of the state of the session at all times. In this way, terminal 110 may immediately switch from computer system 120 to computer system 130 without first downloading session information to communications circuit 140. As will be seen later, this reduces the possibility of "race" conditions which may cause the system to lose a valid version of the screen display.

To switch from computer system 120 to computer system 130, the user enters a "hot key" sequence (such as a combination of two keys like ALT-SHIFT that, using typical software, causes no action to occur on computer system 120). When communications circuit 140 detects this hot-key sequence (as a part of its normal monitoring and storage updating), switch 100 is opened, link 142 enabled, and terminal 110 is connected to computer system 130.

After disconnecting from computer system 120, terminal 110 may be prepared for interactions with computer system 130, for example, by clearing the screen display and resetting terminal parameters such as screen size and tabs (in DEC systems, these parameters are stored by the terminals, e.g., VT220's. In the invention, these parameters are stored by protocol interface 146).

Regardless of whether switch 100 is open or closed, its impedance is carefully balanced with that of the links 112, 114, (e.g. coax cables) to minimize the effect of the switch on the communications over the links. In one embodiment, this is done using the impedance matched pass-through and isolation switch disclosed in U.S. patent application Ser. No. 07/280,149 of Robert A. Curtis, filed Dec. 5, 1988, assigned to the assignee of this application and incorporated by reference herein. This switch has the additional feature that it will default to a pass-through condition if the power is turned off.

Figure 3:
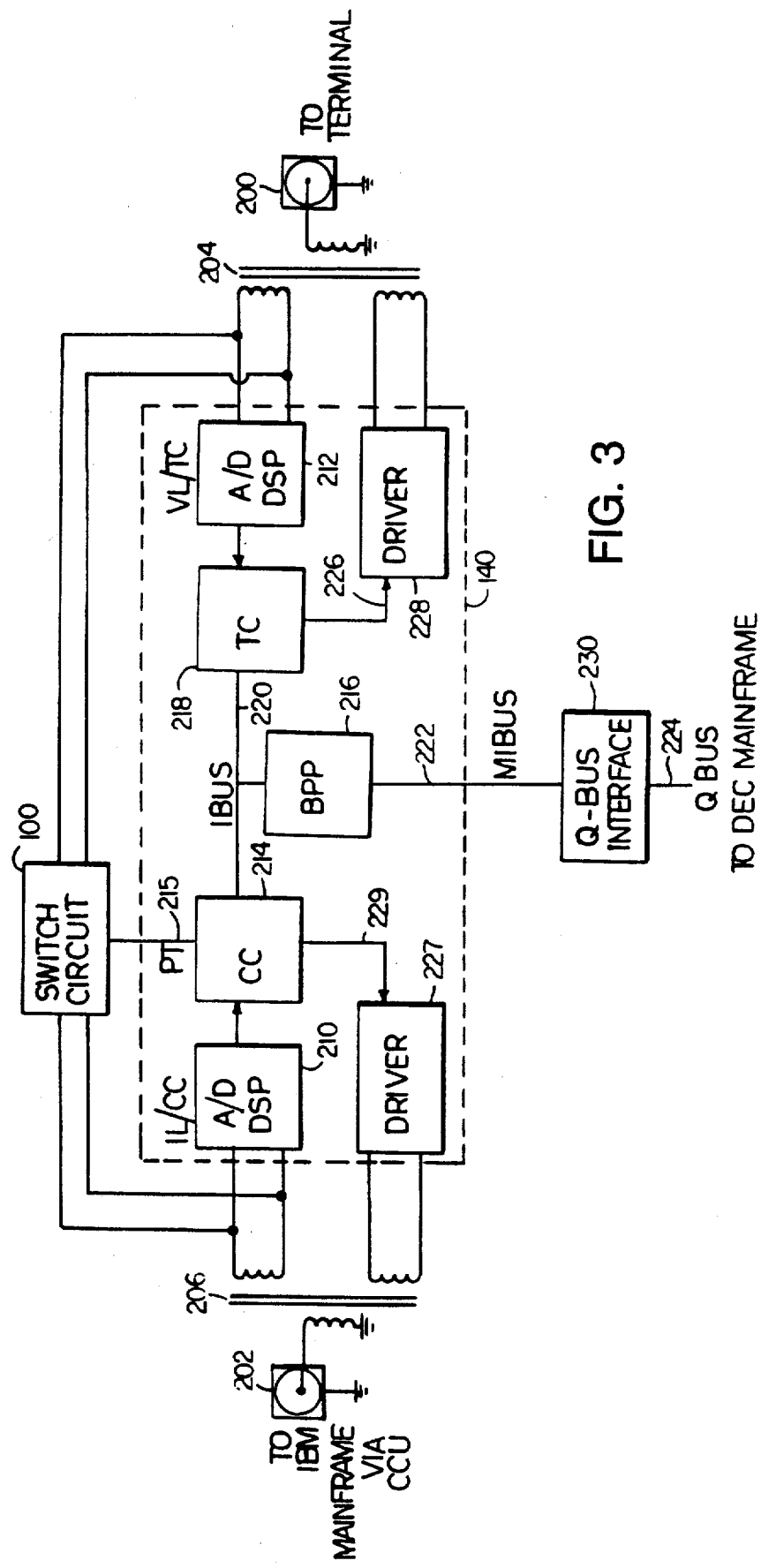
FIG. 3 is a block diagram of the communications circuitry of FIG. 2.

Referring to FIG. 3, in a more particular depiction of the port of FIG. 2, intended for use in connecting IBM 3270 terminals to IBM and DEC mainframes, the connections to the terminal and to the IBM computer system are made via coaxial cable connectors 200, 202. The signals transmitted on the coaxial cables are coupled (by 1:1:1 transformer couplings 204, 206) to the pass-through switch circuit 100 of the above-referenced patent application and to communications circuitry 140.

The use of transformer couplings provides DC isolation to prevent ground-fault errors, and also allows the invention to switch the coax connections (between a first connection to the pass-through switch circuit 100 and a second connection to communications circuitry 140) in a manner that does not change the termination impedance seen by the terminal and mainframe.

As shown in more detail in FIG. 3, in one embodiment, communications circuit 140 comprises controllers 214, 216, 218, analog/digital circuitry 210, 212, and drivers 227, 228. As will be seen here and elsewhere, several elements of the communications circuit are repeated to accomplish the similar functions at the interfaces with the IBM terminal and mainframe. In what follows, these interfaces are referred to as the CC (for CCU coax) and TC (for terminal coax) interfaces, respectively (they may also be referred to as the IL [IBM line] and VL [VT220 line] interfaces, respectively).

The repetition of hardware design may be coupled with software design to allow additional functionality.

For example, one design convention is that the hardware on the CC side of the card is strictly a superset of the hardware on the TC side. Because of this design convention, the invention may be configured as a "DEC only" card, using all eight coax connectors to connect, on a full-time basis, eight IBM 3270's to the DS550 TS. This is done by using the CC side of the four ports as TC interfaces. As the TC hardware is available on the TC and CC sides, the card may be re-configured for "DEC only" use by simply loading the TC software into the CC circuitry. As described in the detailed hardware description, configuration switches on the card determine if the card is to be used for IBM and DEC or for DEC only.

On both the TC and CC sides of the card, the signals appearing at the coax cables are manipulated by analog to digital (A/D) conversion and digital signal processing (DSP) circuits 210, 212. The outputs of circuits 210, 212 are digital signals representative of the analog signals on the coaxial cables. These circuits are discussed in more detail below in conjunction with FIG. 5.

The heart of the communications circuit 140 is the trio of control and storage circuits 214, 216, 218. The CC circuit 214 and TC circuit 218 perform similar functions to interface to the CCU (via connector 202) and the terminal (via connector 200).

The CC circuit 214 reads (processed digital signals representing) the signals from the CCU and stores a digital representation of the screen display (and other attributes) of the terminal. At the same time, CC circuit 214 controls the operation of switch circuit 100. A digital signal PT on a line 215 from CC circuit 214 controls the state of the pass-through switch circuit 100.

The TC circuit 218 reads (processed digital signals representing) the signals from the terminal and may also store a digital representation of the screen display (and other attributes) of the terminal.

While the switch 100 is closed, CC circuit A 214 "listens" to the signals passed between the CCU and the terminal and updates its internally stored representation of the terminal screen. At this time, TC circuit 218 is "asleep", that is, it is not performing any function.

When the hot key sequence is detected by the CC circuit 214 (while it is listening), CC circuit 215 directs pass-through switch circuit 100 to open. Also, at this time, CC circuit switches from a "listener" to a "responder", that is, CC circuit 214 subsequently responds to polls and other commands from the CCU, using and modifying (where necessary) its stored representation of the terminal screen. CC circuit 214 responds to polls and commands (sensed by A/D converter 210) using a driver 227 responsive to the signals on line 229.

In addition to responding to CCU polls and other commands, when switch 100 is opened, CC circuit 214 directs TC circuit 218 to "awaken" and begin to interact directly with the terminal. Thereafter, as long as switch 100 remains open, TC circuit 218 receives messages from, and sends messages to, the DEC mainframe through the DS550 terminal server's "Q-bus" expansion card interface bus 224 (these communications are translated and interfaced by the BPP circuit 216 and Q-bus interface circuitry 230). To communicate with the terminal, TC circuit 218 polls, and sends screen modifications to, the terminal by driving the terminal's coaxial cable with a driver 228. The signals to be sent by driver 228 are transmitted by control circuit 218 on line 226.

As discussed above, FIGS. 2 and 3 depict the coaxial cable connections and circuitry for a single port of card 90 (FIG. 1). To service four ports, this circuit may be repeated four times; however, to do sc would underutilize the circuitry. This is because one IBM CCU may service up to 32 terminals, and the 32 terminals are polled sequentially (rather than in parallel). Therefore, each IBM terminal is, on average, only communicating with the CCU for 1/32 of the time.

Thus, in one embodiment, the invention uses the control circuitry of FIG. 3 in a multiplexed fashion to service several terminals at once. As illustrated in FIG. 1, four cables, one from each terminal, are connected to four connectors 200, and four cables to the IBM CCU are connected to the four connectors 202. Each port has its own pass-through switch 100, A/D and DSP circuits 210, 212, and drivers 227, 228. As shown in detail below, some of the DSP circuitry 214, 216 for the four ports can be combined to reduce the total chip count, and also to facilitate the determination of which port is active.

The four ports on the card 90 are controlled by a single central controller, comprising the CC circuit 214, TC circuit 218, and BPP circuit 216. In combination, these circuits determine which (if any) port is active, read the incoming signals on the active port, and, based upon the current state of the switch 100 for that port, determine the appropriate responses or modifications to the stored screen representations for the port, and issue the responses or make the modifications.

In this way, the CC, TC, and BPP circuitry may interact differently with each port in a manner transparent to the other ports. For example, port 1 may be in IBM mode (that is, the CC is listening and the TC is asleep), but port 2 may be in DEC mode (that is, the CC is responding and the TC is awake). In this example, if the CCU sends a command to the terminal on port 1, the command will be detected by the CC and TC circuits (because the pass-through switch for port 1 is closed). In response, the CC circuit (in listen mode on port 1) will make the appropriate modifications to its screen memory but not respond; the TC circuit (which is asleep on port 1) will do nothing. However, if the CCU subsequently sends a command to the terminal on port 2, the command will be detected by only the CC circuit (note that the command would not be detected on the TC side because the switch 100 for port 2 is open). In response, because the CC circuit is in respond mode on port 2, the CC circuit will respond on port 2 to the command even though it did not respond on port 1.

Continuing this example, if the terminal responds to the command on port 1, the response will be detected by the CC and TC circuits (because the pass-through switch for port 1 is closed). In response, the CC circuit (in listen mode on port 1) will make the appropriate modifications to its screen memory but not respond; the TC circuit (which is asleep on port 1) will do nothing. However, if the terminal on port 2 responds to a command on port 2 (for example, a command from the TC circuit, which is awake on port 2), the response will be detected by only the TC circuit (this time, the response would not be detected on the CC side because the switch 100 for port 2 is open). In response, because the TC circuit is awake on port 2, the TC circuit will notify the DEC mainframe of the response by transferring it to the DS550 TS via the BPP circuit and the Q-bus interface.

In order to use a single TC, CC, and BPP circuit the design must ensure that these circuits can "satisfy", that is, be responsive to, all four ports simultaneously (e.g., if a port is in IBM mode, the CC circuit must be able to maintain that port's session state, and otherwise, if a port is in DEC mode, the CC circuit must be quickly responsive to polls and other commands from the IBM mainframe on that port, and the TC circuit must be able to poll the terminal and forward the responses). This is possible as long as the CC or TC circuits are not required to do two things at once. One possible problem would occur if two ports were connected to two different CCU'S: in this case, the CC circuit might have to respond to commands from the two CCU's at the same time. For this reason, the current embodiment of the invention must have all four ports connected to the same CCU (note that the CCU sends commands to its terminals in sequence—this guarantees that the CC will only have to respond to one command at a time). If it were necessary to allow connection to multiple CCU'S, each port would have to have its own CC circuit.

Figure 4:
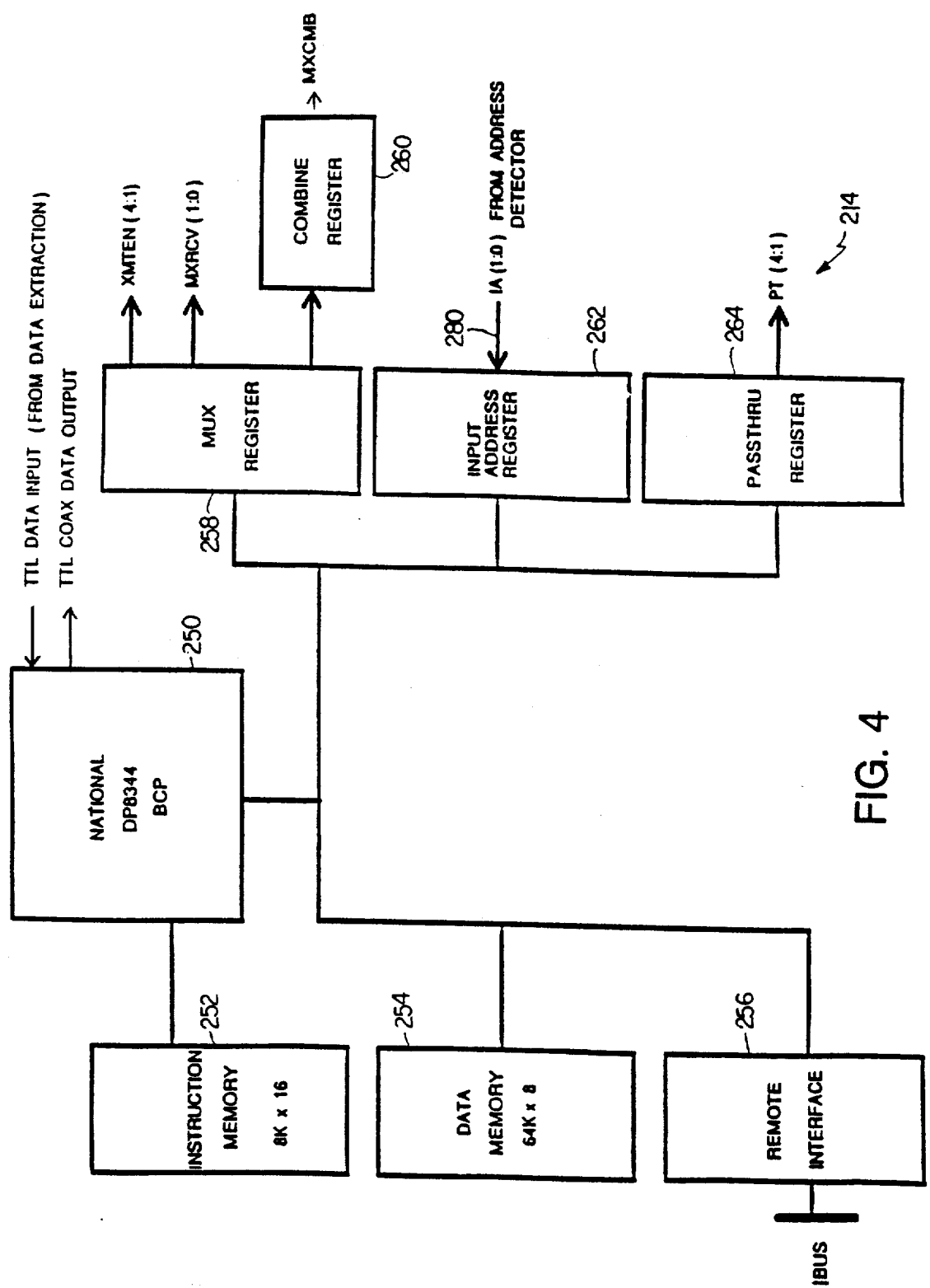
FIG. 4 is a block diagram of the CC control circuitry of FIG. 3.

Referring to FIG. 4, in one embodiment, the CC (and TC) circuitry is centered around the DP8344 chip 250 (available from National Semiconductor, Santa Clara, Calif.). The CC circuitry, which is depicted in FIG. 4, is a superset of the TC circuitry. The additional circuitry on the CC side, namely, the combine register 260, the input address register 262, and pass-through register 264, are used to respond to CCU polling and to control the pass-through switch, as discussed below.

The DP8344 250 is a Bi-Phase Communications Processor (BCP) designed to efficiently process IBM 3270 and other communications protocols. The BCP integrates a 20 MHz 8-bit Harvard architecture RISC processor and an intelligent, software configurable transceiver on the same CMOS chip. It is described in the National BCP data sheet, available from National Semiconductor and incorporated herein by reference.

The BCP is used in the CC and TC circuits in conjunction with session maintenance hardware to store screen and terminal data. The BCP is programmed to store this information and, when necessary, download it to the terminal to allow the user to then resume IBM sessions. The instructions of the BCP program that enable it to perform this function are stored in fast static RAM 252, and the data storage is performed by fast static RAM 254. A bus transceiver 256 forms a remote interface that connects the DP8344 to the DEC mainframe, for example, through the BPP interface microprocessor 216 (FIG. 3).

To allow the CC circuit 214 (and TC circuit 218) to control multiple ports, a MUX register 258 (which is a BCP I/O register) is used to select which one of four ports is currently active.

When the TC circuit is awake, it is polling the terminal(s) to obtain keystrokes or issue commands. Because the TC circuit sends commands to the terminals and then waits for responses, it knows a priori on which port a response is to be expected.

In contrast, in the CC circuit, whether it is responding or listening, the active port is not known beforehand. This is because the active port is determined by the CCU when it sends a command to the terminal (or, in respond mode, what the CCU thinks is the terminal but is actually the CC responder). Therefore, the CC circuit includes additional circuitry not in the TC circuit that determines the active port. First, in the CC BCP, the MUX register 258 works in tandem with the combine register 260 (which is also a BCP I/O register). When set, the combine register 260 enables all four receive ports. Using the MUX and combine registers, the CC BCP looks at the logical OR of the signals on all four input ports until the DSP circuitry (as described below) determines which port is transmitting data (note that, under normal circumstances, at least three of the ports will be in a no-signal condition [logical 0], and thus will not affect the result of the OR operation). This is an important function because there is no way to predict where valid signals will appear next, and the DP8344 (because it is designed for operation on a single input port) must see the entire quiescent period of the coax signal to operate properly.

Once the DSP circuit determines which port is receiving data, the CC input address register 262 (which is also a BCP I/O register) is loaded with the address of the port. This address is then written by the CC BCP to the MUX register 258, thus disabling the combine register 260 and selecting only the valid port.

To close or open the pass-through switch 100 (FIG. 3) for a port, the CC circuit sets the appropriate control signal in the pass-through register 264 (which is also a BCP I/O register), thus throwing the selected pass-through switch 100. If the CC BCP is reset, or if an error condition is detected, all of the switches default to a closed (pass-through on) state. The TC BCP does not have a pass-through register because it does not control the pass-through switches.

Figure 5:
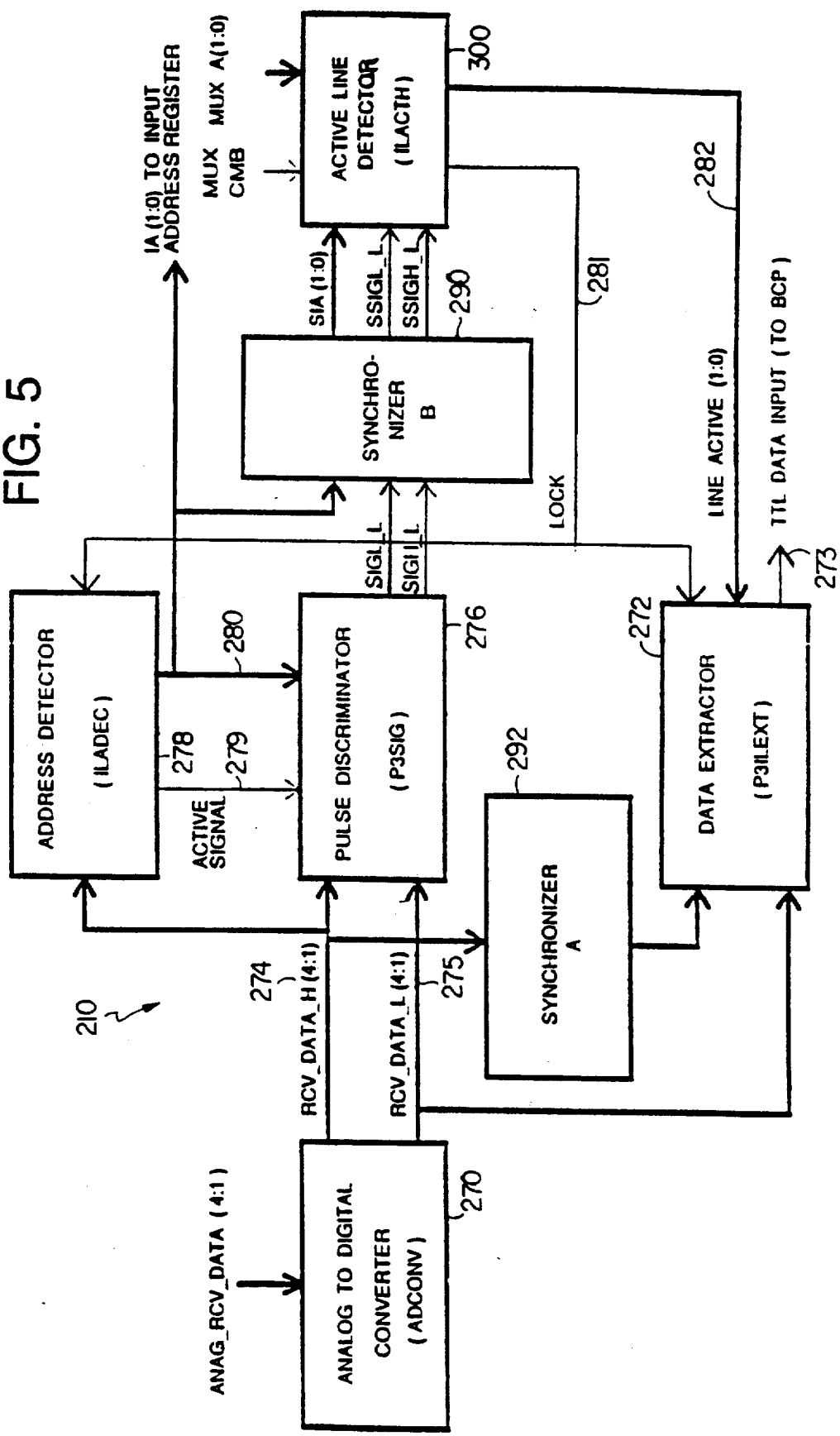
FIG. 5 is a block diagram of the A/D and DSP circuitry of FIG. 3.

Referring to FIG. 5, the A/D and DSP circuits for the TC and CC sides of the invention also use similar circuits. As discussed above, the CC circuit has additional circuitry that allows it to detect the active port. Therefore, the CC circuits, which are depicted in FIG. 5, are a superset of the corresponding TC circuits. The additional circuitry in FIG. 5 which does not appear on the TC side is the address detector 278, the pulse discriminator 276, the synchronizer 290, and the active line detector 300.

Now turning to the function of the circuitry of FIG. 5, the four A/D converter circuits (generally represented by block 270) detect incoming data on the four ports and convert it to TTL levels. The A/D circuits sample the analog data on the coax and generate two digital signals: a first signal which is logic true only if the analog coax signal is above a positive threshold level, and a second signal which is logic true only if the analog coax signal is below a negative threshold level, If the analog coax signal is between the thresholds, both signals are logic false. In analog terms, the resulting input/output characteristic of the A/D converter has "crossover distortion".

To understand the purpose of this distortion, the form of the data being read by the A/D converter should be understood. The IBM communications standard uses a Manchester-encoded serial data format. Between communications, the cable does not carry signal. The beginning of a message is indicated by a 5 bit quiescent period followed by a 3 bit code violation period and a synchronization bit. At the end of a message, 1 parity bit and three stop bits are transmitted, after which the cable again returns to a no-signal condition. (More information on the IBM communications standards may be obtained from the "IBM 3174/3274 Control Unit to Device Product Attachment Information" handbook, available from IBM, and incorporated herein by reference.)

Crossover distortion is intentionally added to the A/D converter to screen out noise signals that may appear on the coaxial cables (due to antenna effects) during the no-signal periods. For the maximum coax length allowed by IBM, (1500 meters), noise signals may be effectively screened using positive and negative threshold voltages of 40 mVolts. In one embodiment of the invention, the A/D converter is implemented by two comparators configured to compare the analog coax signal to these threshold voltages. (The threshold voltages may be formed, for example, by a resistive divider circuit connected to suitable positive and negative reference voltages.)

The output of the A/D converters is fed to digital signal processing (DSP) circuitry illustrated in FIG. 5. The output of the DSP circuits is a processed, digitized version of the analog signal on the coaxial cable, and is carried on the TTL input line 273 to the CC or TC circuits 214, 218 (FIG. 3). Generally, the processing in the DSP circuits removes any additional noise that remains in the digital output of the A/D converter. For example, the DSP circuits remove hazards in the digital signal that may be created by spikes in the analog coax signal (such spikes may be caused, e.g., by static discharges). Furthermore, the DSP circuits compensate for the cross-over distortion of the A/D converter, adjusting the digital signal to have a 50% duty cycle. The result of this processing is a clean digital representation of the signal received from the coax.

The outputs of the four A/D converters 270 are four "data high" signals, carried by four lines generally represented by line 274, and four "data low" signals, carried by four additional lines, generally represented by line 275. These four signals are input to a data extractor 272, a pulse discriminator 276, and an address detector 278.

The data extractor circuit 272 (P3ILEXT) has two functions. It provides the actual OR'ing/MUX'ing of the input lines from the A/D circuits and also "reshapes" the signals from the A/D's to overcome cross-over distortion. Its output, on line 273, is a TTL representation of the analog input and is fed to the CC or TC BCP input.

The address detector 278 is a selection circuit (used only in the CC BCP) that provides the line number (address) of the line that it believes is producing valid Manchester-encoded bits. The address detector 278 looks at all four input signals, and upon detecting valid data on an input, asserts the ACTIVE SIGNAL output on line 279 and indicates the active port number on lines 280. The address detector 278, and the signals on lines 280 and 279, are asynchronous; that is, the signals instantaneously indicate which port the address detector currently believes to be valid. To allow this signal to drive synchronous circuitry, the output of the address detector may be locked by asserting a LOCK signal on line 281.

The pulse discriminator 276 filters transient noise from the analog signal, and feeds the filtered signal to the active line detector (ALD) 300. It works together with the address detector 278 and active line detector 300 to form a state machine that runs at eight times the rate of the coax data. This state machine operates as follows. The ALD 300 samples the SIGH and SIGL signals provided by the pulse discriminator 276, looking for a valid beginning sequence of a coax frame (a sequence of 1 bit time positive, 1 negative, and then 1 positive). Once the correct sequence has been recognized the ALD 300 asserts the LOCK signal on line 281 and outputs, on line 282, the address of the port it has seen the valid activity on. At any time during the sampling, either before or after LOCK has been asserted, if the ALD 300 doesn't see a bit transition (SIGH being de-asserted and SIGL being asserted, or vice versa) within two bit periods (16 clocks) it will revert to the idle state and begin sampling each of the lines again.

The pulse discriminates 276 locates pulses as follows: each port's signal is compared to its value at previous times. To accomplish this, five feedback paths, varying in delay from 10 to 50 nsec in steps of 10 nsec, feedback the original signal. If the signal remains asserted for 10 nsec, (i.e., if the 10 nsec feedback and current signal are both asserted) the detector assumes that the pulse is valid, and sets the address output bits on lines 280 to match the active line. If all five feedback paths are asserted, and the current signal is still active, the address detector assumes that the pulse was longer than 50 nsec, and asserts the "active signal" bit on line 279, telling the pulse discriminator that an active pulse is present.

The synchronizers 290, 292 latch data inside of the DSP circuitry. The data presented to the state machine at the data extractor 272 and active line detector 300 is asynchronous to the clocks in the state machine. This could potentially result in errors in the state machine. The synchronizers 290, 292 latch the data, eliminating the possibility of errors.

The typical operation of the control circuit is as follows:

Coax data from the CCU appears on one of the four ports. The data passes through the isolation transformer 206 (FIG. 3), is converted from analog to digital by the port's A/D converter, and arrives at the CCU address detector 278 (FIG. 5) and data extractor 272. When data first arrives it is unknown which port the data is on, however, while no port is selected the data extractor 272 OR's all the coax lines together, and sends the OR'ed data to the CC BCP 250 (FIG. 4) on line 273. Therefore, the CC BCP receives the coax signal from the very beginning even though the active channel has not yet been located. To determine the active port, while the OR'ed signal is being transmitted to the CC BCP, the address detector 278 and pulse discriminator 276 look at all four ports.

The pulse discriminator 276 uses the method described above to detect valid pulses on the coax lines. However, just detecting a valid pulse is not sufficient to prevent noise from locking up the circuitry. The active line detector 300 takes the data output of the pulse discriminator and further analyzes the signal to detect a valid "beginning of frame" sequence such as described above. When a valid frame is detected the ALD asserts the LOCK signal which causes the address detector and the data extractor to lock up on the port indicated by the address detector, and to ignore the other three coax inputs. LOCK will remain asserted throughout the data frame, and is de-asserted only at the end of the frame.

Data extraction is performed by data extractor 172 (P3ILEXT). The data extractor circuit has two functions. It provides the actual OR'ing/MUX'ing of the four coax lines in receive mode and also "reshapes" the data to overcome the clipping effect of the analog to digital converter (ADCONV) circuit. Each line is received using two comparators with threshold set in the +/− 40 mvolt range. when the incoming signal passes through the area between these thresholds the information is lost due to crossover distortion. The data extractor circuit corrects this problem and produces an output with a 50% duty cycle.

While the LOCK signal from the active line detector is de-asserted, signals from all four coax lines are OR'ed by the data extractor circuit and sent to the BCP. When the LOCK signal is asserted only data on the coax line selected by the LINE ACTIVE (1:0) inputs are sent to the CC BCP.

Figure 6A:
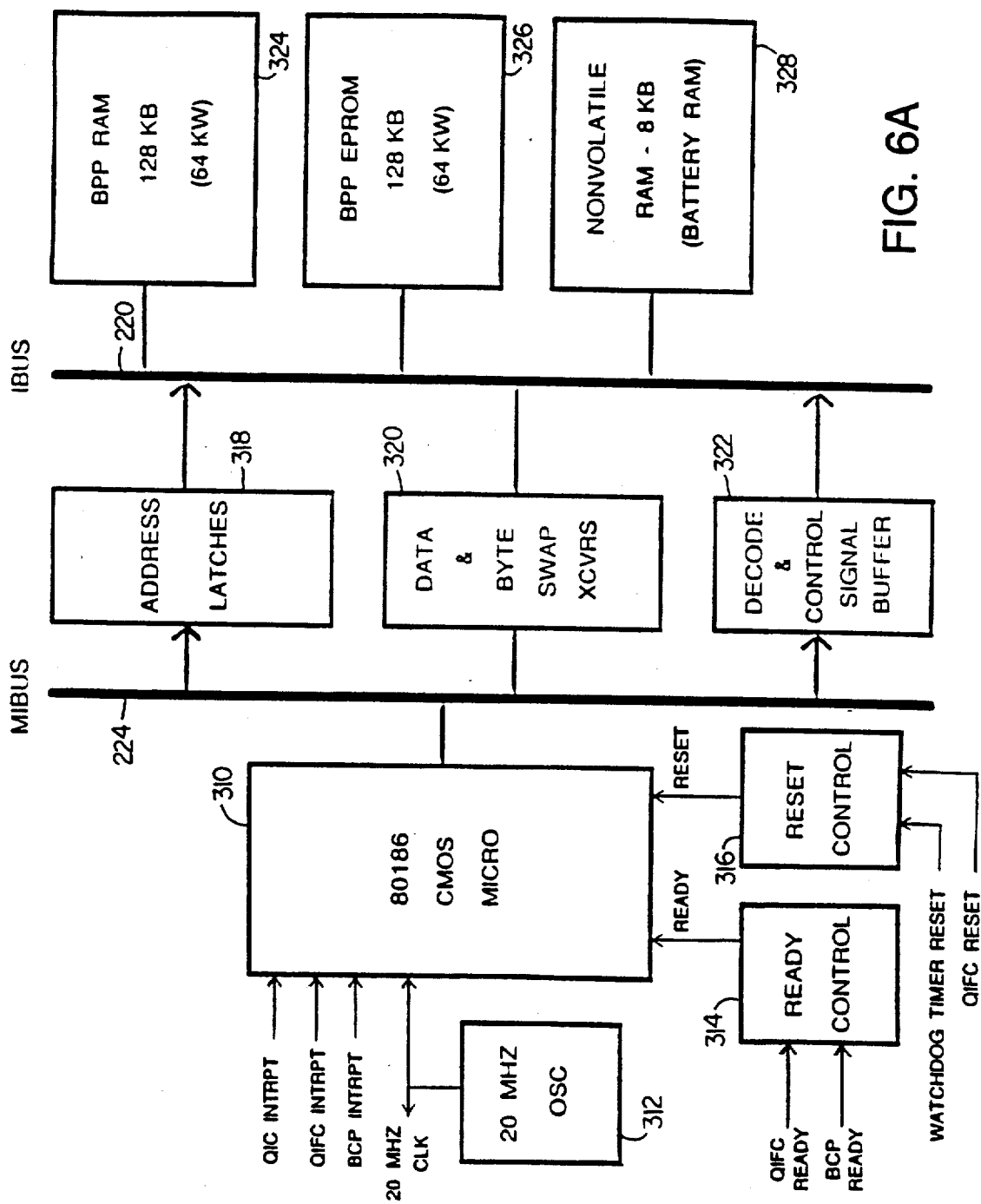
FIGS. 6A and 6B are block diagrams of the BPP circuit of FIG. 3.

Referring to FIG. 6A, the CC and TC BCP's are controlled and interconnected to the DS550 TS by the BPP processor. One main function of the BPP is to provide bus control of the intercommunications between the two BCP's along the IBUS 220 (see FIG. 3). In addition, the BPP tracks the status of the BCP's and controls their operation by downloading programming and transferring data between the BCP memories. The details of these interactions are described below in conjunction with FIGS. 14 through 17.

The heart of the BPP is a 80186 CMOS microprocessor 310 which is clocked by a 20 MHz oscillator 312. The processor instruction cycles may be extended by the BCP's or the Q-bus interface through the ready control circuitry 314. Also, the processor may be reset by a watchdog timer (that prevents infinite loop hang-up) or by a command from the Q-bus (originated by the user or a host computer connected to the DS550TS) through the reset register 316.

The processor is connected to the MIBUS 224 (for multiplexed internal bus, which interfaces directly to the Q-bus interface). The communications between the processor and the BCP's are performed on an internal bus IBUS 220. The IBUS is controlled by the BPP through bus interface circuitry which includes a decoder 322 that determines which of the circuits on the IBUS are enabled, a set of transceivers 320 for swapping data, and address latches 318 for latching address information being passed to the BCP'S.

Connected to the IBUS are three memories under BPP control. The BPP RAM 324 stores information to be transferred to or from the DS550.TS. The BPP RAM also contains the instructions for the BPP 80186 processor and an image of the microcode for the CC and TC BCP'S. These instructions are downloaded from a host computer through the Q-bus during initialization, The CC and TC images are then further downloaded to the instruction memories of the BCP's by the BPP.

The BPP EPROM 326 stores diagnostic and initialization routines to be run by the BPP at start-up. The BPP NVRAM 328 stores screen characteristics, such as tab settings and screen size, that are required for VT220 emulation. These parameters are ordinarily stored by a VT220 in a non-volatile location. However, the 3270 has no such storage; therefore, the NVRAM 328 stores these parameters so that the BPP may send them to the TC BCP. The NVRAM 328 also stores diagnostic status information for use in repairing the board.

Figure 6B:
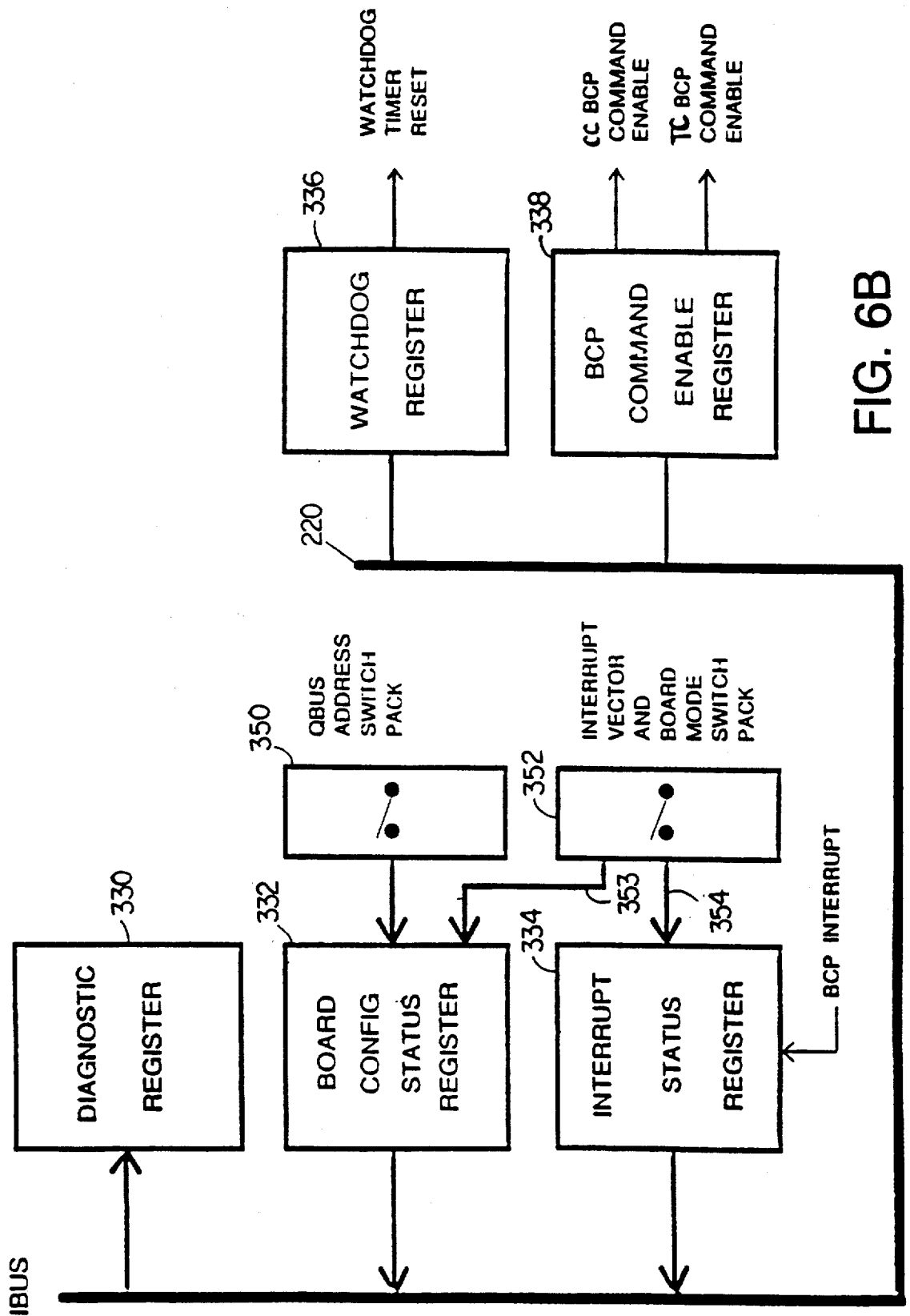

Referring to FIG. 6B, in addition to the data memory, the IBUS also connects to several status registers which may be monitored by the BPP to determine operational status.

The diagnostic register 330 stores bits indicating the diagnostic status of the card. One of these bits may force all of the pass-through switches to a "closed" state in case of a failure during one of the BPP's diagnostic tests.

The watchdog register 336 indicates whether a BPP reset has been triggered by the watchdog timer.

The configuration and status register 332 indicates the current configuration of the board (read from the on-board switch packs 350 and 352). The state of the switches determines the address of the board on the DS550 TS Q-bus, as well as whether the board is in "DEC only" or DEC/IBM mode.

The interrupt status 334 determines whether the BCP's and the Q-bus are attempting interrupt the BPP processor to obtain services.

DETAILED HARDWARE DESCRIPTION

The schematics of FIGS. 7A through 11I illustrate a specific electrical circuit implementation.

Overview

As a review, the Q-bus interface face subsystem 230 provides the connection to the DS550 Q-bus, handling all Q-bus protocol and buffering of the transmit and receive data. It is connected to the BackPort Processor (BPP) subsystem 216 over the Multiplexed Internal Bus (MIBUS). The BPP subsystem handles the transfer of data between the Q-bus and coax (i.e., CC and TC) interfaces, and handles all the diagnostic and system functions on the board. The coax interface subsystem 140 is connected to the BPP over the demultiplexed Internal Bus (IBUS) 220. This subsystem interfaces to the coax ports adhering to the 3270 protocol, performs the VT220 emulation, and supports IBM sessions while a port is in VT Mode.

Q-bus Interface Subsystem

Figure 7A:
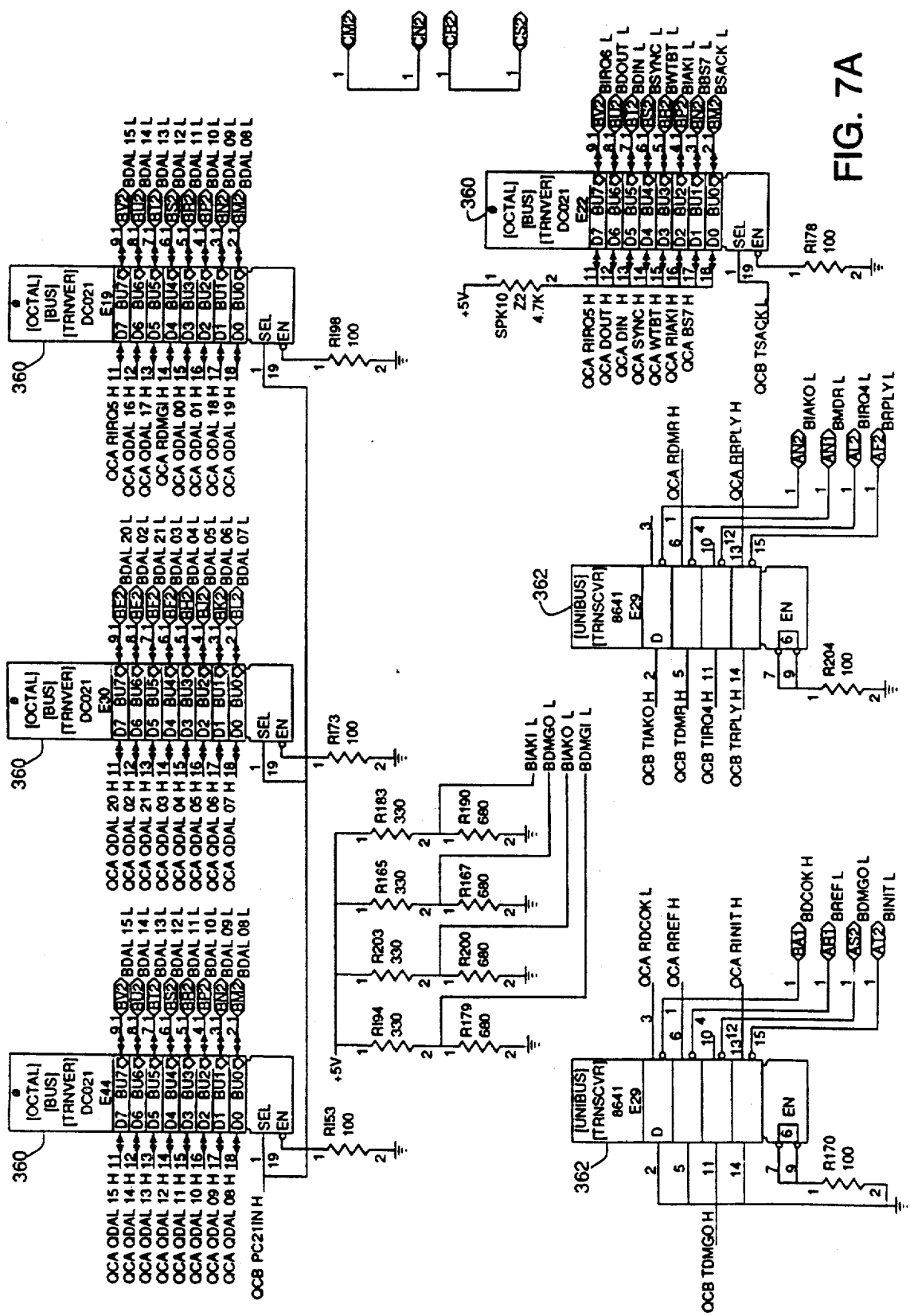
FIGS. 7A through 7C are electrical schematics of Q-Bus interface circuitry that connects the invention to the Q-Bus of a DS550 terminal server.

Referring to FIG. 7A, six Q-bus transceivers provide the electrical interface to the Q-bus signals. They are made up of two types of transceivers, a direction controllable transceiver DC021 360, and a standard transceiver 8641 362. Both of these transceivers have open collector outputs on the Q-bus side and standard TTL outputs on the board side. The DC021's provide connection for the signals that are either driven or received only at deterministic times as defined by the protocol. The 8641's interface the signals that are unidirectional, or may need to be driven and received in a non-deterministic fashion. The Transceiver section also provides the necessary terminations for the four daisy-chained Q-bus signals.

Figure 7B:
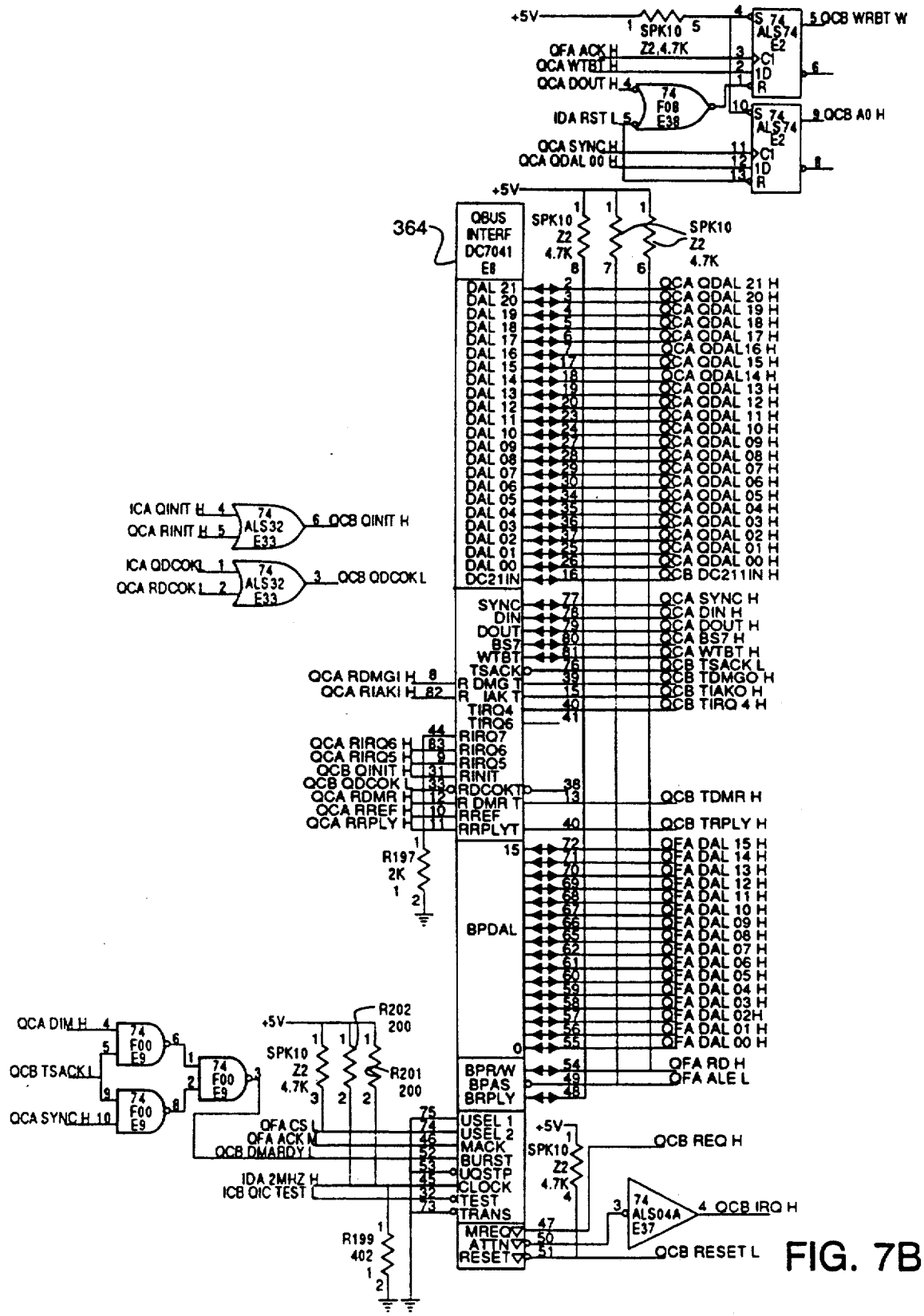

Referring to FIG. 7B, the Q-bus Interface Chip (QIC) is a 2 micron CMOS Gate Array 364 that handles all the Q-bus protocol. It has two ports, a Q-bus Port and a Backport. The Q-bus Port interfaces to the transceivers supporting all the Q-bus signals including the 22 bit address space, and also controls the direction of the DC021's. The Backport is a 16 bit multiplexed address/data bus that interfaces to a second QIFC gate array (not shown). The QIC supports block mode DMA (direct memory addressing), single word transfers, and two levels of programmable interrupts.

The QIC has internal control status registers (CSR's) that can be programmed from the Backport (i.e., via the MIBUS) to control what Q-bus address it responds to, to set up the interrupt levels, and to control DMA transfers. After initialization, the BPP can control the QIC by writing into the CSR's of the QIC. By doing this, the BPP can cause the QIC to begin direct memory access (DMA) reads from data in the DS550's PDP11 memory. Data so DMAed may be the program image for the BPP, or the two BCP'S, or it may be data that is to be (translated and) transmitted via the coax subsystem. The QIFC remaps these transfers into buffers in a QIFC RAM. The QIC will also recognize programmed transfers from the Host and pass these through (and re-map) to its Backport where they are written into locations in the QIFC or the QIFC RAM.

Figure 7C:
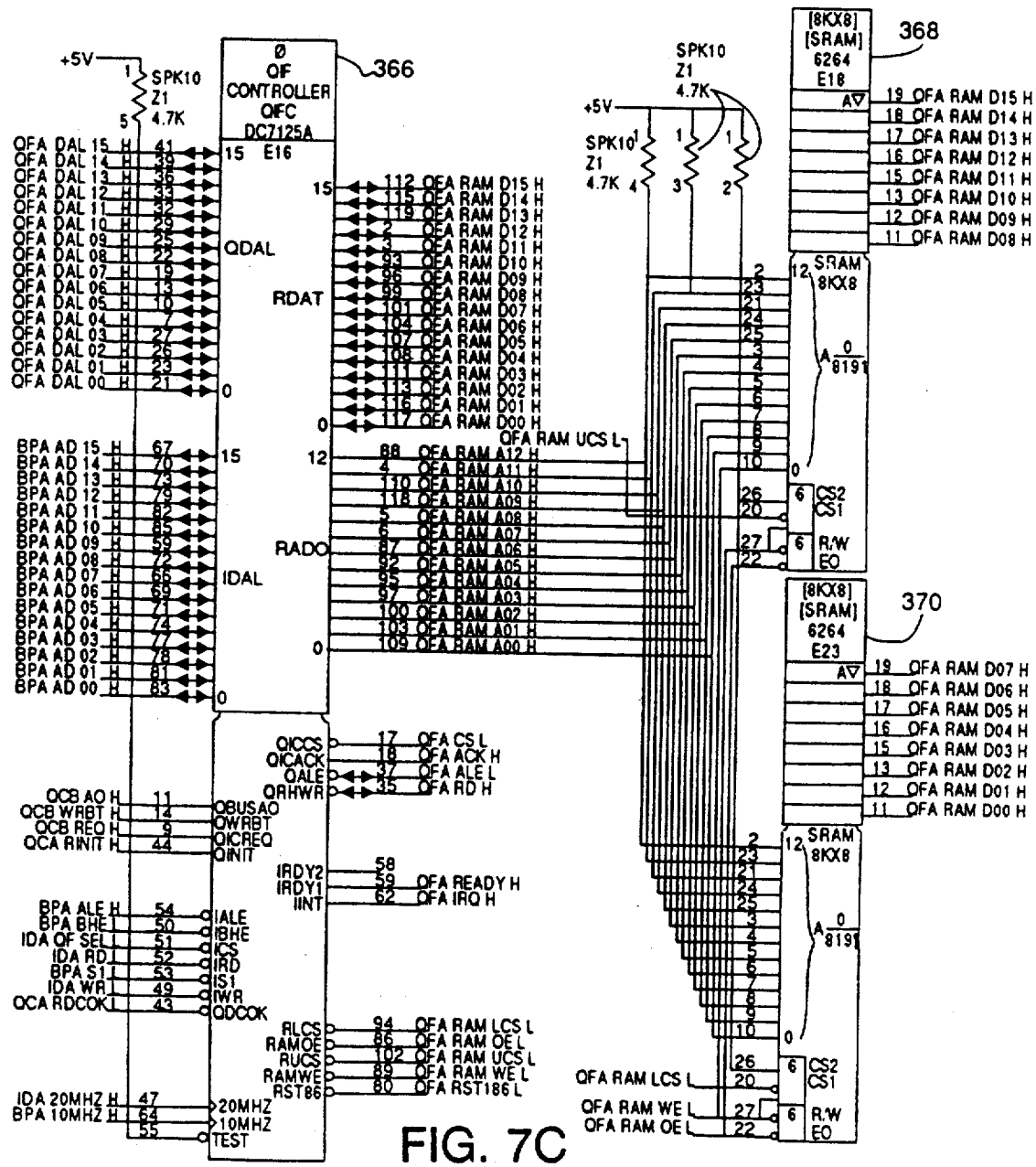
Figures 1, 8A:
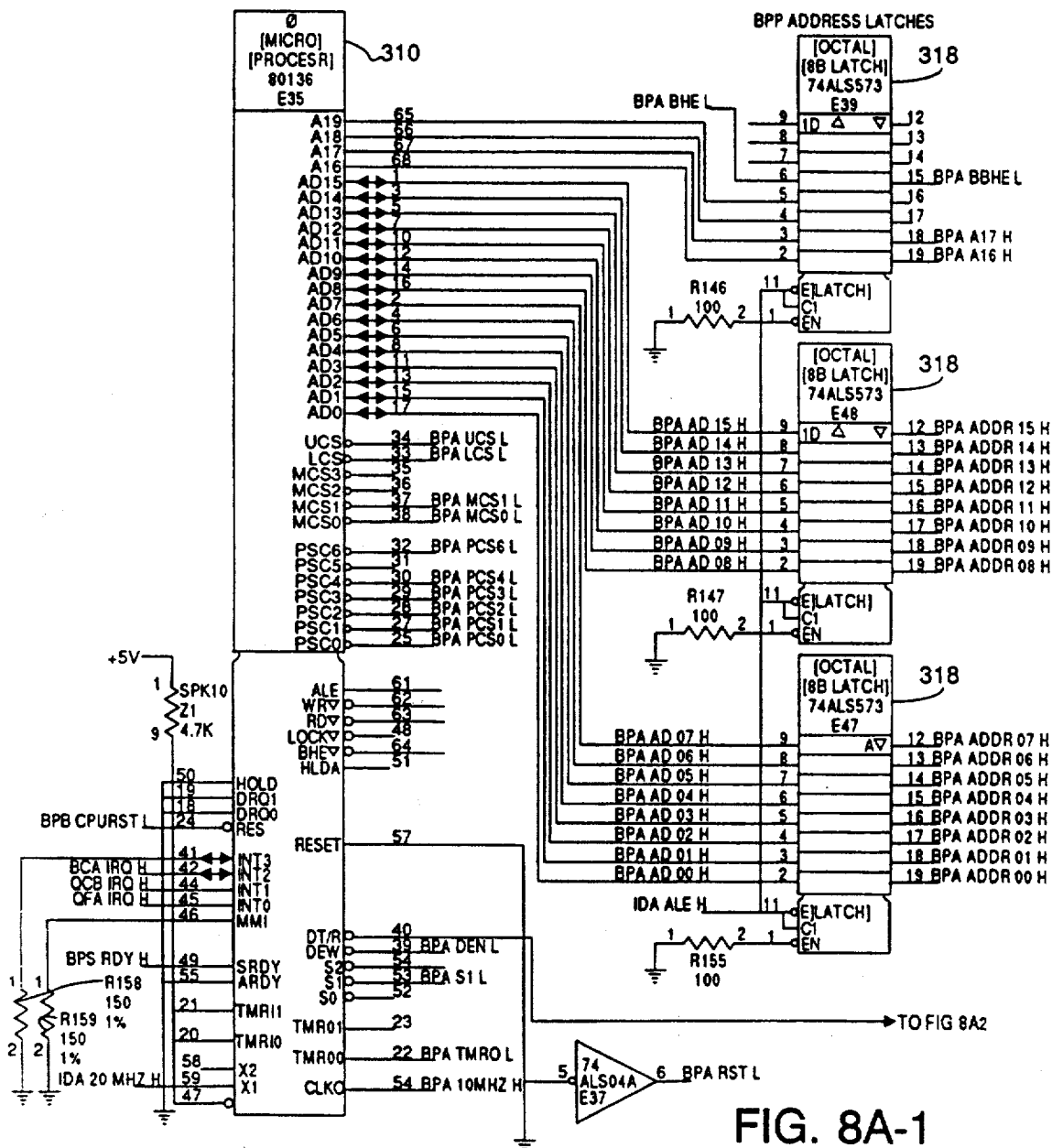
Figures 2, 8A:
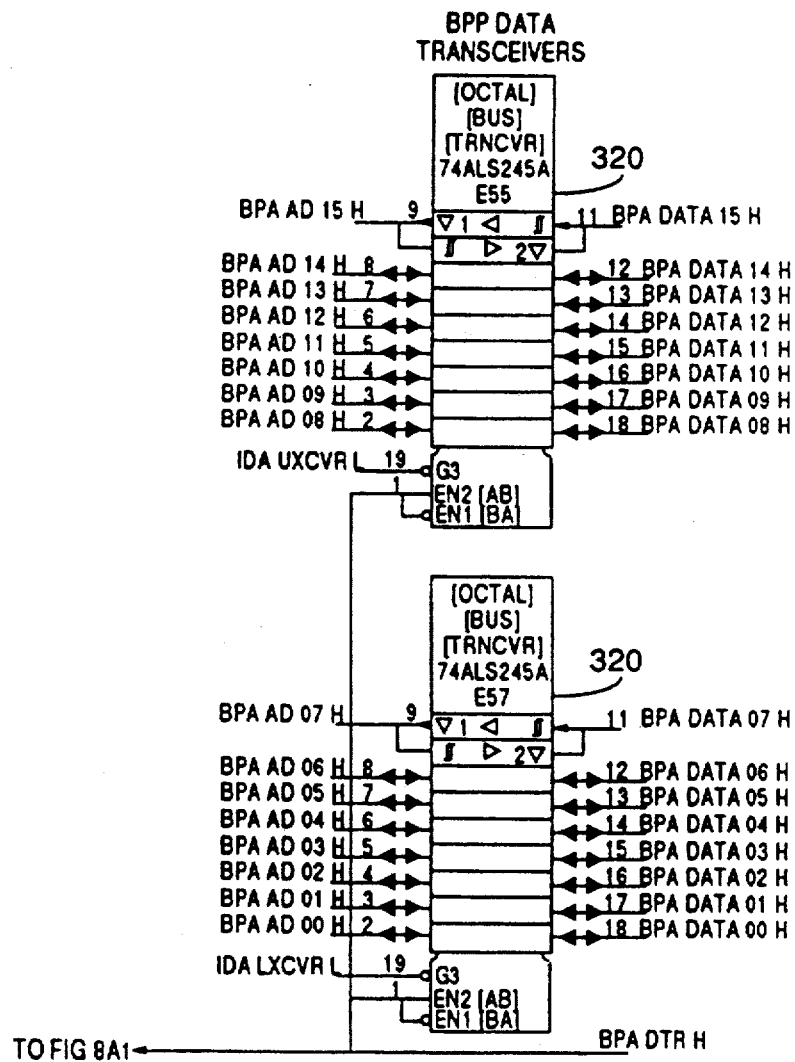

Referring to FIG. 7C, the Q-bus Interface Controller (QIFC) is a 2 micron CMOS gate array 360. It performs two major functions: to institute the programming interface (a modified version of the standard DHU interface—see Appendix A), and to dual-port its own resources, and that of the QIF RAM, to allow both the QIC and BPP to access them with minimum latency.

The QIFC has three ports, a Q-port, an Inport, and a RAM-port. The Q-port interfaces to the QIC's 16 bit multiplexed Backport allowing transfers in both directions. This port is controlled by a sequencer which controls the transfer timing. The Inport is 16 bit multiplexed bidirectional port that sits directly on the 80186's address/data bus (MIBUS). It is also controlled by a sequencer. The RAM-port is a 16 bit data, 11 bit address, bidirectional port addressing 2K memory space in the RAM 368, 370.

The Q-port Sequencer and the Inport Sequencer arbitrate accesses to the QIFC and RAM. The sequencers control all timing to their respective ports and the timing of the accesses to the RAM-port. The Q-port Sequencer allows the QIC to read and write locations in the QIFC and the RAM. The I-port allows the 80186 to read and write the QIFC, RAM, and the QIC. In this way the 80186 can handle the transfer of data and control the QIC.

Some of the standard Q-bus registers are contained internal to the QIFC while others are implemented in the RAM. The QIFC handles all re-mapping of addresses from both ports to the proper locations in either resource. It contains the pointers that allow the FIFO's for programmed transfers to be built in RAM. The QIFC has many testability features including Partial Scan.

The RAM is 8K words of 45 nsec Static RAM (byte accessible) of which 2K is utilized in the design. It contains the DMA buffers, the transmit and receive FIFO'S, and a number of the card registers.

The QIFC includes a DMA Ready Circuit that deals with the end of DMA cycles, when the QIC has relinquished control of the Q-bus, but still has data in its double buffers to move to the QIFC. Without the ready circuit, if the Host attempts to do a programmed transfer to the QIC at this time, the QIC fails to respond and a Q-bus time out occurs. The DMA ready circuit works around this by de-activating the DMA READY pin to the QIC if it has relinquished Q-bus control, and a read, write, or interrupt cycle is beginning on the Q-bus. The de-activation of the DMA READY pin temporarily suspends the QIC from completing the DMA (moving what remains of the transfer from the double buffers to the Backport) until the Q-bus cycle is over. Note that even if the programmed transfer is directed to another Q-bus device, QIC operation will still be suspended.

The QIFC also includes a Byte Write Circuit. The QIC does not support Byte Writes from the Q-bus but the board provides this feature. To this end, the Byte Write Circuit recognizes a Q-bus Write Byte access and passes this information on to the QIFC. When the Host performs a Write Byte the Q-bus asserts the BWTBT signal with the low order address bit, BDAL A0, specifying whether it is an odd or even byte access. The QIC ignores the BWTBT signal and performs a word write to its backport with data in the proper byte (even or odd) and the other byte being undefined. The QIFC grants a Q-port access by asserting QFA ACK. The Byte Write Circuit latches the BWTBT signal on the edge of QFA ACK. It also latches the BDAL A0 signal using the Q-bus signal BSYNC. With this information the QIFC can recognize that it is a byte access and transfer the valid byte to the proper location. At the end of the cycle the latch is cleared.

BPP Subsystem

Referring to FIG. 6A, the Backport Processor (BPP) circuit 216 (FIG. 3) is clocked by a clock circuit 312. The buffered output of a 20 MHz oscillator drives the clock inputs to the 80186 as well as the circuitry in the Q-bus interface 230 (FIG. 3). Internally, the 80186 divides this in half and generates a 10 MHz clock output. This clock is used in the reset circuit 316 and ready circuit 314.

Referring to FIGS. 8B and 6A, reset control for the card is provided by reset control circuit 314. There are four types of reset that can occur: Power-up Reset (Q-bus signal BINIT asserted and BDCOK de-asserted); Bus Reset (BINIT asserted); Master Reset (bit 5 set in the CSR register by the Host driver); and Watchdog Timer Reset (caused by the expiration of the Watchdog Timer).

Power-up Reset occurs when the system is powering up and the Q-bus asserts BINIT and de-asserts BDCOK. The received versions of these signals, QCA RINIT and QCA RDCOK, drive both the QIC and the QIFC circuits in the Q-bus interface 230 (see below). QCA RDCOK is also latched in the Watchdog Register 336 (FIGS. 6B and 9B) to allow the 80186 to read (while initializing) the fact that a Power-up reset has occurred. The signals are OR'ed together internal to the Q-bus circuitry and the combination drives a pulse lengthening circuit that it uses to generate the QFA RST186 signal, which has a minimum width of 400 nsec. This output drives the Reset Control block 316 (see also FIG. 8B) which in turn adds a minimum of 1.5 s to this pulse. The output of this circuit drives the reset input to the 80816. The 80186 then generates an output reset signal, BPA RST, synchronized to the 10 MHz clock, and this signal is used to reset its CSR's and the Coax Interface Subsystem.

Although these signals pass through the Q-bus circuit, they do not initialize it. The Q-bus circuitry is initialized when the 80186 performs a programmed write to a register inside the Q-bus circuit. This programmed write must be a part of the 80186 initialization code.

The bus reset has much the same effect on the board as Power-up reset. The only difference is that the fact that it occurred is not captured in the Watchdog Register 336 (FIG. 8B). Again, the 80186 needs to initialize the Q-bus circuit.

Master Reset occurs when bit 5 in the CSR register is set internal to the QIFC by the Host. This operation is used when the Host wants to reset the board without affecting the rest of the DS550 TS system. This bit does not reset the QIFC but fires off the pulse lengthening circuit generating the QFA RST186 signal. The 80186 must control the initialization of the QIC and the QIFC as described above. The 80186 can read (while initializing) the CSR register to determine that a Master Reset occurred.

There is a timer built into the 80186 that the code must reset periodically or it will time out and output a 100 nsec width pulse on the signal BPA TMRO. This signal drives the Reset Control circuit which will lengthen it to 1.5 s pulse resetting the 80186. The fact that the Watchdog Timer expired is latched in the Watchdog Register 336 (FIG. 6B) so the 80186 can read this (while initializing) and determine that a Watchdog timeout occurred.

The 80186 is a 10 MHz highly integrated 16 bit microprocessor. It can address 1 Mbyte of memory and includes two internal DMA engines, three internal timers, and programmable chip select logic. The main function of the 80186 is to perform the data transfer among the Q-bus Interface Subsystem and the Coax Subsystem.

The 80186 Bus Interface circuits 318, 320, 322 (FIGS. 6A, 8A, 8B, and 9D) handle the de-multiplexing of the 80186's address/data bus to create the IBUS. This is accomplished with address latches 318 and data transceivers 320. The interface also includes the address decode logic 322 that generates the chip selects to the memory, CSR'S, and a byte swap circuit (see FIG. 8B) to allow the 80186 to perform byte accesses to the Coax Interface Subsystem.

Three ALS573's 318 are used to latch the multiplexed address lines (BPA AD15:0) as well as the four most significant address lines (BPA A19:16) and the Byte High Enable (BPA BHE) line. These last five need to be latched as they are used as status signals later in the cycle. The falling edge of the 80186's Address Latch Enable signal (IDA ALE) defines when these signals are valid and is used to control the latches. The two most significant address lines, BPA A19:18, are not actually used in the design but are latched for possible future expansion.

Two ALS245 transceivers 320 (FIG. 8A) provide the data interface to the IBUS with a third transceiver 320 (FIG. 8B) handling the byte swap function. The direction of all three is controlled by the 80186's Data Transmit/Receive signal (BPA DTR) which is timed to correctly control the data transfer on Write/Read cycles. There are three signals that are generated by the Address Decode circuit 322 (FIG. 9D) to control the enables on these transceivers. These signals are: Upper Transceiver Enable (IDA UXCVR), Lower Transceiver Enable (IDA LXCVR), and Byte Swap Transceiver Enable (IDA BSXCVR). The Byte Swap Transceiver (FIG. 8B) is used to allow the 80186 code to transfer bytes to the Coax Interface Subsystem without having to be concerned about even word boundaries. On a high byte write, addressed to the Coax Interface Subsystem, the Byte Swap Transceiver is enabled to swap the byte down to the lower half of the data bus. On a read from an odd address in this range the Byte Swap Transceiver will swap the data to the upper half of the bus. In both cases the upper half of the IBUS is undefined.

The address decode for the Backport Processor Subsystem is provided by a 2OL10B 322 (FIG. 9D) which is a 15 nsec combinational PAL designated IBDCDE. The inputs to this PAL are:

BPA ADDR 15:14, BPA A17:16—80186 latched address lines.

BPA LCS—Lower Memory Chip Select is asserted by the 80186 whenever a memory access is made to the program defined lower portion of memory.

BPA UCS—Upper Memory Chip Select is asserted by the 80186 whenever a memory access is made to the program defined upper portion of memory.

BPA DEN—Data Enable is asserted by the 80186 during a memory or I/O access to enable the data transceivers.

BPA BHE—Bus High Enable is asserted by the 80186 to specify that data is to be enabled onto the upper half of the data bus.

BPA MCS1—Mid-range Memory Chip Select 1 is asserted when a memory reference is made to a program defined mid-range portion of memory. In our system this signal signifies that a memory access is being performed to the CCU BCP.

BPA MCS0—Mid-range Memory Chip Select 0 is asserted when a memory reference is made to a program defined mid-range portion of memory. In our system this signal signifies that a memory access is being performed to the TC BCP. The two MCS's are OR'ed together externally to represent any access to the Coax Interface for the byte swap transceiver.

IDA ALE—Address Latch Enable is driven by the 80186 with the trailing edge signifying that the address is valid.

BPA PCS6—Peripheral Chip Select 6 is asserted by the 80186 when an access is made to a program defined I/O space. There is no peripheral device in this space as this particular PCS is used by the diagnostics only and when asserted will disable all the outputs of the Address Decode PAL.

The outputs of the PAL are:

IDA LBCS—Lower Bank Chip Select is asserted when the 80186 is performing a memory access directed to the lower 32K words of IBUS RAM.

IDA UBCS—Upper Bank Chip Select is asserted when the 80186 is performing a memory access directed to the upper 32K words of IBUS RAM.

IDA QF SEL—QIFC Select is asserted when the 80186 is performing a memory access directed to QIFC address space.

IDA NVRAM SEL—Non-volatile RAM Select is asserted when the 80186 is performing a memory access directed to the NVRAM address space as defined in the map.

IDA ROM SEL—ROM Select is asserted when the 80186 is performing a memory access directed to the EPROM address space as defined in the map.

IDA LXCVR—Lower Transceiver Enable is asserted when the 80186 is performing a memory or I/O access (excluding PCS6) that is not directed to the QIFC or is not a odd byte access to the Coax Interface Subsystem.

IDA UXCVR—Upper Transceiver Enable is asserted when the 80186 is performing a memory or I/O access (excluding PCS6) that is not directed to the QIFC or the Coax Interface Subsystem.

IDA BSXCVR—Byte Swap Transceiver Enable is asserted when the 80186 is performing odd byte access to the Coax Interface Subsystem.

IDA PLBCS (not shown)—Phantom Lower Bank Chip Select is asserted when the 80186 is performing a memory access directed to the lower 32K words of an assumed additional IBUS RAM area that is not presently implemented.

IDA PUBCS (not shown)—Phantom Upper Bank Chip Select is asserted when the 80186 is performing a memory access directed to the upper 16K words of an assumed additional IBUS RAM area that is not presently implemented.

The Ready Circuit 314 (FIG. 8B) generates the BPB RDY signal which drives the Synchronous Ready input (SRDY) to the 80186. This signal is sampled by the 80186 during a memory or I/O access and if found de-asserted, wait states are inserted in the cycle. The Ready Circuit is a Dual Rank Synchronizer which is used to synchronize the ready outputs from the TC BCP and CC BCP (CCOA READY and CCLA READY respectively). The output of the circuit is AND'ed with the ready output from the QIFC (QFA READY—already synchronized in the QIFC). The Ready Circuit does not provide for any hardware wait state to be inserted for 80186 accesses to BPP memory devices or CSR'S. Wait states are not required for accesses to the CSR'S.

The 80186 RAM 324 (FIG. 9E) is made up of four 32K×8 120 nsec static RAMS. It is organized as 64K words with two banks of 32K words (Upper and Lower). Within each bank, the 80186 can perform byte writes to either the even or odd byte.

The 80186 EPROM 326 (FIG. 9F) is made up of two 64K×8 200 nsec UVPROM'S. It is organized as 64K words.

The 80186 NVRAM 328 (FIG. 9F) is a 8K×8 170 nsec Battery Backed-up RAM. This NVRAM has the same cycle time for writes as it does for reads and has no limitation on the number of writes. It has a shelf life of ten years minimum. It is an eight bit device that sits on the lower half of the IBUS. There is no hardware byte swapping support for this device; therefore, the code is required to perform only byte access to even addresses when accessing this device.

The 80186 control status registers are discussed below.

The Diagnostic Register 330 (FIG. 9A) is a 16 bit write only register located at the I/O port address defined by firmware for the PCS0 chip select. It contains the control for a board LED, an enable for the Watchdog Timer, a signal that forces pass-through, and two bits that control resetting the QIC. There are also a number of bits that are for diagnostic reference only. All the bits in this register are cleared by either of the four types of reset. The bits of the register are discussed in detail below:

15 LED—0 turns the LED off. 1 turns the LED on.

14 WDOGEN—0 disables the Watchdog Timer. 1 enables the Watchdog Timer allowing it to reset the 80186 upon timing out.

13 ERROR LATCH—This bit is used for logging errors. It cleared on power up and set to a 1 if the diagnostics detect an error.

12 START TEST—This bit can be used to trigger a logic analyzer on the start of a diagnostic test. It is asserted and then de-asserted (approximately 2 s) at the beginning of a diagnostic test.

11 ERROR PULSE—This bit is to latch a diagnostic error code that is written to bits 7:0. The diagnostics will write the test number to bits 7:0, assert this bit, then write the error code to bits 7:0 and then de-assert it. In this way an external circuit can latch the test number on the rising edge and the error code on the falling of this signal.

10 FORCE PASS—0 closes the coax pass-through switches on all ports, overrides the pass-through register and forces the electrical connection from the TC to CC connectors on all lines. 1 allows the pass-through register to control the state of the coax pass-through switches.

9 QDCOK—0 asserts the DCOK input to the QIC. 1 de-asserts the DCOK input to the QIC. (This state is needed to properly reset the QIC).

8 QINIT—0 de-asserts the INIT input to the QIC. 1 asserts the INIT input to the QIC. (This state is needed to properly reset the QIC).

7:0 DIAG STATUS—When the diagnostics detects an error they write the code to these bits in two byte transfers. The signal on bit 11 can be used by an external circuit to latch this code.

The Board Configuration Status Register 332 is a 16 bit read only register located at the I/O port address defined by the firmware for the PCS1 chip select. It contains the settings from the Q-bus Address Switch Pack 350, part of the settings from the Interrupt Vector Switch Pack 352 (FIG. 9B), and the reset output from the QIC. The bits of this register are detailed below:

15:7 Q ADDRESS 12:4—This field specifies the Q-bus base address bits 12:4 as set on the Q-bus Address Switch Pack 350.

6:5 Q VECTOR 8:7—This field specifies the Q-bus interrupt vector bits 8:7 as set on the Q-bus Interrupt Vector Switch Pack.

4 Q RESET—0 indicates the QCB RESET output of the QIC is active. 1 indicates the QCB RESET output of the QIC is inactive.

3 CCU PRESENT—0 indicates that a CCU is not present. 1 indicates that a CCU is present.

2 EXT LOOP—0 indicates that self test should not execute external loopback. 1 indicates that self test will execute external loopback. External loopback cable must be present for test to complete successfully.

1:0 MFG MODE—00— causes the self test to be run once. 01—the self test will continue to run looping forever unless it encounters an error in which case it will halt. 10—the self test will run through once unless it encounters an error in which case it will loop on the offending test. 11—the self test will loop forever unless it encounters an error in which case it will loop forever on the offending test.

The Watchdog Register 336 (FIG. 9B) is a three bit read/write register located at the I/O port address defined by firmware for the PCS2 chip select. This register contains bits that capture the following events: the Watchdog Timer timed out; DCOK was de-asserted on the Q-bus. It also contains a bit that controls the TEST input to the QIC. The bits of this register are detailed below:

2 QIC TEST—0 asserts the TEST input to the QIC. 1 de-asserts the TEST input to the QIC. This bit is set to a 0 upon any of the four types of reset.

1 DCOK—0 indicates that the Q-bus signal BDCOK has been de-asserted since the last time this register was written. 1 indicates that the Q-bus signal BDCOK has NOT been de-asserted since the last time this register was written. This bit is unaffected by any of the four types of reset.

0 WATCHDOG—0 indicates that the Watchdog Timer has NOT timed out since the last time this register was written or since a Power-up, Bus, or Master Reset occurred. 1 indicates that the Watchdog Timer has timed out since the last time this register was written or since a Power-up, Bus, or Master Reset occurred. This bit is set to a 0 upon a Power-up, Bus, or Master Reset.

The Interrupt Register 334 (FIG. 9B) is an 8-bit read only register that is located at the I/O port address defined by the firmware for the PCS3 chip select. It contains two bits that specify the source of an 80186 INT2, and the four remaining bits of the Q-bus interrupt vector. The bits of this register are detailed below:

7:4 Q VECTOR 6:3—This field specifies the Q-bus interrupt vector bits 6:3 as set on the Q-bus Interrupt Vector Switch Pack.

3:2 Reserved—These bits always read as 0.

1 CCU INT—0 indicates that the CCU BCP is NOT requesting an interrupt to the 80186. 1 indicates that the CCU BCP is requesting an interrupt to the 80186 on INT2.

0TERM INT—0 indicates that the TC 344 is NOT requesting an interrupt to the 80186. 1 indicates that the TC 8344 is requesting an interrupt to the 80186 on INT2.

The Command Enable Register (FIG. 9C) is a 2 bit read/write register that is located at the I/O port address defined by the firmware for the PCS4 chip select. It contains two bits to control whether an access to an 8344 is a command or data access. The bits of this register are detailed below:

1 CCU CMD—0 indicates that accesses to the CCU BCP interface will be data accesses directed to the 8344's IMEM, DMEM, or PC as defined in the RIC register. 1 indicates that accesses to the CCU BCP interface will be command accesses directed to the 8344's RIC register.

0 TERM CMD—0 indicates that accesses to the TC BCP interface will be data accesses directed to the 8344's IMEM, DMEM, or PC as defined in the RIC register. 1 indicates that accesses to the TC BCP interface will be command accesses directed to the 8344's RIC register.

There are two 8-bit Remote Interface Configuration (RIC) Registers, TC RIC and CC RIC, that are internal to the TC 8344 and CC 8344 respectively. They contain bits that start and stop the 8344, control the access timing of the 8344 Bus Interface, and allow the 8344's IMEM, DMEM, and PC to be read and written. To access an 8344's RIC register the 80186 must first set the proper bit in the Command Enable Register (see above). TC RIC is located any where in the DIBUS address range 80000-8FFFF, and CC RIC is located any where in the DIBUS address range 90000-9FFFF. These registers are only accessible by the 80186; an 8344 cannot access its own RIC register. The bits of the two RIC's are detailed below:

7 BIS—This is a Bidirectional Interrupt Status bit. If the BIRQ pin on the 8344 is programmed as an input (by the 8344 code) then this bit specifies whether or not the interrupt is masked. If the BIRQ pin is defined as an output then this bit mirrors the state of the pin and the 80186 can cause this state to toggle by writing a 1 to this bit (i.e. this can be used as an interrupt acknowledge). 0 Input—BIRQ enabled. Output—BIRQ de-asserted. 1 Input—BIRQ disabled. Output—BIRQ asserted.

6 SS—This is a Single-Step bit. Writing a 1 to this bit with START low will cause the 8344 to single-step by executing the current instruction and advancing its PC.

5 FAST WRITE—0 selects Slow Write mode for the 8344 Bus Interface. 1 selects Fast Write mode for the 8344 Bus Interface.

4 LATCHED READ—0 selects Buffered Read mode for the 8344 Bus Interface. 1 selects Latched Read mode for the 8344 Bus Interface.

3 LATCHED WRITE—0 selects Buffered Write mode for the 8344 Bus Interface. 1 selects Latched Write mode for the 8344 Bus Interface.

2 START—0 = 8344 stopped. When the 80186 writes a 0 to this bit the 8344 will finish executing the current instruction and then halt. 1 = 8344 Running. When the 80186 writes a 1 to this bit the 8344 will begin executing at the current PC address.

1:0 MEMORY SELECT—00 directs 80186 accesses to DMEM. 01 directs 80186 accesses to IMEM. 10 directs 80186 accesses to low PC. 11 directs 80186 accesses to high PC. Note: The 8344 powers up with memory selection pointing to IMEM.

Note: For the card to operate properly, the interface should be in Latched Read and Fast Buffered Write mode (i.e. 5:3=110).

The RIC Shadow Register 415 (FIG. 9C) is a two bit write only register that holds a copy of the Start bits from Terminal RIC and CCU RIC. The bits of this register are detailed below:

1 CCU RIC 1 START—0 the CCU BCP is stopped. 1 the CCU BCP is running.

0 TERM RIC 0 START—0 the TC BCP is stopped. 1 the TC BCP is running.

Coax Subsystem

The Coax Interface Subsystem provides the interface to eight coax connectors on two ports. These interfaces are normally configured as four Terminal-type interfaces and four CCU-type interfaces, although they may be configured to be eight Terminal interfaces. For the purpose of this discussion, it will be assumed that both CCU and terminal type interfaces are present. Since the CCU interface must also be capable of operating as a Terminal interface, the hardware in the CCU interface is a super set of that in the terminal interface. The discussion below will first describe those elements which are part of the Terminal interface, and later describe the additional hardware present only in the CCU interface. References to hardware in the terminal interface will include a reference to the equivalent hardware in the CCU interface in brackets.

The 8344 BCP 250 (FIG. 10B [FIG. 10A]) is the heart of the Terminal Interface. It is an eight bit 20 MHz RISC type processor with a receiver/transmitter built on the chip that is designed for 3270 protocol. It uses a Harvard Architecture bus interface, that is, it has separate instruction and data buses.

The 8344 is unique in that it has a somewhat unusual remote bus interface (IBUS in our case). It allows a remote processor to access its Data MEMory (DMEM) 254 (FIG. 10D [FIG. 10C]) resources, its Instruction MEMory (IMEM) 252 (FIG. 10G [FIG. 10E]), and its internal Program Counter (PC), but it controls the actual timing of these transfers. The remote processor (the BPP 80186) requests accesses to one of its resources by first setting the proper bits in the RIC register (see above) and then asserting MCSO and either IDA RD or IDA WR. The 8344 internally arbitrates remote accesses with its own, giving itself priority on coincident requests, and then acknowledges the remote access and tri-states its own address and data lines. On a DMEM access the remote processor's address and data would then be enabled on the bus but the 8344 drives the read or write signal, as appropriate. This is one of the unique features of the interface: the 8344 controls the timing even on remote accesses. The type of interface used is defined by bits in the RIC Register (see above).

On a remote access to IMEM 252 (FIG. 10G [FIG. 10E]) the arbitration is handled the same way, but the data is actually written through the 8344 to the Instruction Bus. The remote processor has no direct access to this bus. (Note: The 8344 must be stopped to perform an access to IMEM or PC). To load instruction memory the remote processor would first write the appropriate address to the 8344's PC. Since the interface is only eight bits while the PC is sixteen, this must occur in two writes. The remote processor must first set up the RIC register to point to Low PC, load this value, then set up the RIC to point to High PC, and write this value (this can be done in the opposite order). The remote processor can now load data to the instruction memory in two consecutive writes, low byte then high byte. The PC auto-increments after every second write. Reads from the PC or IMEM are handled in the same manner.

An F373 416 (FIG. 103 [FIG. 10A]) provides the latching of the 8344's AD bus. It latches the address on the falling edge of the 8344's ALE signal. Its tri-state enable is controlled by the 8344's CCOA REMOTE signal. This signal is the outcome of the internal arbitration. It is low while the 8344 owns the bus and is driven high when a remote access has been granted.

Four F257 2:1 MUX'es 416 (FIG. 10B [FIG. 10A]) control the address source that is enabled onto the bus. The 8344's data memory address bus, CCOA LA15:0, and the 80186's lower sixteen address lines, BPA ADDR 15:0, are input to the MUX'es. The selection of these MUX'es is controlled by the CCOA REMOTE signal as described above.

The remote data interface 256 (FIG. 10G [FIG. 10F]) is provided by a Read Data Latch (F373) and a Write Data Buffer (ALS541). This interface requires that RIC 5:3 be set to 110.

On a remote read access the rising edge of the 8344's signal, CCOA READY, is used to latch the read data. The Tri-state enable on the latch is controlled by an AND'ing of the 80186's read signal (IDA RDB) and its enable to the Terminal Port Interface (BPA MCSO).

On remote write accesses the Write Data Buffer enables data onto the 8344 local bus. This buffer's tri-state enable is controlled by an AND'ing of the 80186's write signal (IDA WR) and the 8344's CCOA REMOTE signal.

The 8344 powers up with the remote interface timing set up for Buffered Read and Slow Buffered write (RIC 5:3 set to 000). This presents a problem for the interface timing even though the code will change this on its first write to the RIC register. The 8344 requires a hold time of 15 nsec on a Buffered Write from the trailing edge of the remote processor's write signal. This requirement could not be met simply because data is valid on the bus for less than 15 nsec after IDA WRITE is de-asserted. To get around this, a small work around circuit 417 (FIG. 10B [FIG. 10A]) is used. This circuit is made up of an F74 and a number of discrete gates. It generates the input write signal to the 8344, CCOA REMWR, such that it is asserted when the 80186's write signal (IDA WR) is first asserted, but is de-asserted when the 8344 designates the cycle is complete (when CCOA READY is asserted). Therefore it is de-asserted well before IDA WR is de-asserted, i.e. well before the data is disabled off the local bus. So the data is valid on the local bus long after the write signal to the 8344 is de-asserted and the hold time specification is met.

A 15 nsec 2OL10B PAL 418 (FIG. 10D [FIG. 10E]) is used to perform the address decode for the 8344's local bus. The inputs and outputs of the PAL are described below:

Inputs:
CCOA A15:00—output of the Address MUX'es. The 8344's address lines on a local access or the 80186's lower order 16 address lines on a remote access.

CCOA WRITE—the 8344's write signal. This controls the write access timing on both local and remote accesses.

Outputs:
CCOB MX CS—MUX Register Chip Select. This signal is asserted when a write operation occurs to address FFF0. This signal is used as a write signal to the Mux Register.

CCOB CS REG—Chip Select Register. This signal is asserted when the address is in the range FFF0-FFF2 which is the area reserved for 8344 CSR'S. The inverse of this signal is used to enable the DMEM transceiver.

The 8344 Instruction Memory (IMEM) 252 (FIG. 10G [FIG. 10E]) is made up of two 8K×8 45 nsec static RAMs organized as 8K×16. The 8344's thirteen least significant instruction address lines drive the address pins with the data pins tied to the sixteen bit instruction data bus. The next highest address line, CCOA IA13, is tied to a No Connect pin on the devices to allow for extensibility. The chip selects on the RAMs are pulled to their asserted state and the write pin is driven by the 8344's instruction write signal (CCOA IWR). The output enable pins on the RAMs are driven by a gate that uses an output of the RIC Shadow Register (80186 CSR). There is no 8344 instruction memory read signal. This gating and the Shadow Register itself are present to avoid a contention problem in the timing of the 8344's writes to its IMEM.

When the 8344 writes to IMEM (pass-through write from the 80186 BPP) it asserts IWR and then 0 nsec later asserts data onto the bus. This doesn't allow any time for the RAMs to turn off their output drivers. To avoid this contention the work around was used to insure that the RAMs output enables were turned off well before performing an instruction memory write. The premise the circuit works under is that a remote processor can only write the 8344's IMEM while the 8344 is stopped. By keeping a copy of the 8344's Start bit in the Shadow Register we know when this is the case. The work around provides the function such that while the 8344 is stopped, and it is not a command access, and it is an 80186 write cycle, then the output enable pins are de-asserted (this is the only time they are de-asserted). This will disable the RAMs output drivers on a write to IMEM.

The 8344 Data Memory (DMEM) 254 (FIG. 10D [FIG. 10C]) is made up of two 64K×4 35 nsec static RAMS. The devices used do not have Output Enable pins therefore an F245 tri-statable transceiver is used to enable them on the bus. The RAMs are always Chip Selected and their Write Enable input is driven by the 8344 write line (CCOA WRITE). The direction on the transceiver is also controlled by this write signal with a two gate delay. This delay is used to control the timing to avoid contention between the RAMs and the transceiver. The enable on the transceiver is controlled by a gating of the 8344 read signal (CCOA READ), the 8344 write signal (CCOA WRITE), and the Chip Select Register signal output of the Address Decode PAL.

The MUX Register 258 (FIG. 10D [FIG. 10C]) controls how four coax interfaces are multiplexed to one 8344. The 8344 has one set of transmit signal pins and one receive signal pin. The 8344 can write the MUX Register to control which port it transmits on and which port it receives on. The bits of the MUX register are detailed below:

5:4 RCV—00 indicates that Terminal port 0 (coax connector 1) is selected for receiving. 01 indicates that Terminal port 1 (coax connector 2) is selected for receiving. 10 indicates that Terminal port 2 (coax connector 3) is selected for receiving. 11 indicates that Terminal port 3 (coax connector 4) is selected for receiving.

3:0 TXEN—0000 indicates that no Terminal port is selected for transmitting. 0001 indicates that Terminal port 0 (coax connector 1) is selected for transmitting. 0010 indicates that Terminal port 1 (coax connector 2) is selected for transmitting. 0100 indicates that Terminal port 2 (coax connector 3) is selected for transmitting. 1000 indicates that Terminal port 3 (coax connector 4) is selected for transmitting. Note: All other combinations of TXEN3:0 are undefined.

The Transmit Circuit 228 (FIGS. 11B, 11D, 11F, 11H) [227, FIGS. 11A, 11C, 11E, 11G] consists of four MC3487 drivers and a resistor network whose output is tied to the transmit winding of the appropriate transformer. The drivers are driven by the 8344 transmit signals Data (CCOA CO)MA) and Data Delay (CCOA COXDD) and enabled by the appropriate TXEN from the MUX Register. The Data signal represents the Manchester Encoded data and the Data Delay signal is a quarter bit time delayed version of this signal. The true and inverted versions of these two signals are driven into a resistor network. The reason for the delayed signal and the register network is to create the quarter bit time preemphasis required by the 3270 protocol.

The Receive Circuit 420 (FIGS. 113, 11D, 11F, 11H) [419, FIGS. 11A, 11C, 11E, 11G] is made up of two MC3430 comparators and their associated discrete passive circuit elements, and a Data Extraction Circuit (FIG. 10D [FIG. 10E]) that performs the digital MUX'-ing of the four ports and some data recreation.

Each comparator receives one side of the receive winding from a center tapped transformer that is referenced to ground and its output is a TTL level signal. The output of one of the comparators represents the positive pulse train of the original signal and is designated CXP while the output of the other comparator is the negative pulse train designated CXN. A register network provides a threshold of 40 mvolts that the input signals are referenced to. Since each output of the transformer is effectively divided by two with respect to the original amplitude, this translates to a coax signal that must have positive and negative swings of a minimum of 80 mvolt. The circuit also provides about 20 mVolt hysteresis through a positive feedback loop so after the initial pulse a signal of 60 mvolt amplitude will be received.

The Data Extraction Circuit provides the multiplexing of the four Terminal ports into the receive signal that drives the 8344's receiver input. This circuit includes a Dual Rank Synchronizer circuit 292 (FIG. 10D [FIG. 10E]) and a 16L8 25 nsec PAL 425. The Synchronizer provides a two clock delayed version of the CXP outputs of the comparators and is made from an F273. The PALs inputs are the positive comparator outputs (CXP4:1), the negative comparator outputs (CXN4:1), the delayed signals (SCXP4:1), and the two receive select outputs of the MUX Register (RCV). The PAL, and an associate NAND gate, output the received signal to the 8344 which represents the recreated version of the signal received on the line that is selected by RCV.

The recreation of the signal is an attempt to alleviate the clipping effect of the Comparator Circuit that causes the received positive and negative signals to have shrunken pulses. This effect is due to the thresholds in the Comparator Circuit. The input signal will only be passed while its amplitude is greater than 60 mvolt. This is of little effect on a square wave signal of magnitude much greater than the threshold, but becomes significant when the signal is a Sine wave with an amplitude approaching the threshold (which is exactly the case for a signal at the end of a long length of coax). The part of the signal swing that is above the threshold may be a good deal less than the actual pulse width. The PAL attempts to resolve this problem by adding the part of the pulse that is lost, from the zero crossing to the positive threshold, back into the positive signal which is all the 8344 sees. This is accomplished by Or'-ing the input CXP signal of the port selected with the two clocked delayed version of this signal but negating the CXN signal is asserted. The equation for this method used is illustrated in FIG. 11J. The mathematical is:

[CXP+SCXP]& /CXN where + indicates the logical OR function, & indicates the logical AND function, and / indicates logical negation. This function should extend the CXP signal from one to two 53 nsec clocks (variation due to asynchronisity of the sampling of the signal by the Synchronizer) or until the CXN signal is asserted, whichever comes first.

The CCU Interface is a super-set of the Terminal Interface. Therefore, the discussion below describes only the differences between the two. These differences include: two added CSR'S, two more decoded selects for these CSR'S, a more complicated Receive Circuit, and the pass-through circuit.

Figures 1, 10A:
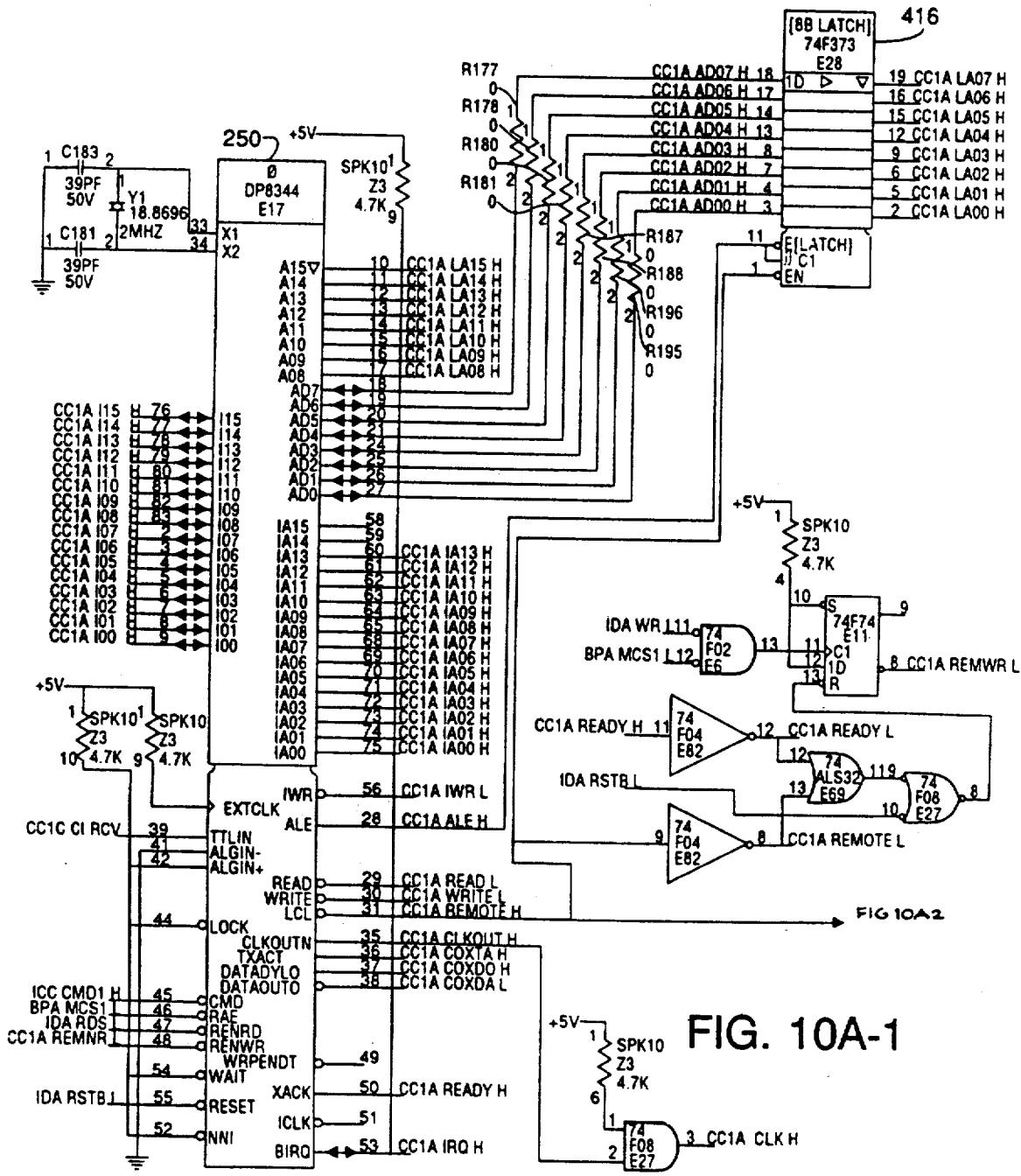
FIGS. 10A through 10G are electrical schematics of the two BCP's and their digital support circuitry.
Figures 2, 10A:
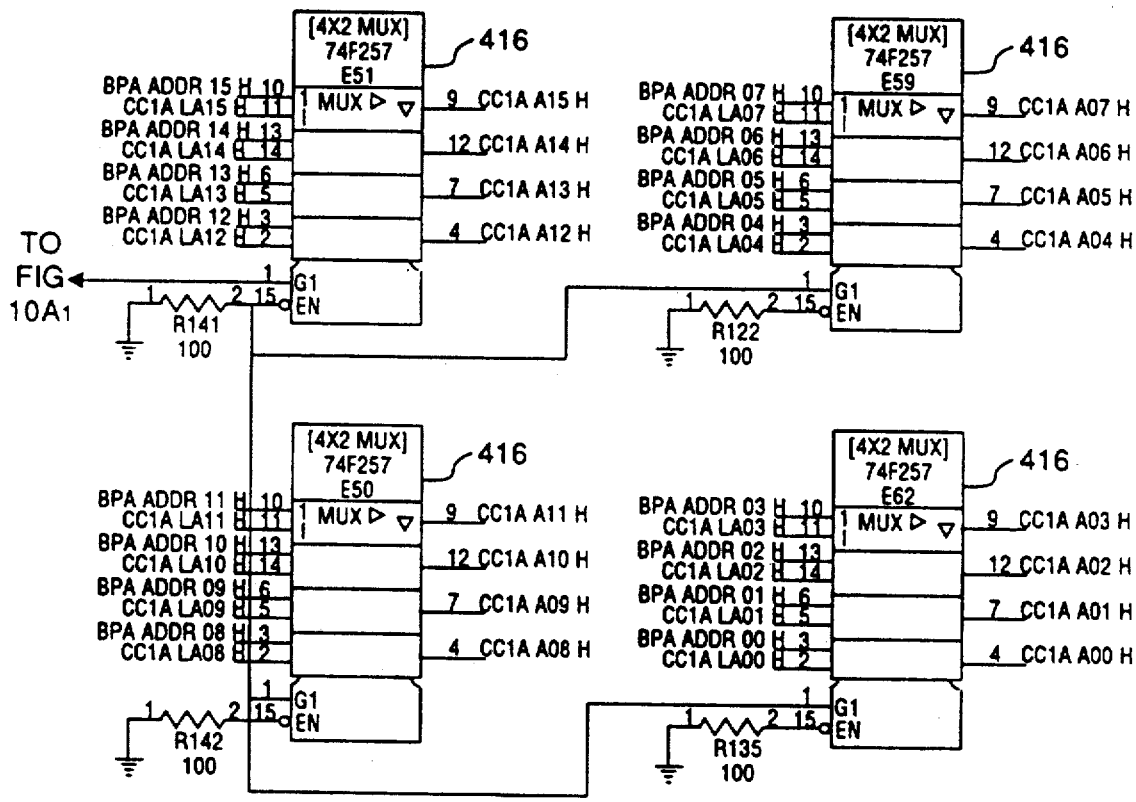
Figures 1, 10B:
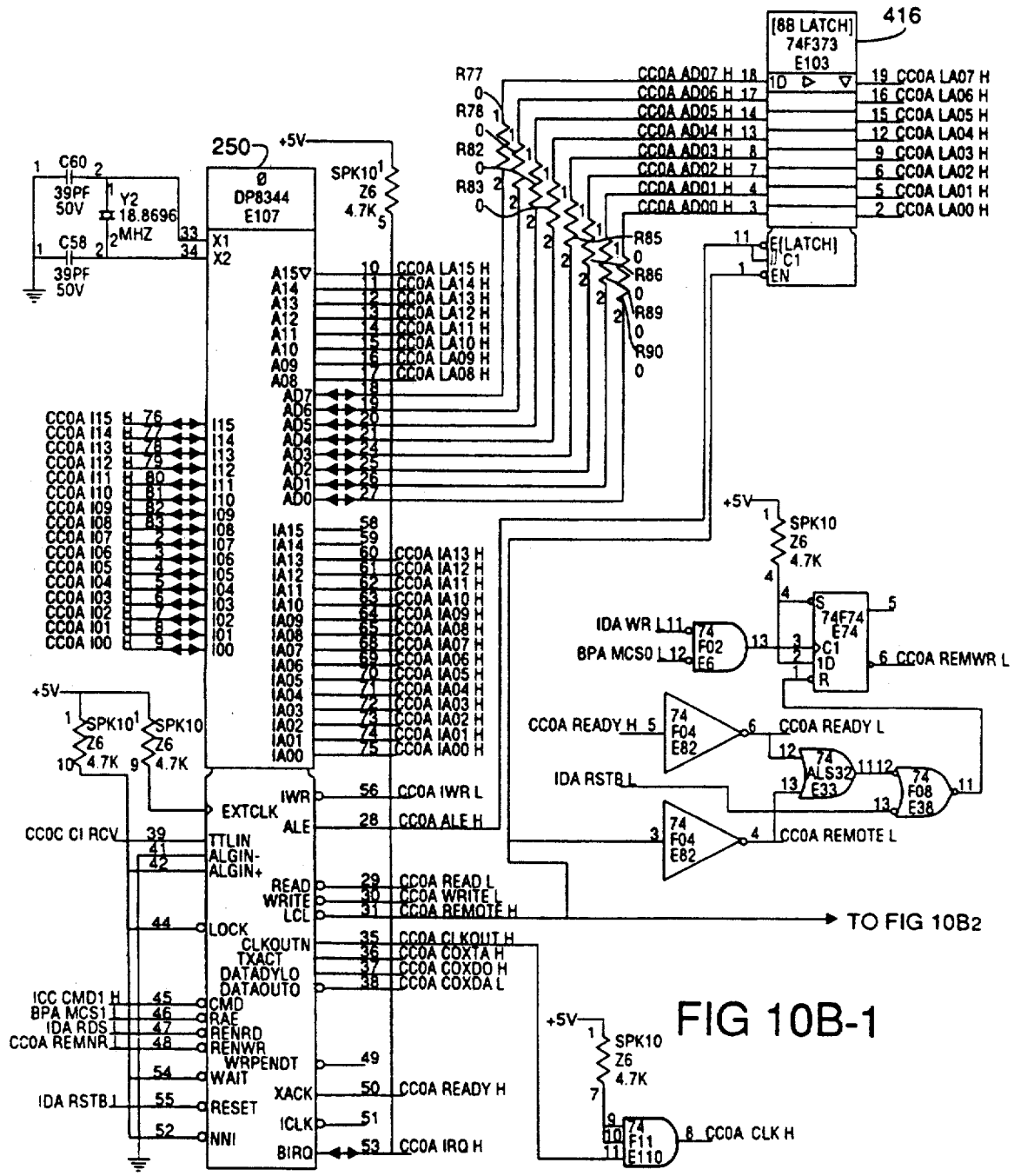
Figures 2, 10B:
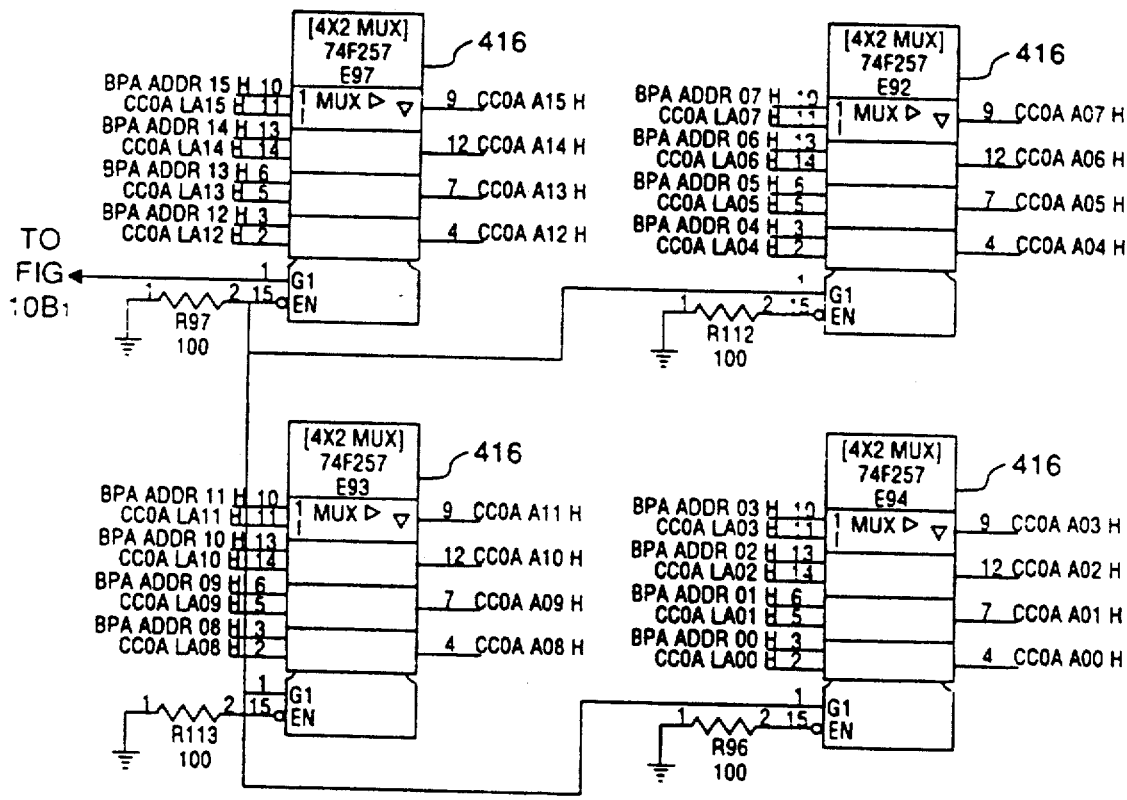
Figures 1, 10C:
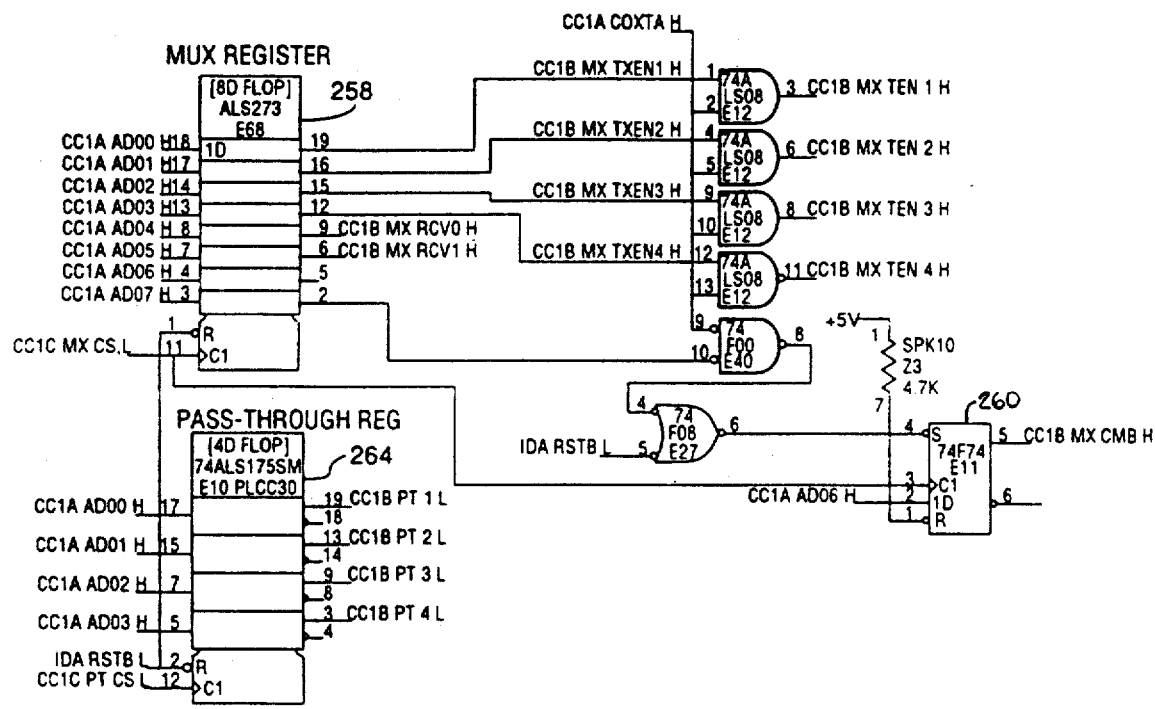
Figures 2, 10C:
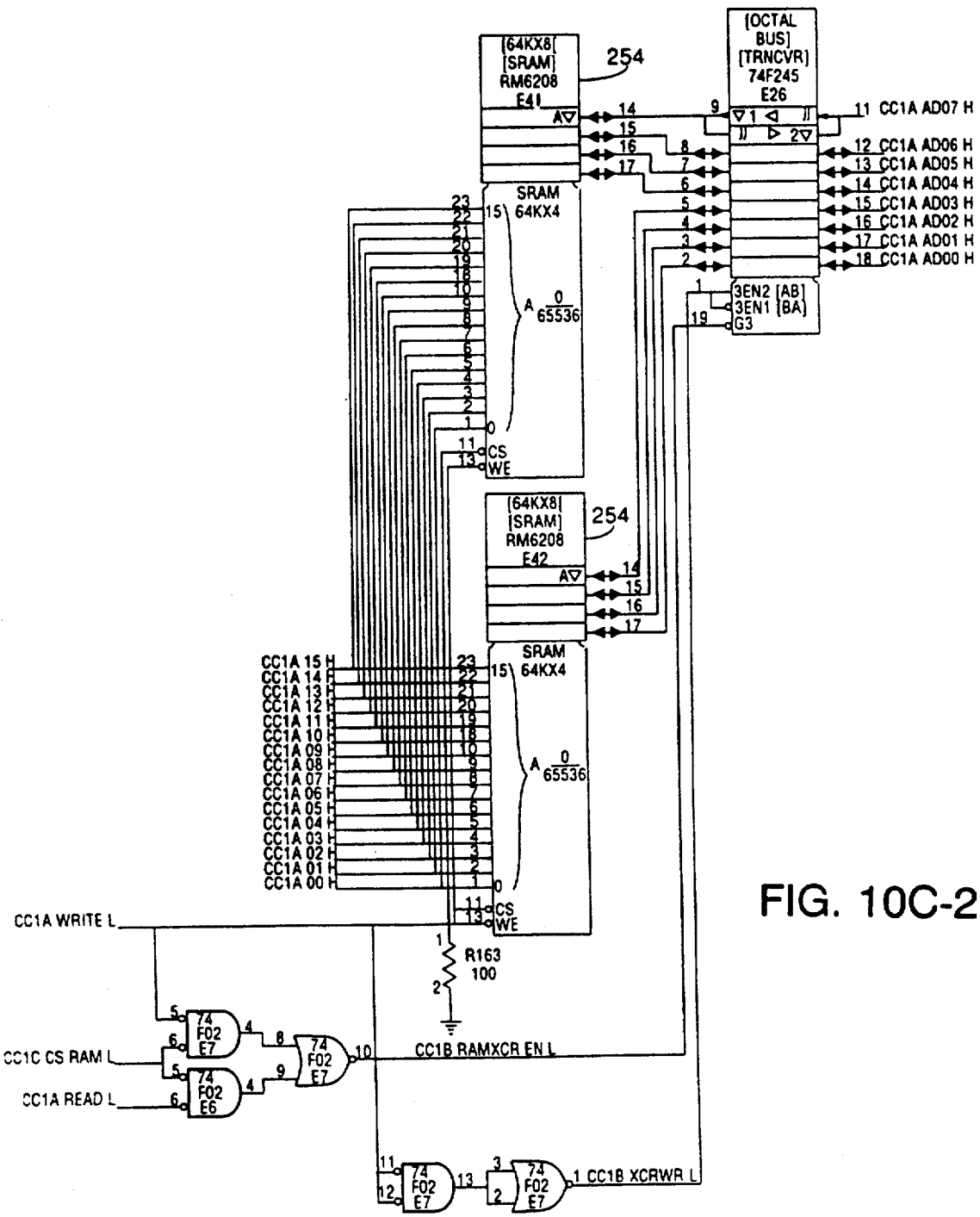
Figures 1, 10D:
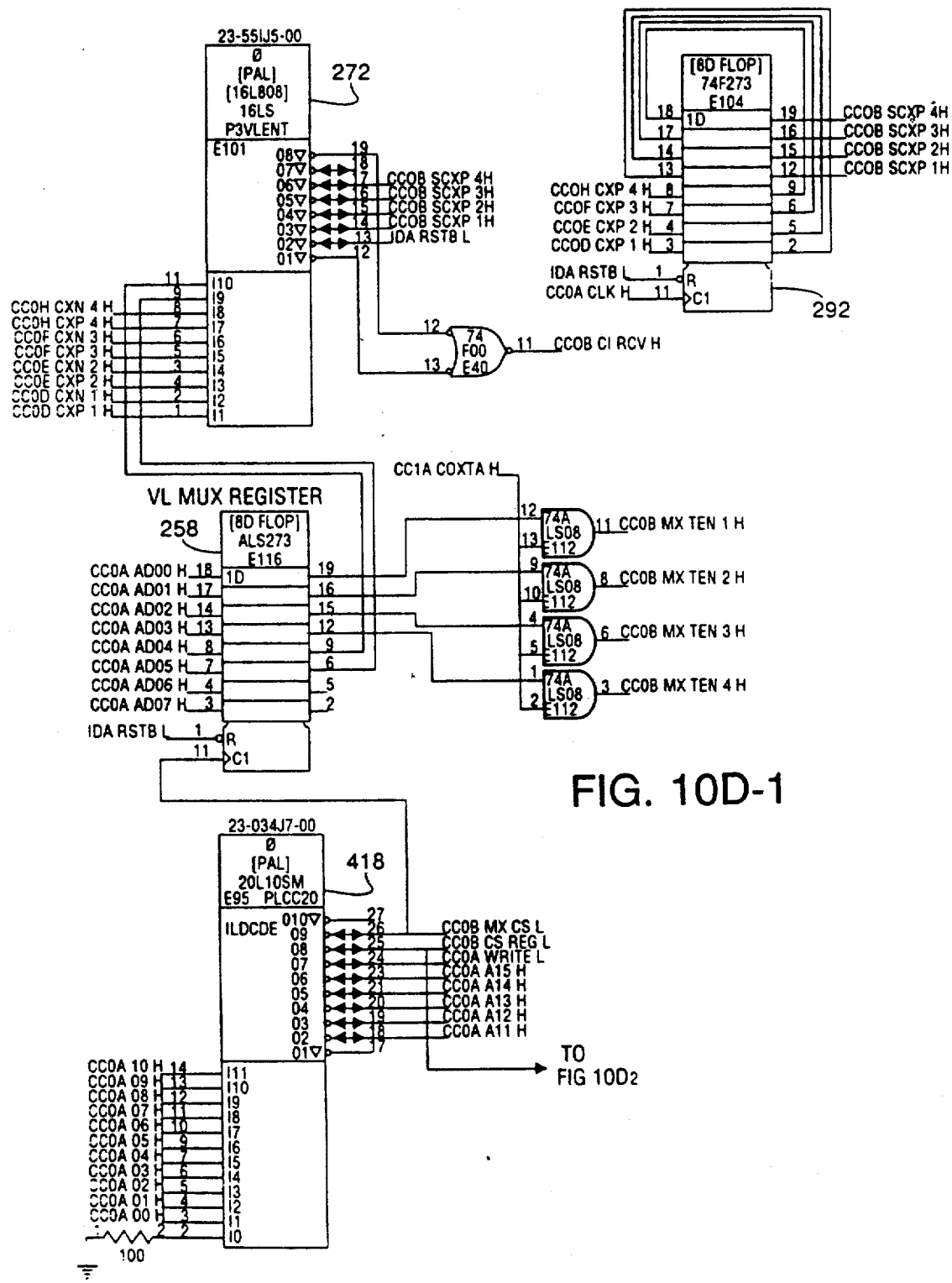
Figures 2, 10D:
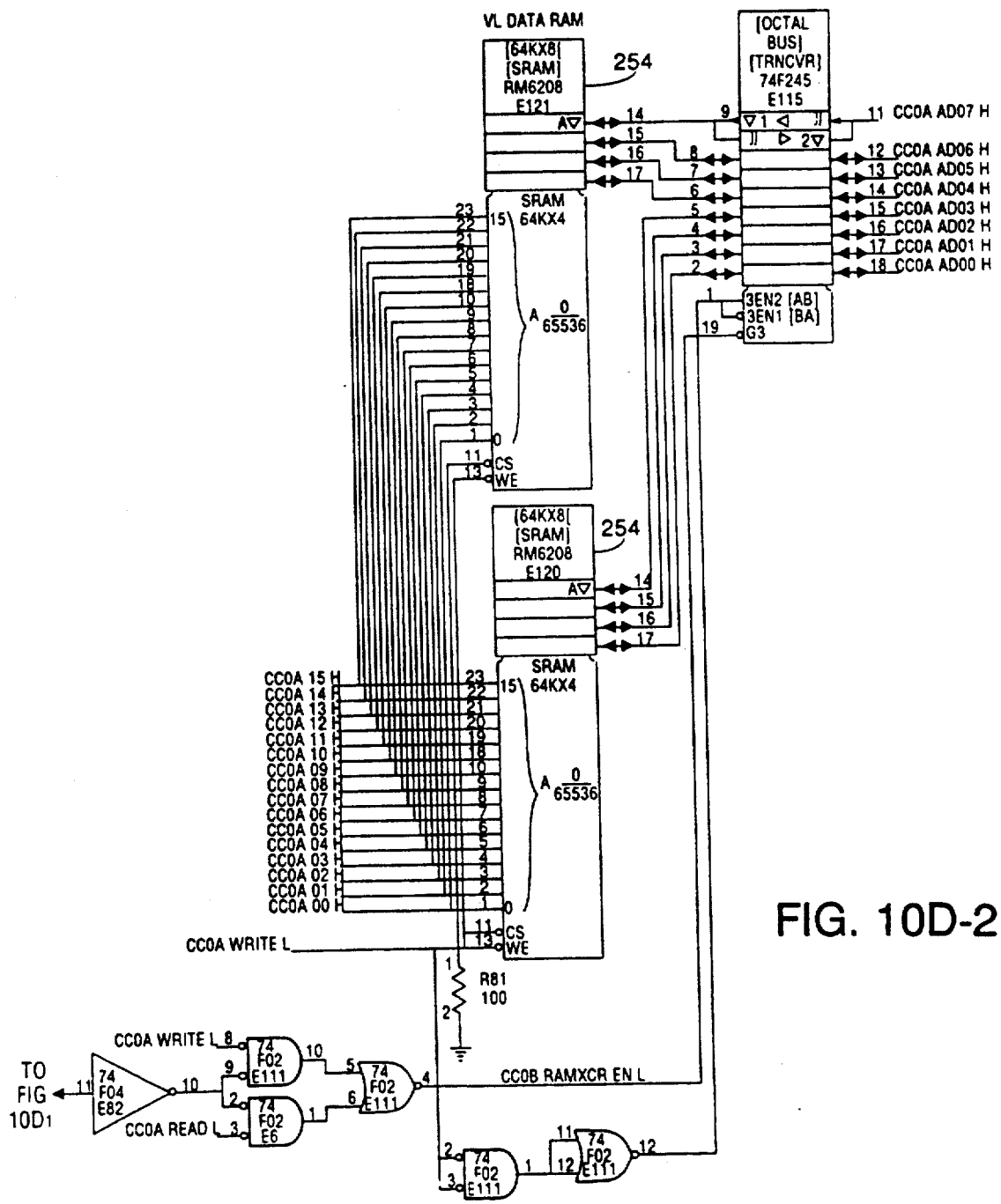

The address decode PAL for the CCU Port Interface 418 (FIG. 10E) has two more outputs than that of the Terminal Port Interface (FIG. 10D). These additional outputs are needed for selects to the two additional CSR'S. The inputs and outputs of the PAL are described below. Inputs:

CCLA A15:0—output of the Address MUX'es. The 8344's address lines on a local access or the 80186's lower order 16 address lines on a remote access.

CC1A WRITE—the 8344's write signal. This controls the write access timing on both local and remote accesses. Outputs:

CCLC MX CS—MUX Register Chip Select. This signal is asserted when a write operation occurs to address FFF0. This signal is used as a write signal to the MUX Register.

CCLC IA CS—Input Address Register Chip Select. This signal is asserted when the address equals FFF1. This signal, gated with the read signal, is used to enable the Input Address Register onto the bus.

CCLC PT CS—Pass-Through register Chip Select. This signal is asserted when the address equals FFF2. This signal, gated with the read signal, is used to enable the pass-through register onto the bus.

CCLC CS REG—Chip Select Register. This signal is asserted when the address is in the range FFF0-FFF2 which is the area reserved for 8344 CSR'S. The invert of this signal is used to enable the DMEM transceiver.

The MUX Register 258 (FIG. 10C) controls how four coax ports are multiplexed to one 8344. The 8344 has one set of transmit signal pins and one receive signal pin. The 8344 can write the MUX register to control which port it transmits on and which port it receives on. The CCU Port Interface Receive Circuit is different in the fact that it has to receive unsolicited transmissions from the CCU. The CCU Port Interface has no way of knowing which port a signal will be received on next. Therefore, the CCU Port Interface Receive Circuit has two modes of operation, a Combined Mode and an Uncombined Mode. In the Combined Mode the Receive Circuit will OR together each of the CXP outputs from the comparators of the four ports. In this mode the RCV bits are ignored. When the hardware specifies which line is active through the Input Address Register, the 8344 can then put the circuit into Uncombined Mode and specify the proper RCV bits that corresponded to the port number it read from the Input Address Register. The Receive Circuit will now act like a MUX and only pass the signal from the port specified.

The fact that the CCU BCP can put the Receive Circuit in Uncombined Mode gives it the ability to run as a Terminal Port Interface. In this way, if the code loaded into the CCU BCP always keeps the interface in Uncombined Mode, the board can be setup to run in Terminal Only configuration. The bits of the MUX register are detailed below:

7 CMB AUTOSET—0 disables the hardware from being able to set the Combined bit. Must be 0 to run in Terminal only configuration. 1 enables the hardware to automatically set the Combined bit when the 8344 transmitter is active. The Combined bit will be forced asserted while the 8344 is transmitting and will stay asserted until the 8344 de-asserts it by writing this register.

6 CMB—0 disables the logical combination of the coax receive signals. Must be 0 to run in Terminal Only configuration. 1 enables the logical combination of the coax receive signals.

5:4 RCV—00 when CMB low, indicates that CCU port 0 (coax connector 5) is selected for receiving. 01 when CMB low, indicates that CCU port 1 (coax connector 6) is selected for receiving, 10 when CMB low, indicates that CCU port 2 (coax connector 7) is selected for receiving. 11 when CMB low, indicates that CCU port 3 (coax connector 8) is selected for receiving.

3:0 TXEN—0000 indicates that no CCU port is selected for transmitting. 0001 indicates that CCU port 0 (coax connector 5) is selected for transmitting. 0010 indicates that CCU port 1 (coax connector 6) is selected for transmitting. 0100 indicates that CCU port 2 (coax connector 7) is selected for transmitting. 1000 indicates that CCU port 3 (coax connector 8) is selected for. transmitting. Note: All other combinations of TXEN3:0 are undefined.

The Input Address Register 262 (FIG. 10F) is an 8 bit read only register that specifies the line number of the port that the Receive Circuit last determined was active. The bits of the register are detailed below:

1:0 IA—00 CCU port 0 (coax connector 5) is active or was the last active port. 01 CCU port 1 (coax connector 6) is active or was the last active port. 10 CCU port 2 (coax connector 7) is active or was the last active port. 11 CCU port 3 (coax connector 8) is active or was the last active port. Note: Bits 7:3 are always zero.

The pass-through register 264 (FIG. 10C) is a 4 bit write only register that controls the state of the pass-through switches. Writing a 0 to a bit "closes" the switch for the corresponding port pair. The bits of the register are detailed below:

3 PT3—0 closes the pass-through switch between coax connectors. 1 opens the pass-through switch between coax connectors.

2 PT2—0 closes the pass-through switch between coax connectors. 1 opens the pass-through switch between coax connectors.

1 PT1—0 closes the pass-through switch between coax connectors. 1 opens the pass-through switch between coax connectors.

0 PT0—0 closes the pass-through switch between coax connectors. 1 opens the pass-through switch between coax connectors, Note: Bit 10 of the Diagnostic Register (FORCE PASS) must be a 1 for this register to properly control the pass-through switches.

Figures 1, 10E:
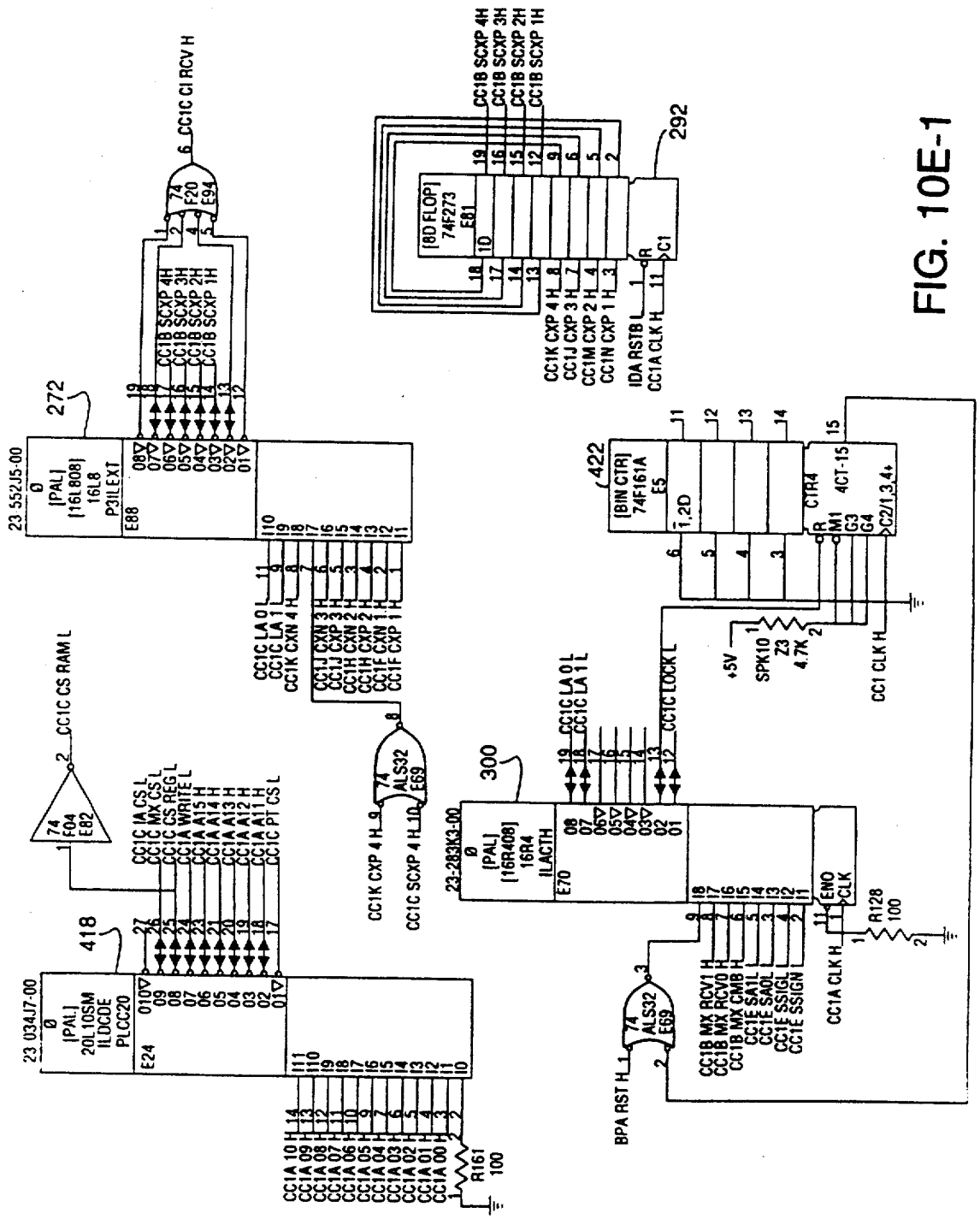
Figures 2, 10E:
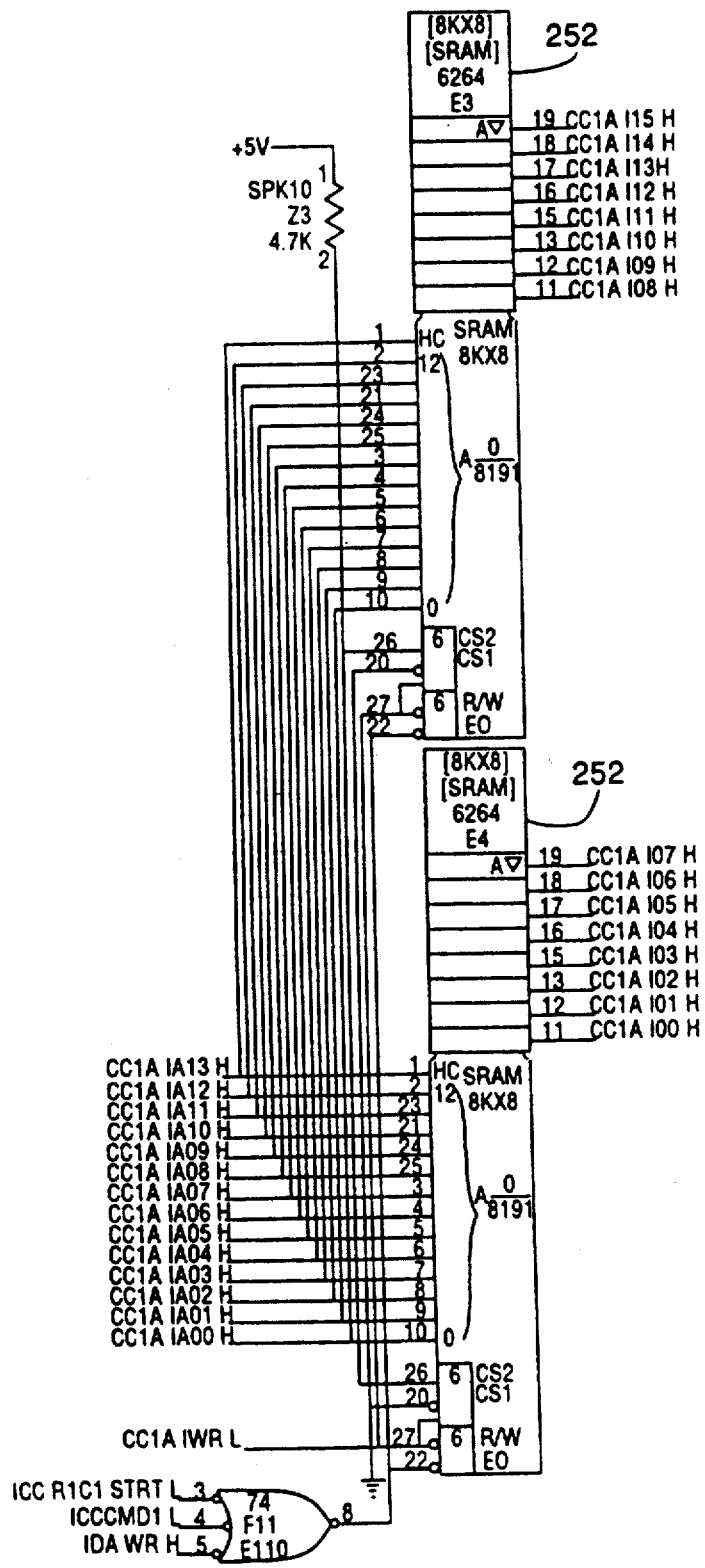

The Receive Circuit for the CCU Port Interface comprises a comparator circuit 419 (FIGS. 11A, 11C, 11E, 11G), an Active Line Detect Circuit (FIG. 10F) and a Data Extraction Circuit (FIG. 10E). The comparator circuit is the same as that for the Terminal Interface.

Figure 10F:
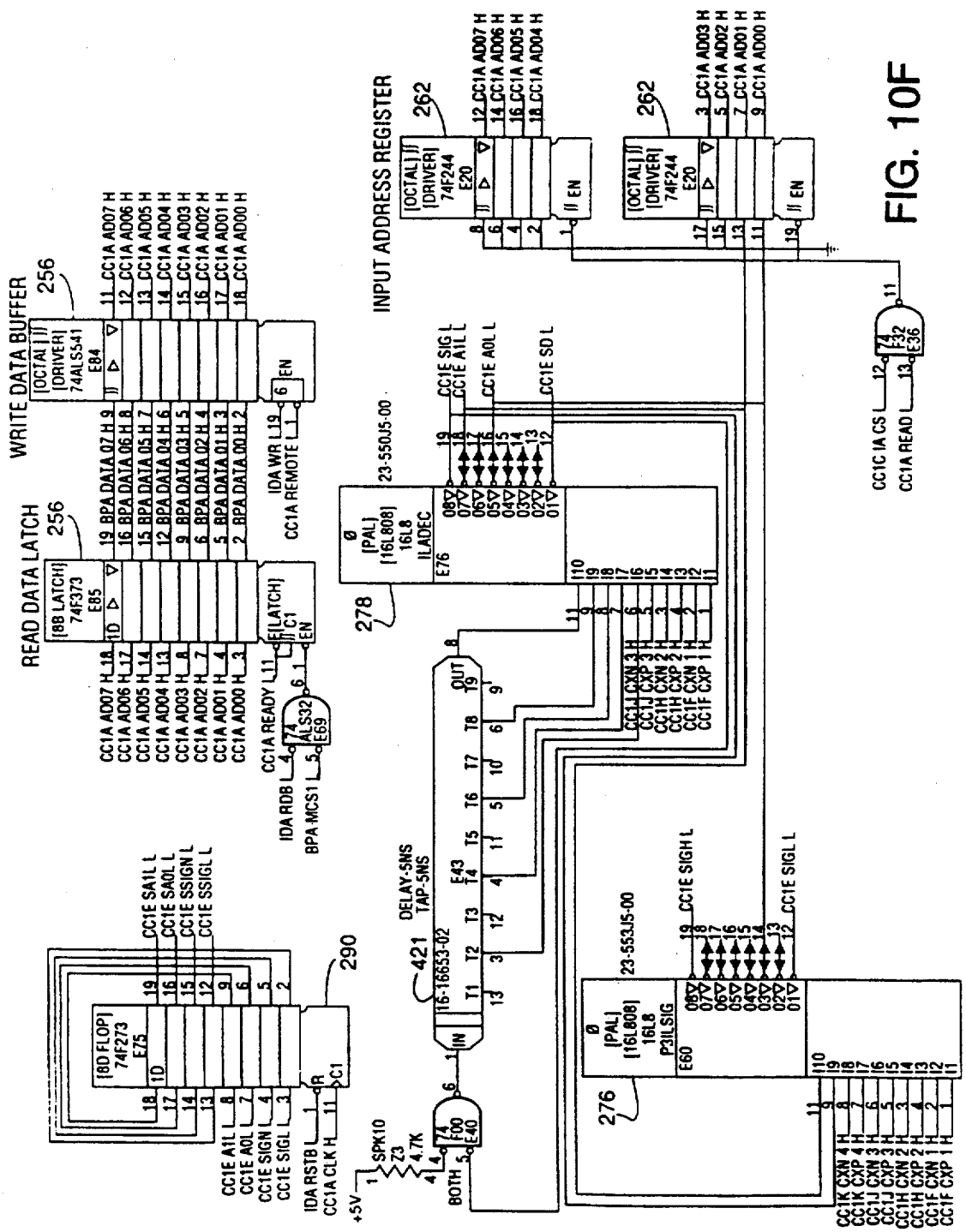
Figure 10G:
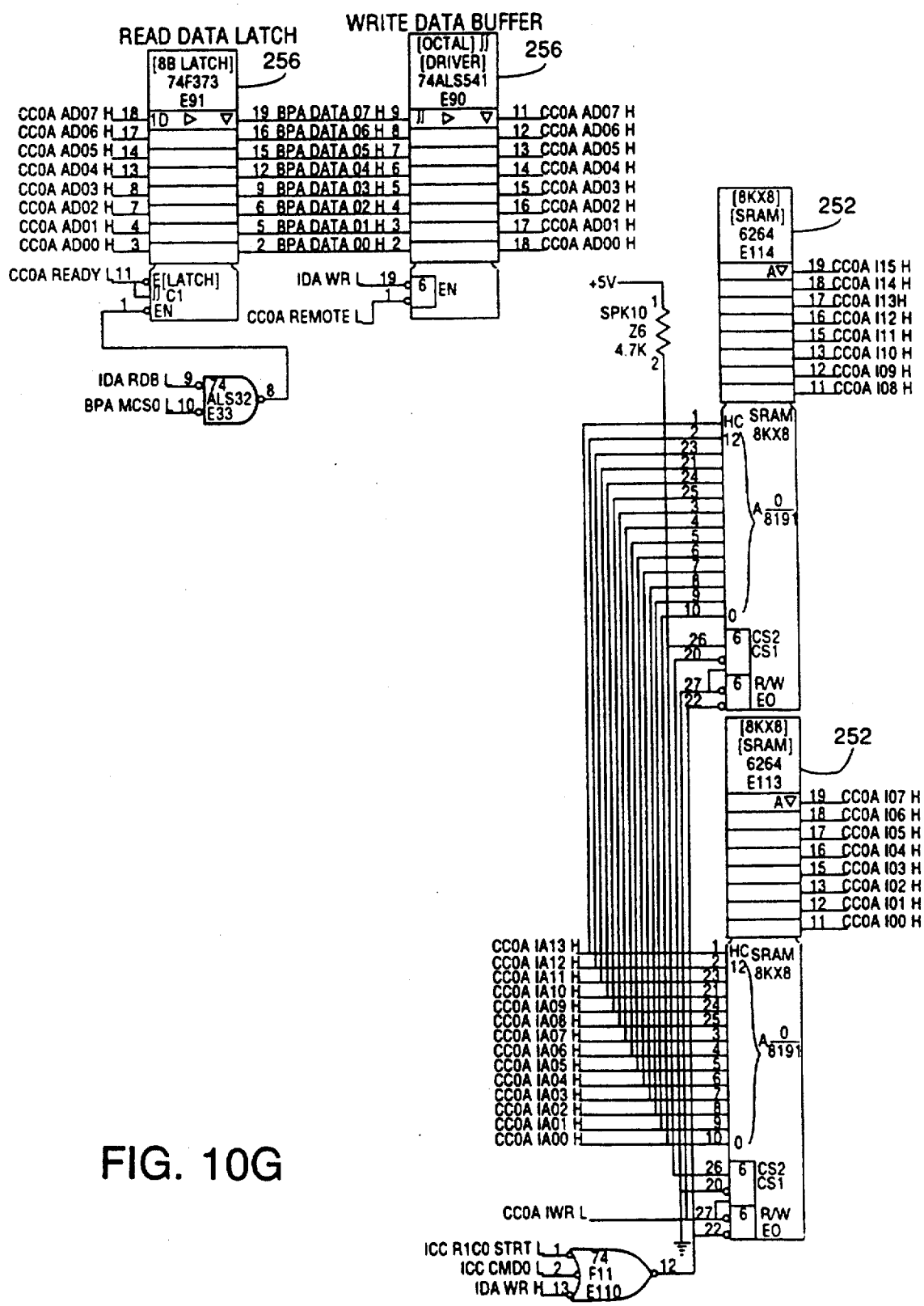

Referring to FIGS. 10E and 10F, the Active Line Detect Circuit performs two main functions: it detects which coax line is active and provides the line number to the 8344 in the Input Address Register, and it provides a hardware Locking mechanism specifying to the Data Extractor to discontinue logically OR'ing the four lines and become a MUX, only passing the line specified. These functions are implemented with three PALS, a delay line 421 and a counter 422.

The PAL 423 designated ILADEC (16L8B) looks at the four CXP signals from the comparators and asserts its output CC1E SD when the first of them is active (if coincident, uses a priority of 0-3 with 0 having the highest). This signal is looped around through a 50 nsec delay line 421 with 10 nsec taps whose outputs are fed back into the PAL. The PAL logic compares the original signal with the delayed versions of the signal. If the original signal and the first tap are both asserted the PAL latches (using cross coupled NOR gates) the address ($\overline{CCLE}$ A1:0) of the active line, which it outputs to the Input Address Register. If the original signal and all 5 of the taps are asserted the PAL considers this to be a good pulse and asserts the output CC1E SIG. In this way, the ILADEC PAL is performing a pulse discrimination function, guaranteeing that a pulse is a minimum of 20 nsec wide before setting the address and a minimum of 50 nsec before passing it on to the rest of the Active Line Detect Circuit.

The PAL 424 designated P3ILSIG (16L8A) looks at the four positive pulse trains (CXP) and the four negative pulse trains ($\overline{CXP}$) from the comparators and also the $\overline{CCLE}$ SIG signal from ILADEC. If $\overline{CCLE}$ SIG is asserted and the CXP line that corresponds to the address bits is asserted the PAL will output $\overline{CCLE}$ SIGH. If $\overline{CCLE}$ SIG is asserted and the CXN line that corresponds to the address bits is asserted and the same CXP line is not asserted the PAL will output CC1E SIGL. In this way, the P3ILSIG PAL is generating positive and negative pulse trains that represent the line that the ILADEC PAL decided was active and had valid pulses.

Figure 18:
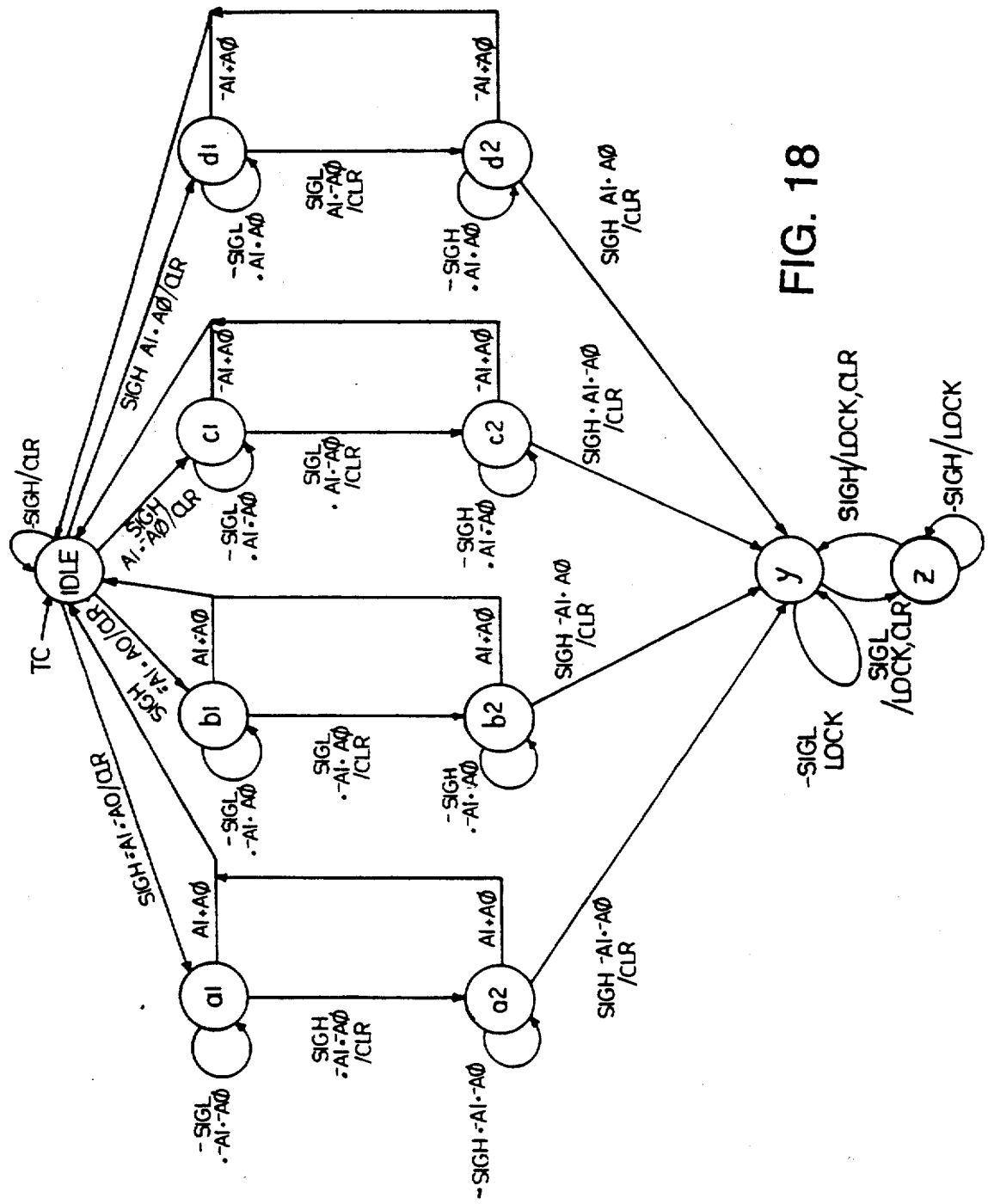
FIG. 18 is a state diagram of a PAL which aids in detecting which port is active.

The PAL 426 designated ILACTH is a sequential PAL that is running at eight times the coax data rate. FIG. 18 sets forth the state diagram for the PAL designated ILACTH. It receives CMB and RCV1:0, as inputs from the MUX Register, and runs in Combined and Uncombined Mode as specified by the CMB bit. It also receives synchronized versions of the address bits (SA1:0) and the pulse trains (SSIGH and SSIGL).

These signals are synchronized by two Dual Rank Synchronizer circuits 290, 292 made from F273's.

In Combined Mode the PAL 426 has a state machine which looks for a valid front end of a 3270 frame. It ignores the first low pulse and then expects a high-low-high pattern. If it sees this pattern, with no time greater than two bit times without a transition, it will assert the outputs LOCK and LA1:0. The LOCK signal represents the fact the it has recognized what it believes is a good frame on the line specified by SA1:0. It specifies this line by passing SA1:0 through to LA1:0. The LOCK signal will continue to be asserted as long as a valid frame is present.

The counter 422 is running at the same rate as the PAL and provides a two bit time count. Whenever the PAL sees a bit transition it resets the counter. Therefore, as long as bit transitions occur more frequently than two bit times the counter will never time out. The 3270 protocol is set up such that a valid frame will always have transitions more often then this. Therefore, if the counter times out, we have either reached the end of the frame or it was an invalid frame. The counter's output resets the state machine causing LOCK to be de-asserted.

If CMB is not asserted (Uncombined Mode) ILACTH PAL automatically asserts LOCK but now passes RCV1:0 through to LA1:0.

The Data Extraction Circuit for the CCU Receive Circuit is very similar to that of the Terminal Receive Circuit. The signal recreation is handled in the same way. The only difference is that here the PAL (P3I-LEXT) OR's all four signals together until the LOCK signal is asserted at which time it becomes a true MUX and just passes the signal that is selected by LA1:0.

Figure 11A:
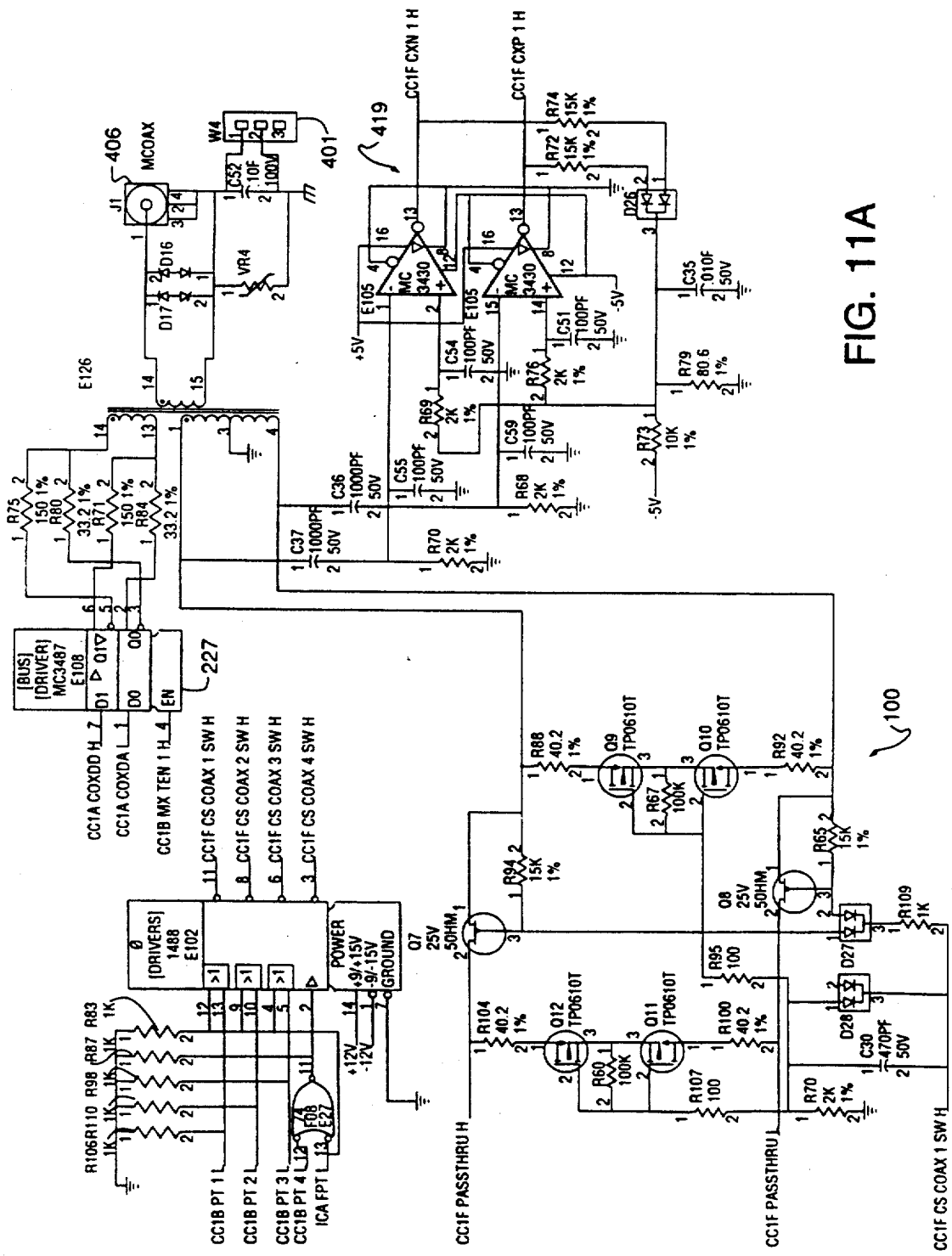
FIGS. 11A through 11I are electrical schematics of the external connections to the invention, including the analog/digital circuitry, pass-through switches, and power connections.
Figure 11B:
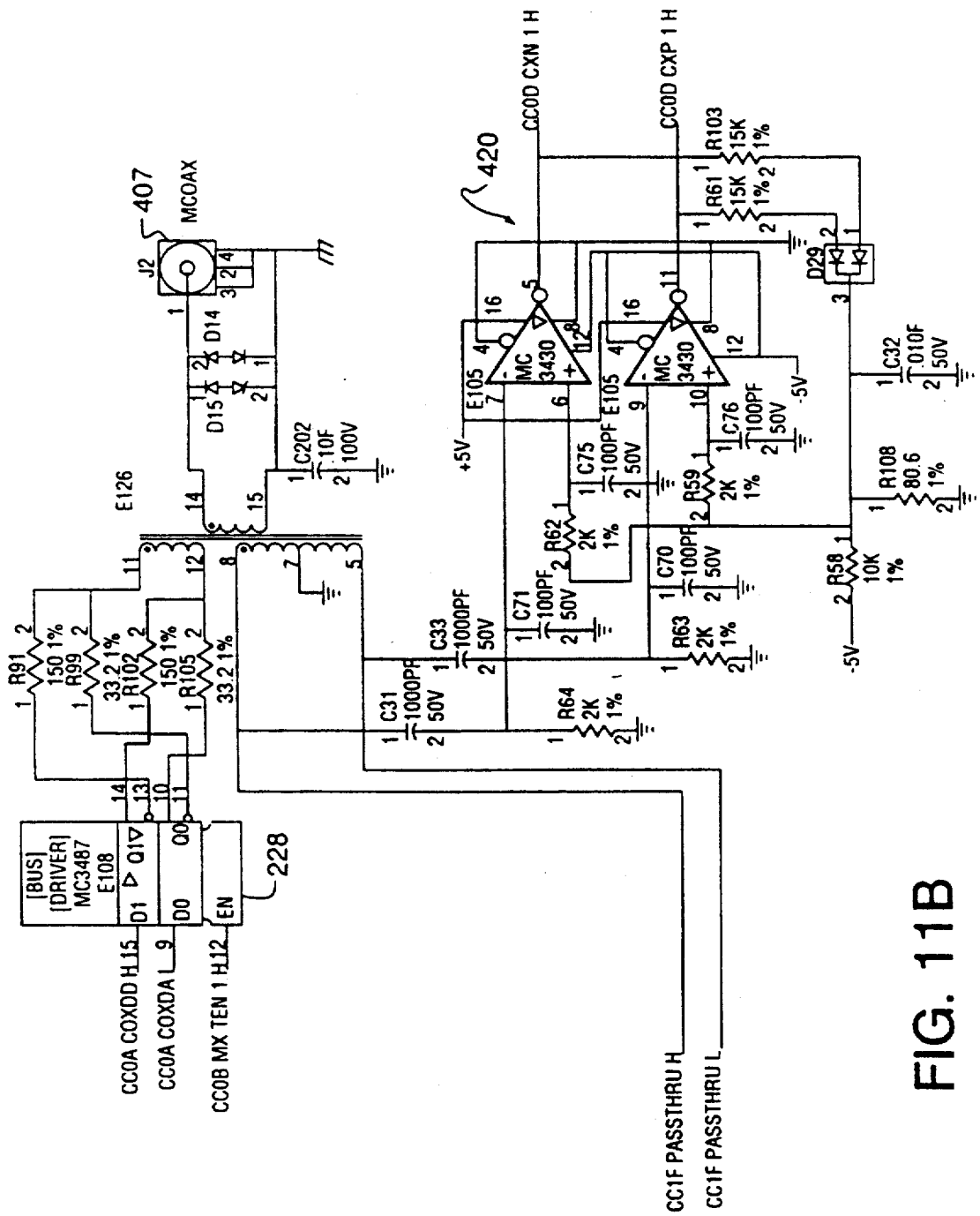
Figure 11C:
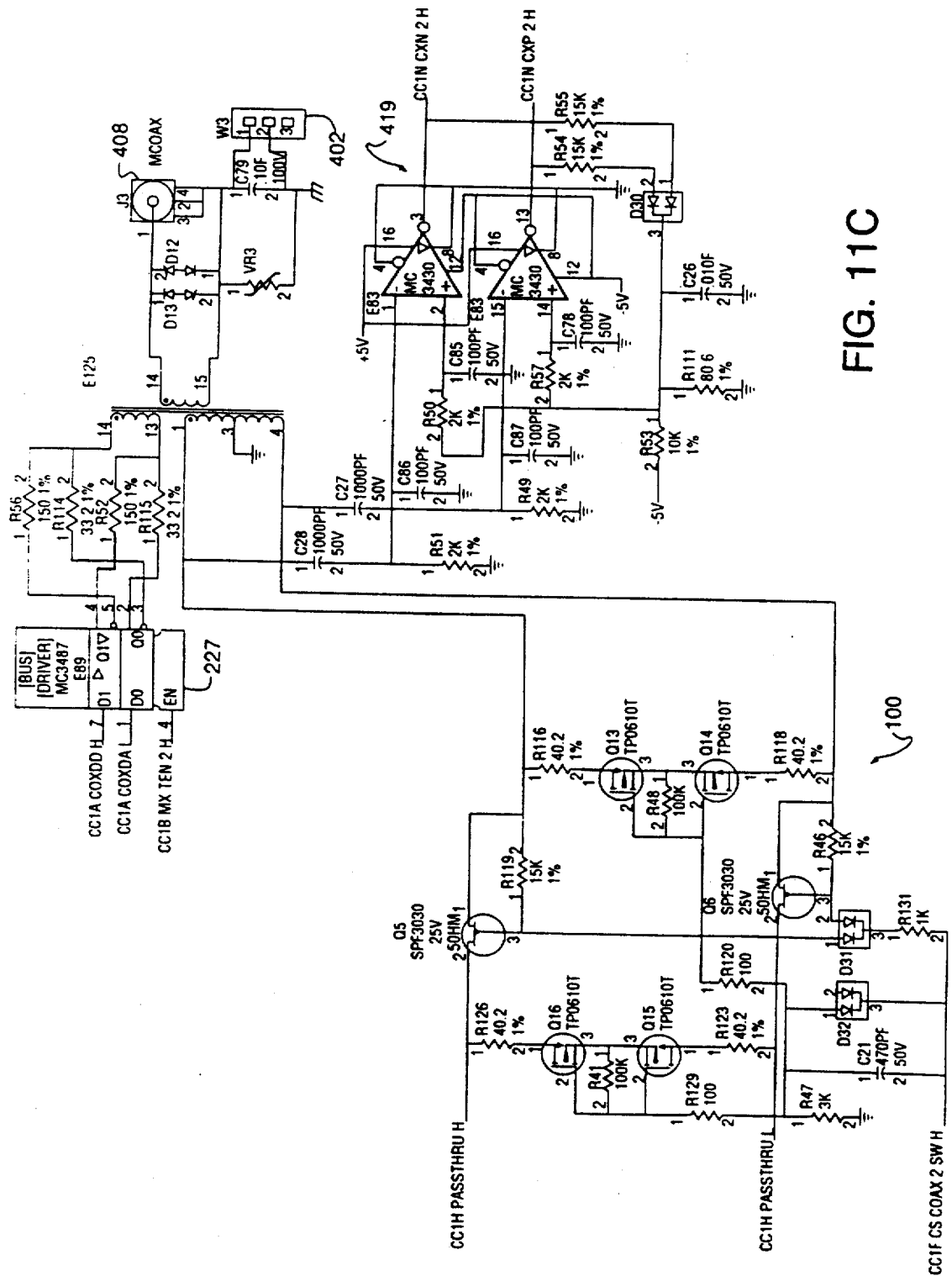
Figure 11D:
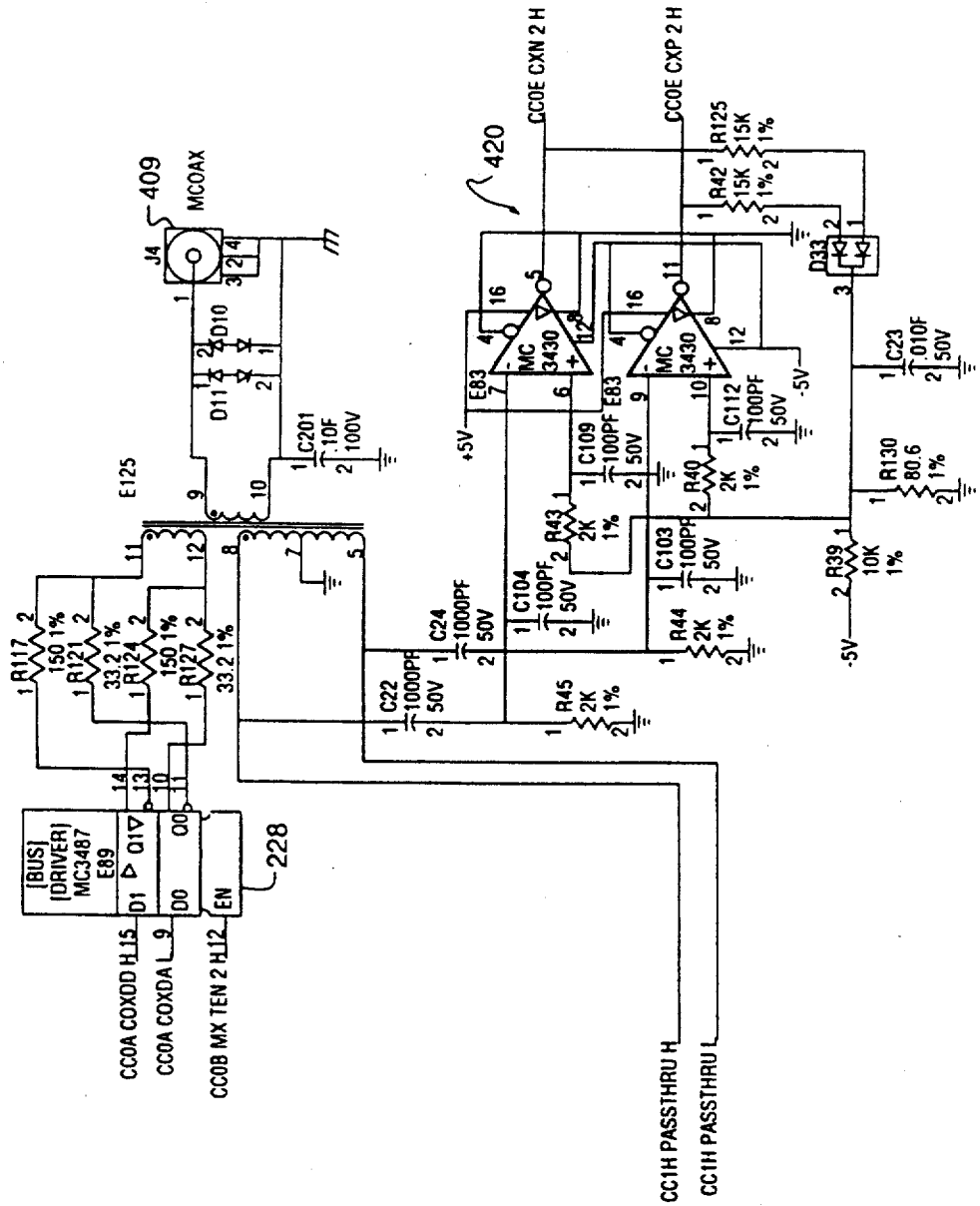
Figure 11E:
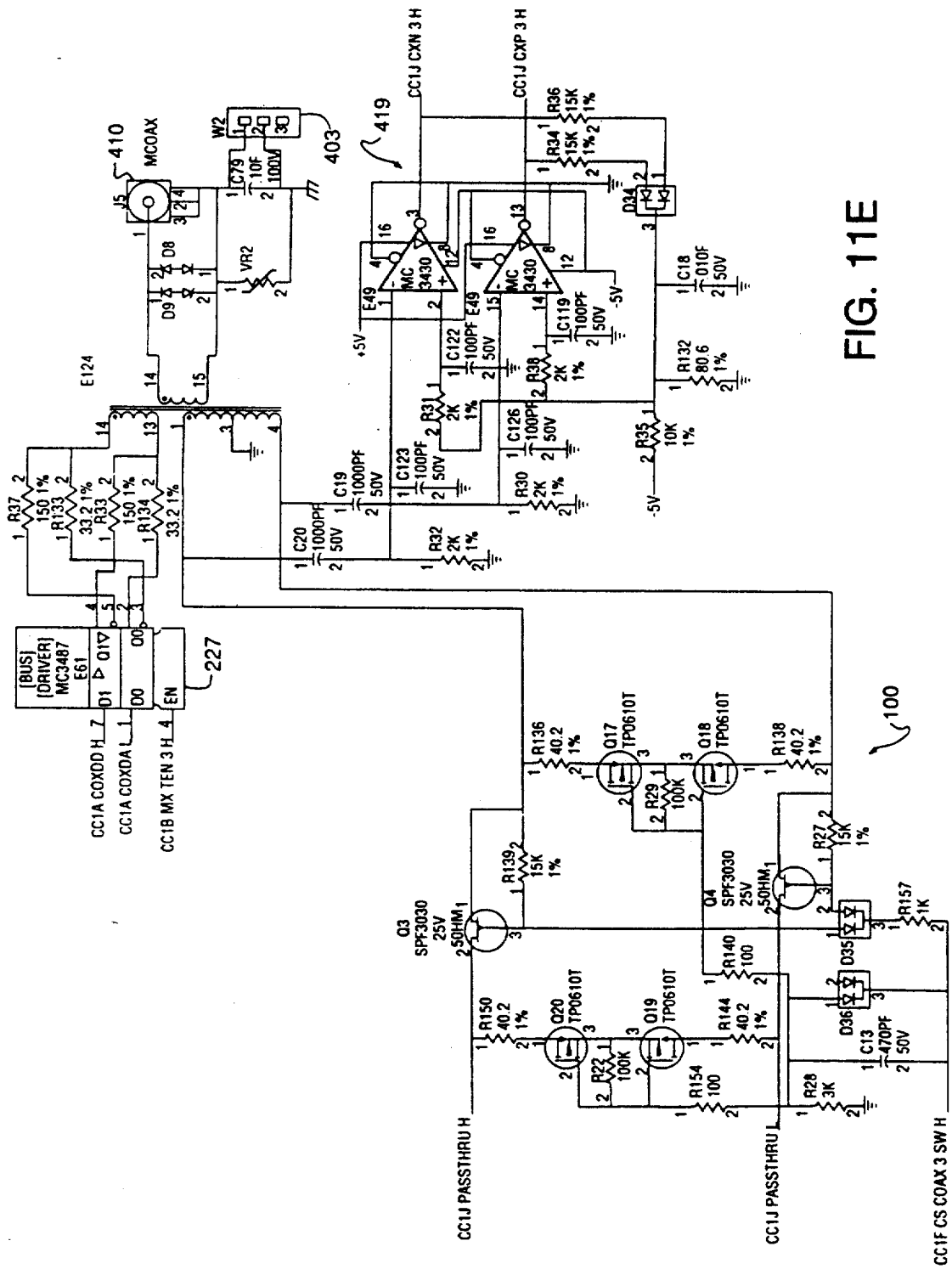
Figure 11F:
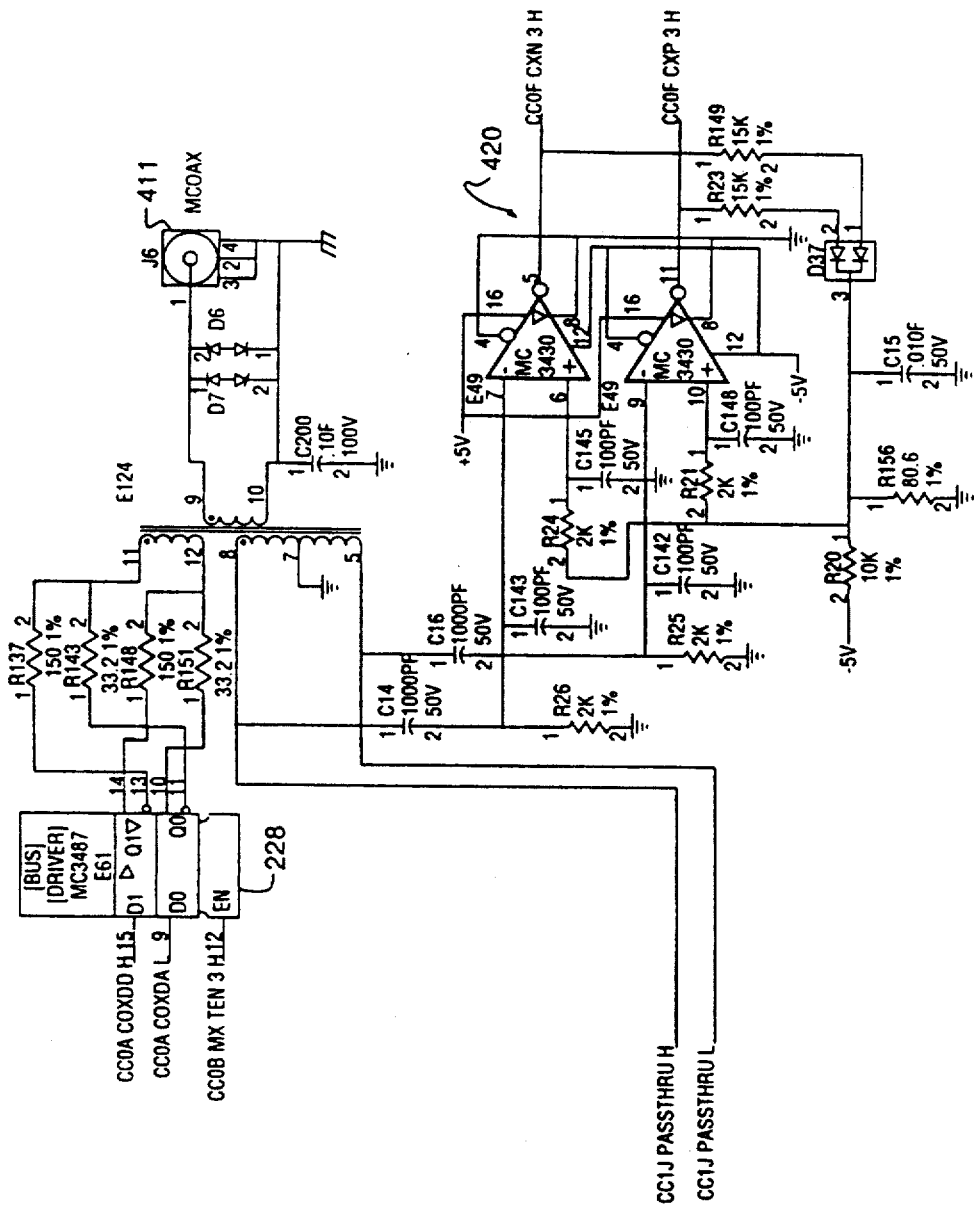
Figure 11G:
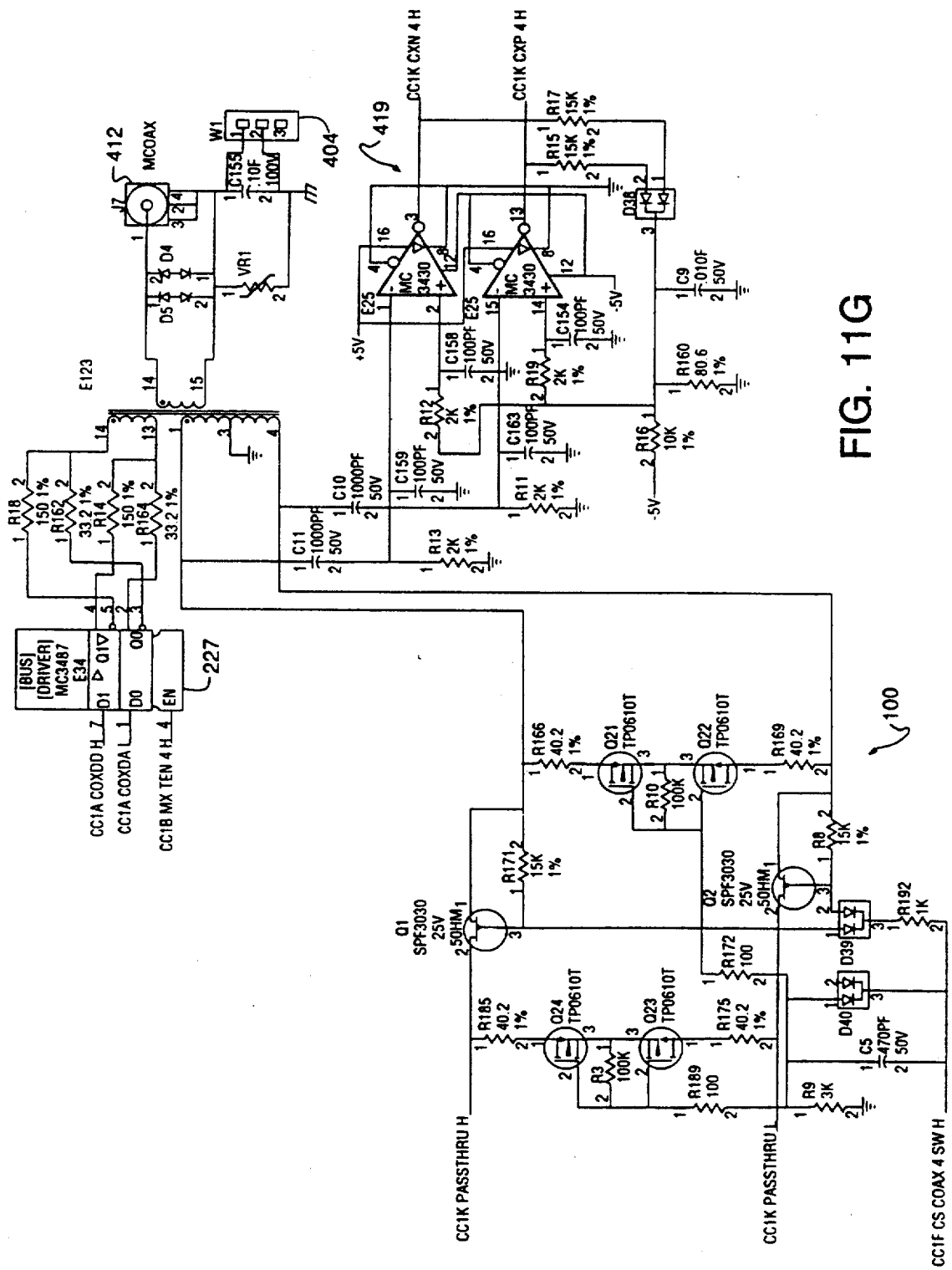
Figure 11H:
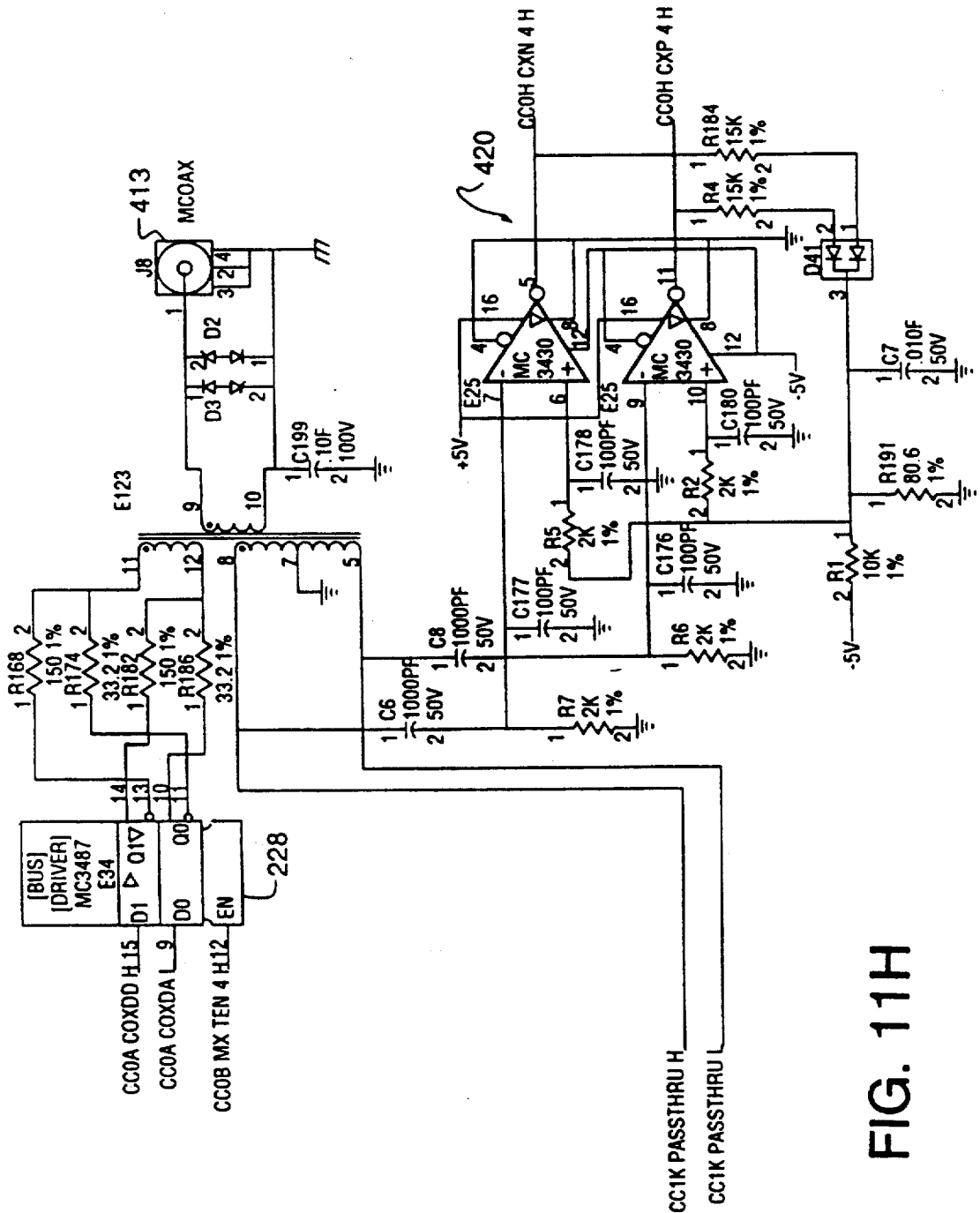

Referring to FIGS. 11A, 11C, 11E, and 11G, the function of the pass-through switch circuit 100 is to provide an electrical connection from a terminal interface to a corresponding CCU interface with a minimum of attenuation, while matching the impedance of the coax. This connection must be controllable by the CC BCP and also must operate while the power is down. To meet this power down requirement, JFET's are used for the electrical connection. The two signals from the receive winding on a CCU interface are connected through the JFET's to the signals on the receive winding of a Terminal interface. The Gate control for these JFET's is provided by a 1488 level translator (FIG. 11A). The outputs from the pass-through register are OR'ed together with the Force Pass signal and drive the 1488. If either is asserted the output of the 1488 swings to +12 Volt. In this state the JFET channel is open and the connection is made. This port pair is said to be in pass-through mode and its pass-through switch is CLOSED. If both the Force Pass signal and the output of the pass-through register are de-asserted the 1488's output swings to −12 Volt and the JFET's channel is pinched off. This port is said to be in VT Mode and its pass-through switch is OPEN.

There are also four MOSFET's per port pair which are used to provide the impedance matching. The same 1488 output signal that drives the JFET's is used to drive the MOSFET's. In pass-through mode the MOSFET's channels are pinched off and the circuit does not terminate the line at all. In VT Mode the MOSFET's channels are open and they "switch in" terminations to match the coax impedance. Physical Description In one embodiment, the board is a quad height Q-bus card designed as an option for the DS550 terminal server. The dimensions are 10.436 by 8.41 inches. The card interfaces to the Q-bus through the standard A, B, C, and D finger slots. It has a handle with eight punch outs for BNC connectors and one for an LED. The interface to the terminals and CCU's is provided by the eight BNC connectors. The card has two switch packs that define the address, vector, diagnostic mode, and firmware configuration mode the card is running in. There are also four jumpers that select which of the two configurations the card hardware is set-up to run in. The proper firmware must be loaded onto the board to run in the selected mode.

Configuration

The following is a description of the functions of the configuration switches. A switch in the "Open" position asserts the signal to the 1 state.

Referring to FIGS. 6B and 9B, in the ten position switch pack 352, switches 6-1 specify bits 8-3 respectively of the module's Q-bus interrupt vector, carried on lines 354.

Switches 7-10 specify the configuration of the invention, and the bits set by these switches are carried on lines 353.

Switch 7 specifies whether a CCU is present or not. This switch in the CLOSED position indicates that a CCU is not present, while OPEN indicates a CCU present. To run in the Terminal/CCU configuration this switch should be OPEN and to run in the Terminal Only configuration it should be CLOSED. The setting of this switch must correspond to the position of the jumpers. See the description of the jumpers below for their configuration.

Switch 8 specifies whether a loop back cable is present. The board may run external loopback diagnostics by attaching a loopback cable from the CC to the TC connections of a port, and setting this switch to OPEN.

Switch 9 specifies whether the diagnostic self test will execute once or loop forever. With this switch in the CLOSED position, the self test will execute only once. In the OPEN position the self test will loop forever.

Switch 10 specifies whether the self test will terminate on a failure or loop forever on the failed test. In the CLOSED position the self test will terminate, while in the OPEN position the self test will loop forever on the failed test.

Figure 9A:
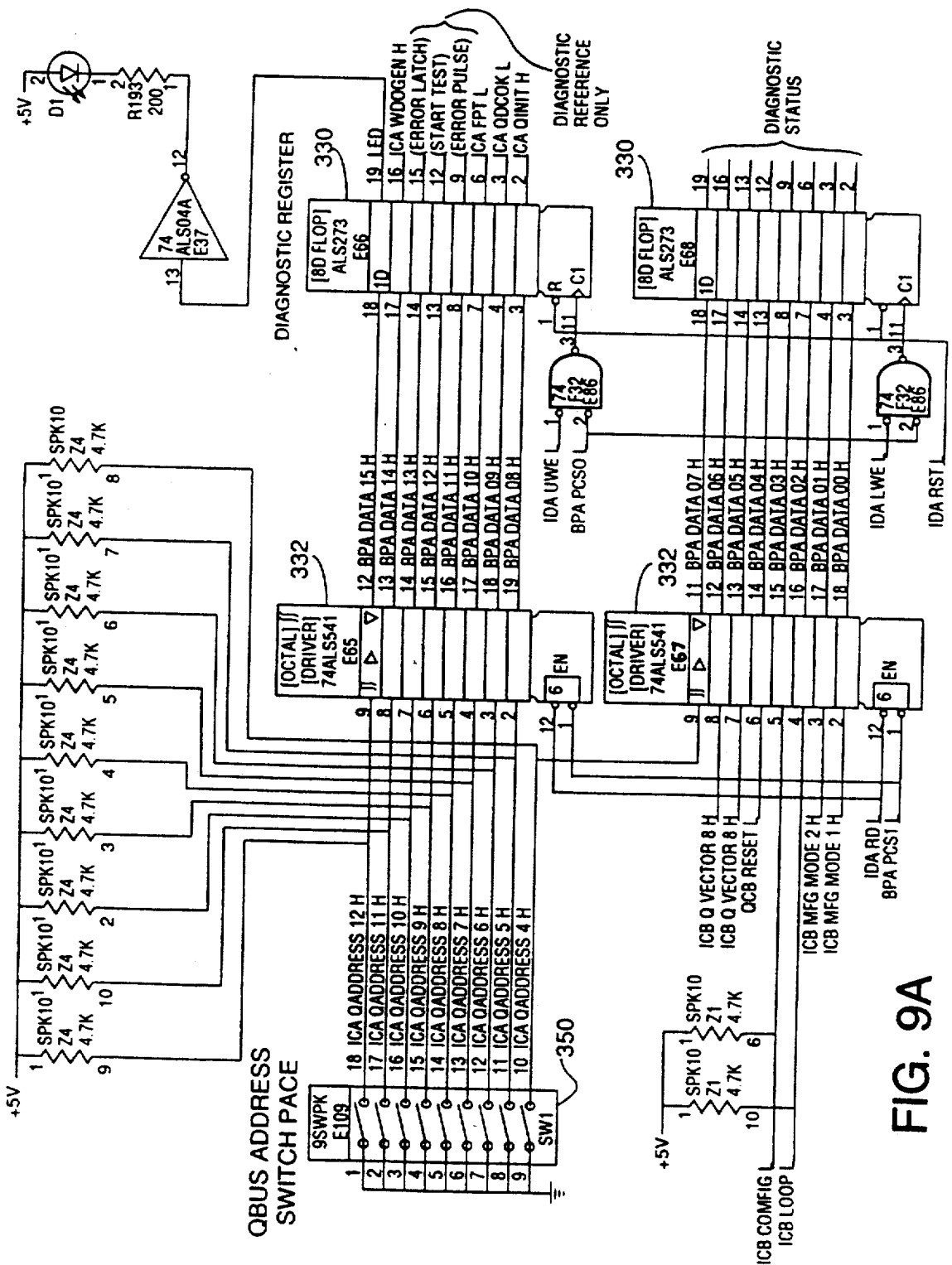
Figure 9C:
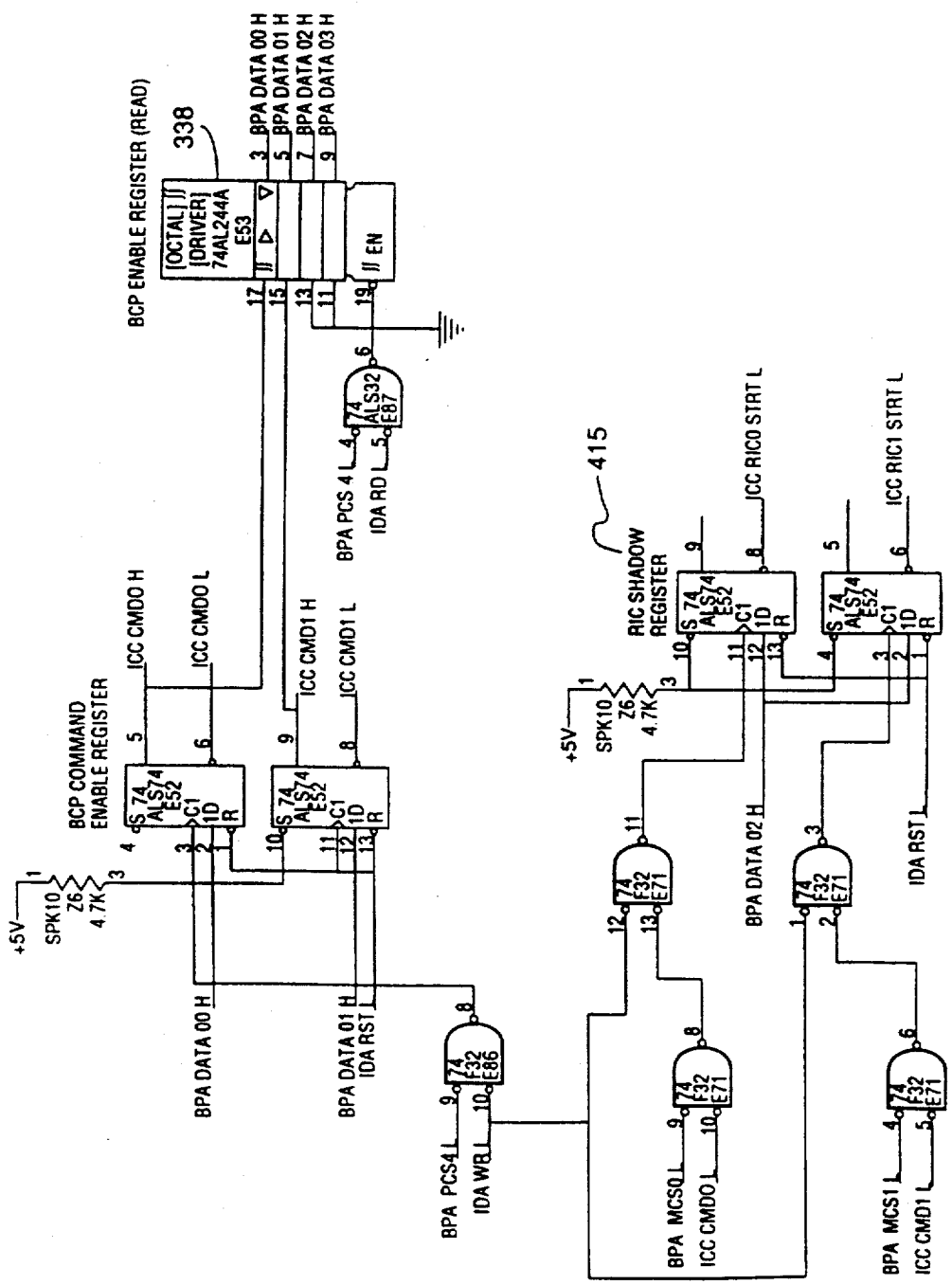
Figure 9D:
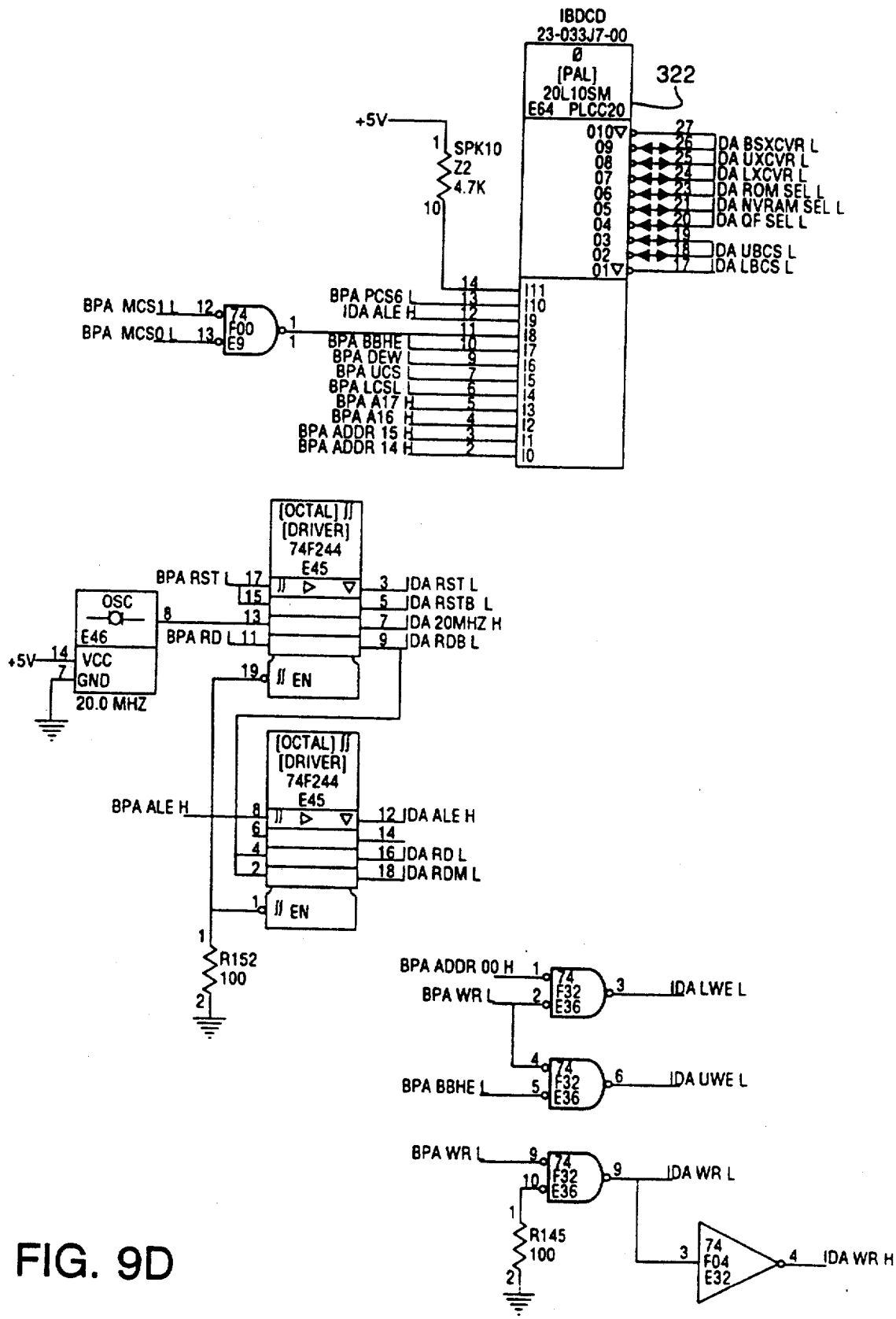
Figure 9E:
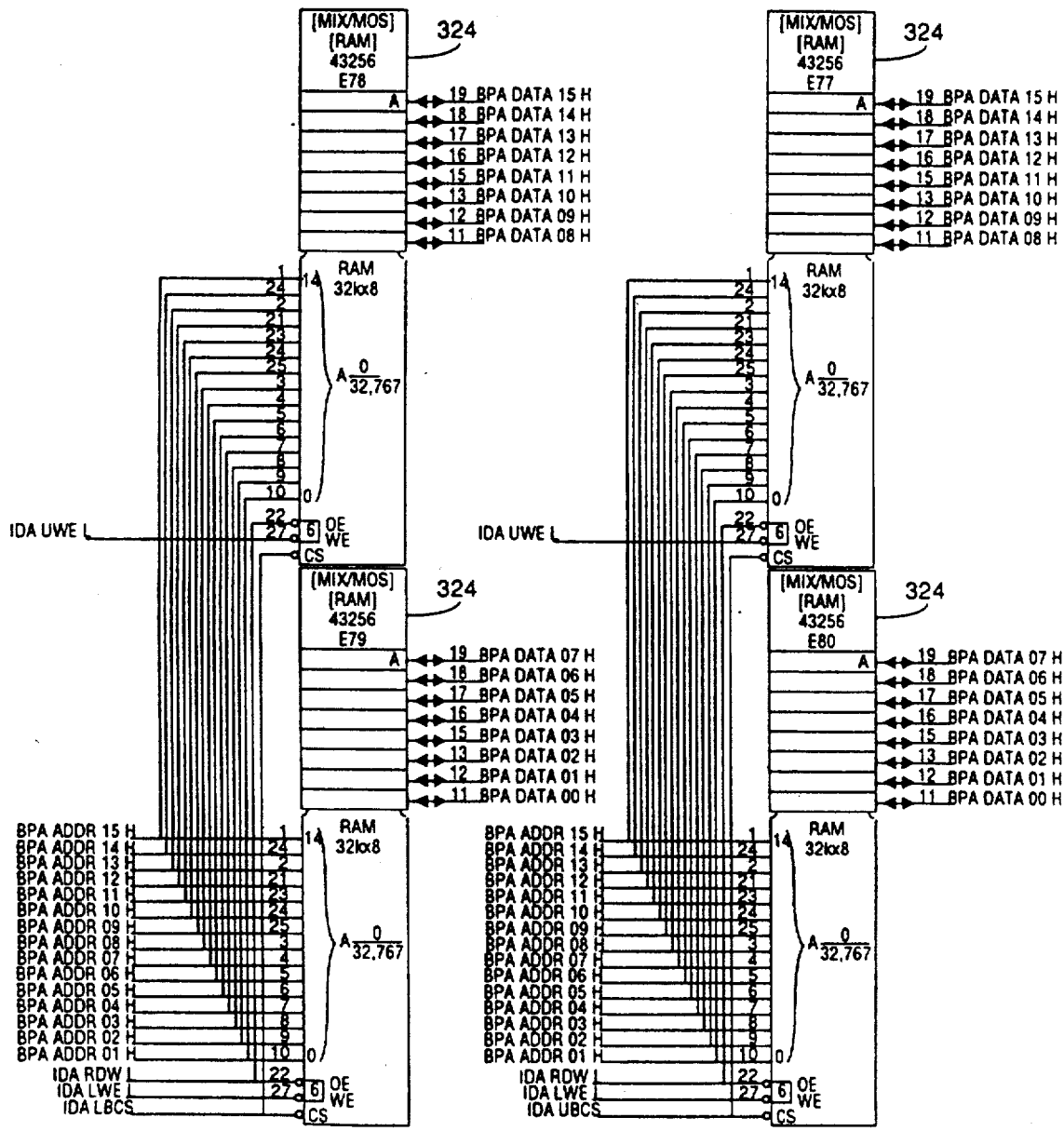
Figure 9F:
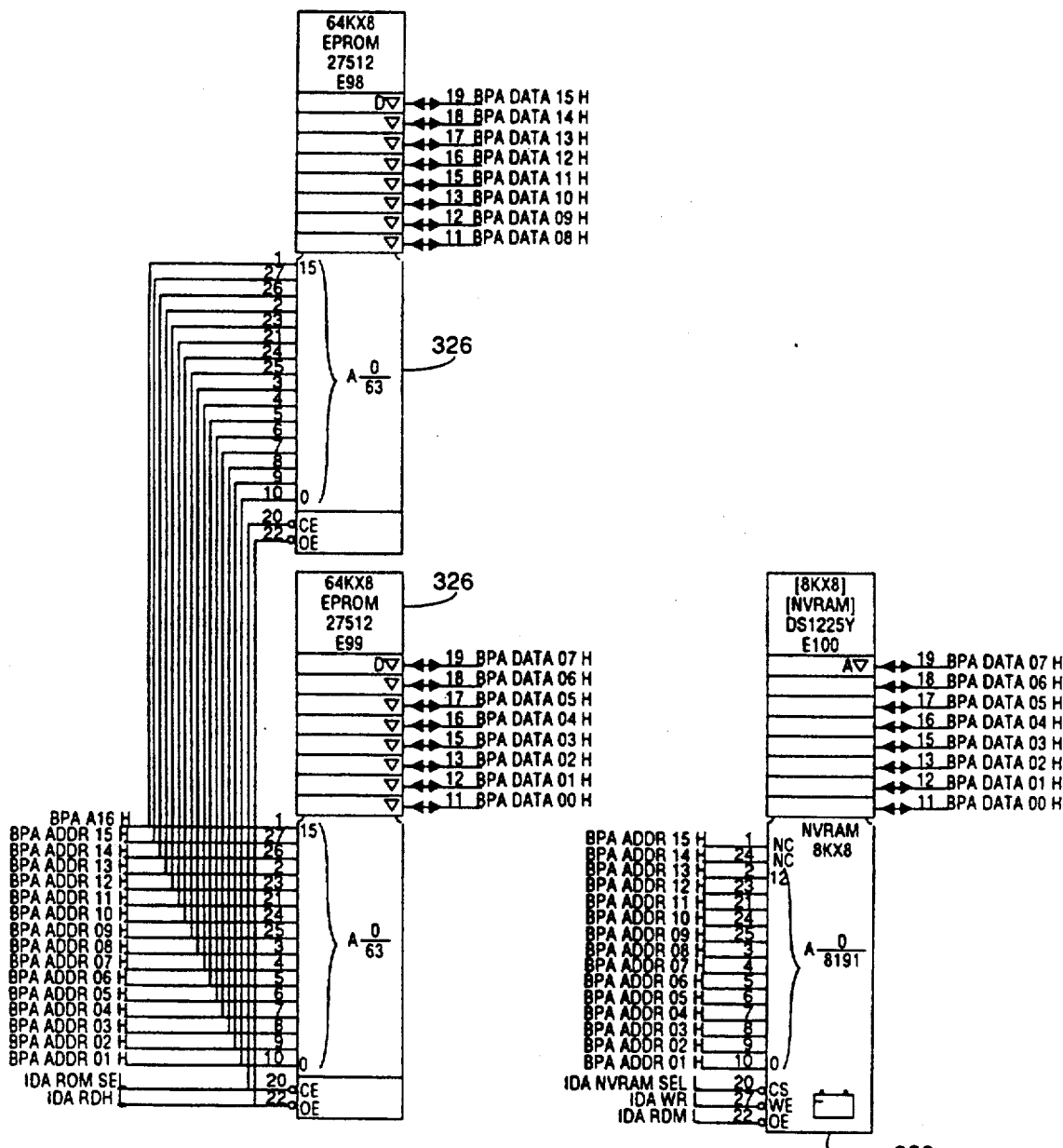

Referring to FIGS. 6B and 9A, in the nine position switch pack 350, switches 1-9 specify the bits 12-4 respectively of the Q-bus address of the invention.

In addition to the switch configuration, jumpers 401, 402, 403, 404 (FIGS. 11A, 11C, 11E, 11G) adjust the termination impedance of the coaxial connectors on the CC side of the four ports, depending upon whether the hardware is configured to run in Terminal/CCU or Terminal Only configuration. With the jumpers on pins 2 and 3 the hardware is in Terminal/CCU configuration. When the jumpers are on pins 1 and 2 the hardware is in Terminal only configuration. Note that all four jumpers should always be in the same position. Their position is related to setting of switch 7 of the 10 position switch pack described above. Cabling The card can be cabled two ways depending which configuration the card is in. Referring to FIGS. 11A through 11H, when cabled for an IBM/DEC configuration, connectors 410 through 413 are CCU ports and are connected to an IBM CCU, while connectors 406 through 409 are wired to 3270 terminals. This wiring can be either RG62 coax, twisted pair with BALUN'S, or a mixture of both. The maximum recommended cable lengths for the complete path from CCU, through the board and to the terminals are as follows: for coax-only wiring the maximum length is 5000 feet; for mixed coax and twisted pair, the maximum length is 1000 feet; and for twisted pair only the maximum length is 800 feet. If the shielded twisted pair specified by IBM is used then the mixed and twisted pair only lengths can be doubled.

DC/DC Converter

Figure 11I:
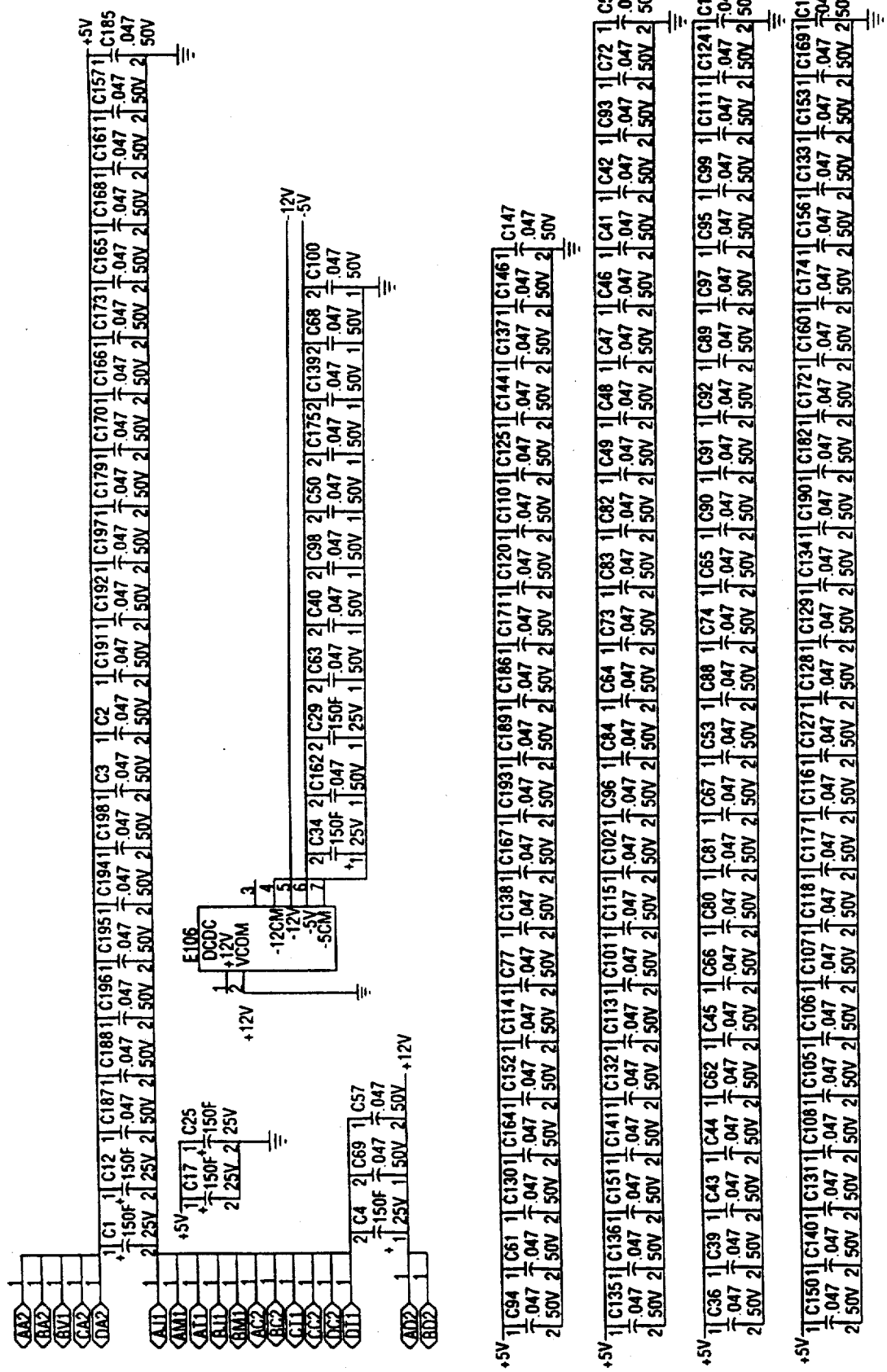
Figure 11J:
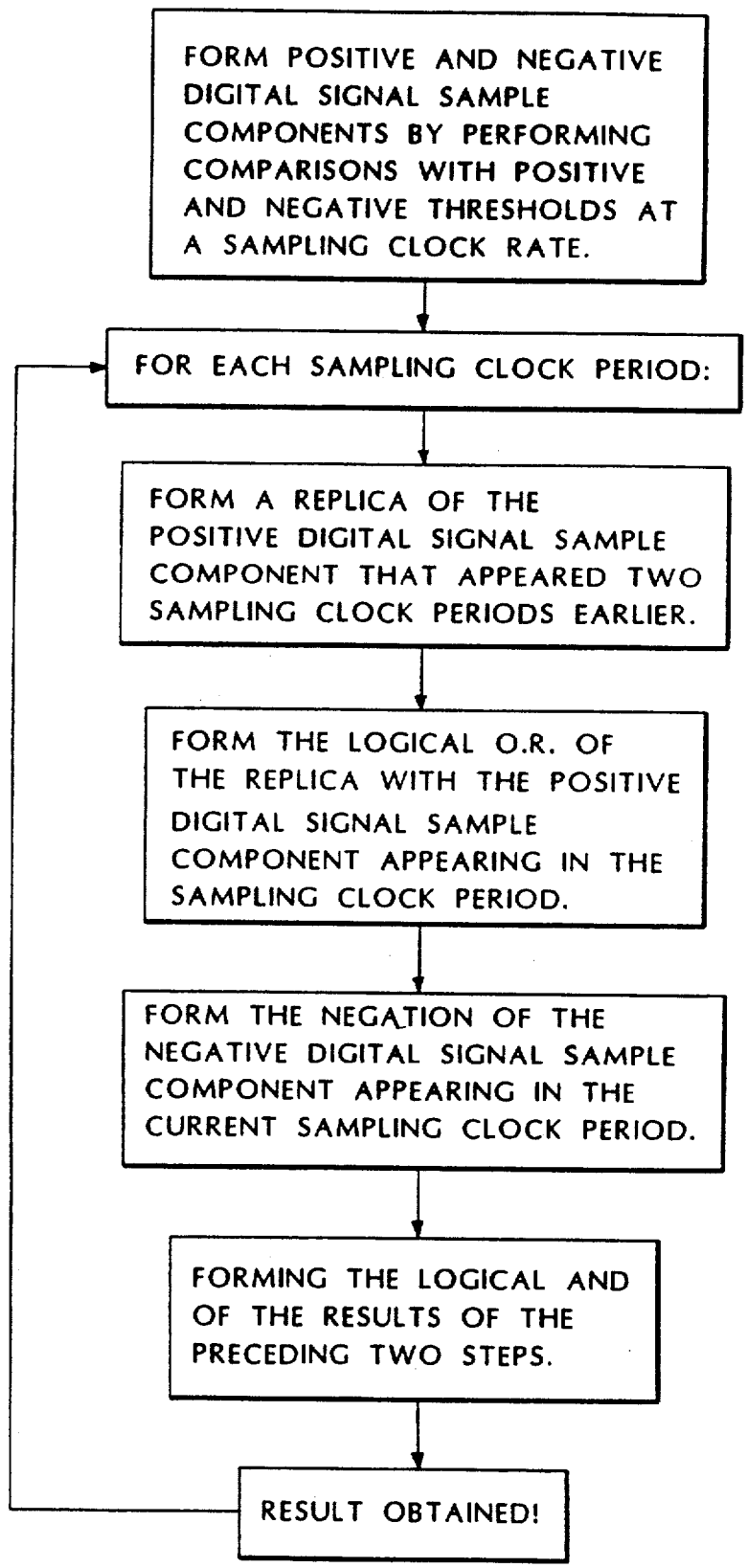
FIG. 11J is a flow chart of a method for removing crossover distortion from positive and negative digital signal sample components that are formed by comparing a coax signal to positive and negative thresholds.

Referring to FIG. 11I, the analog circuitry in the coax interfaces requires −12 Volt and −5 Volt supplies to receive the data and control the pass-through switches. The Q-bus only supplies +12 Volt and +5 Volt, so a DC/DC converter 405 is used to create the negative voltages.

Grounding Scheme

The 3270 Protocol requires a particular grounding scheme for each "device type". "Terminal type" devices (i.e. devices that act as slaves to the CCU) are required to float the coax shield connection. To meet this requirement the CC connectors connect a 0.1 pF capacitor from the shield to chassis ground (the card handle supplies this chassis ground connection). To keep the CCU shield connections from being shorted to this chassis ground, the BNC's for these ports are insulated from the handle. "CCU type" devices (i.e. devices that act as masters to the terminals) are required to chassis ground their shield connections. To accomplish this, the TC ports chassis ground the shield both mechanically at the handle and electrically on the board.

To allow for a terminal-only configuration, the board includes jumpers for chassis grounding the shields on the CC ports. The jumpers short across the capacitor to chassis ground. To enable the card to run properly in terminal-only configuration, all four of these jumpers must be in the proper position, as discussed above.

EOS/ESD Protection

The EOS/ESD protection for the board is provided by transzorbs on TC connectors and transzorbs and a varistor on CC connectors. On the TC connectors two opposing 16 volt transzorbs are connected in parallel, from the BNC center conductor to the shield. This provides protection for the transformers and internal circuitry, and since the shield is connected to chassis ground, protects the device from large voltages on the coax. Low capacitive (50 pF max) transzorbs are used to avoid degradation of the signal. The CCU Ports have the same set up across the BNC connection to protect the internal circuitry. There is also a 26 volt varistor from the shield to chassis ground connection to protect the module.

Detailed Software Description

The software code that operate the BPP, and the CC and TC BCP's is provided in Appendix B of previously filed copending application Ser. No. 07/650,457 of Thomas Reuther et al., filed Feb. 2, 1991. The BPP software is written in the assembler language of the 80186 available as Macro Assembler Version 4.0 from Microsoft Corporation, Redmond, Wash. The BCP software is writtn in an assembler language for the DP8344.

Figure 12A:
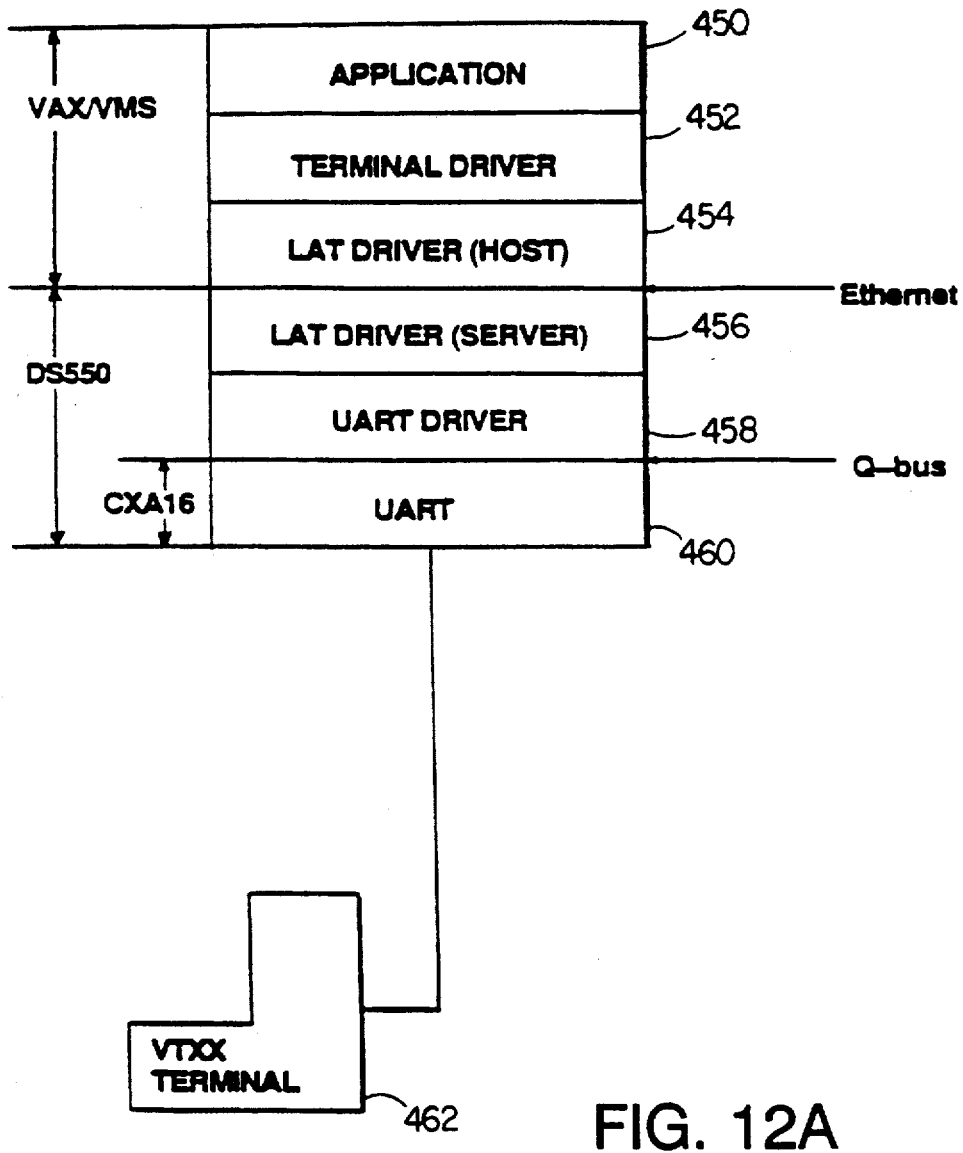
FIG. 12A is a conceptual illustration of the software "layers" that connect of a DEC VT terminal to a VMS application via a DS550 terminal server.

FIG. 12A is a diagram of the software "layers" involved in communications between a VT type terminal and an application running on a host computer. As can be seen, the top three layers reside in the operating system of the host computer, in this case, VMS on a VAX computer. The application 450 is the highest layer; it interacts through the VMS terminal driver 452 and the network local area transport (LAT) driver 454. The LAT driver 454 in the host interacts via an Ethernet channel with the LAT driver 456 in the terminal server, in this case, a DS550 TS. Also, within the TS, at lower levels, is the UART driver 458 for communicating with the UART 460 in the interface card (in this case, for a VT type terminal, the card is a CXA16). Finally, interacting with the UART on the card, is the internal software of the VT terminal 462.

Figure 12B:
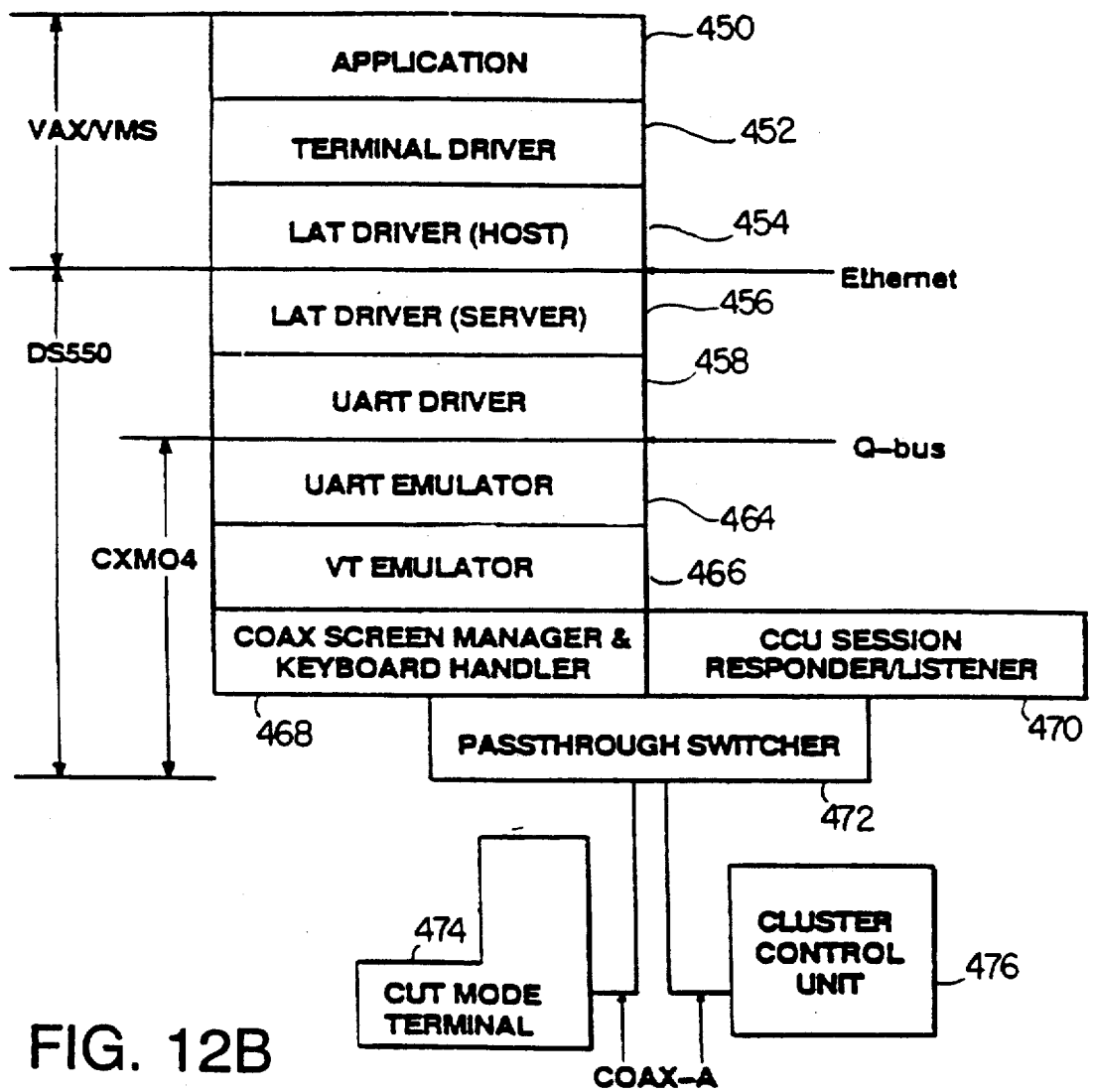
FIG. 12B is a related illustration of the additional software layers used in the invention to connect an IBM CUT mode terminal.

Referring to FIG. 12B, in the invention, additional layers must be added to accommodate the use of a 3270 terminal. As can be seen, the 3270 does not communicate through a UART. Therefore, a UART emulator 464, which emulates the CXA16 UART to the satisfaction of the UART driver in the DS550 TS, is added to the software. Although the UART emulator effectively configures the data transfer to the satisfaction of the DS550 UART driver, the information input to the UART emulator must be equivalent to VT type input. Therefore, the UTART emulator is backed up by a VT emulator 466 that converts the keystrokes or actions received from the 3270 terminal into the equivalent VT keystrokes or actions. In general, the functions performed in these two layers are well known.

To provide session support, however, the invention has additional software layers. At the first layer is the coax screen manager and keyboard handler 468, the functions of which are generally performed by the TC BCP. Also at this layer are the CCU session maintenance routines 470 performed by the responder/listener in the CC BCP. In addition, at a lower layer are the pass-through switcher routines 472 that allow the user at a 3270 474 to switch between communicating with the CCU 476 and the VAX/VMS application 450.

The following description focuses on the software that operates at these lower layers; namely, the BCP and BPP software that performs the screen management and switching.

BPP Data Structures

Figure 13:
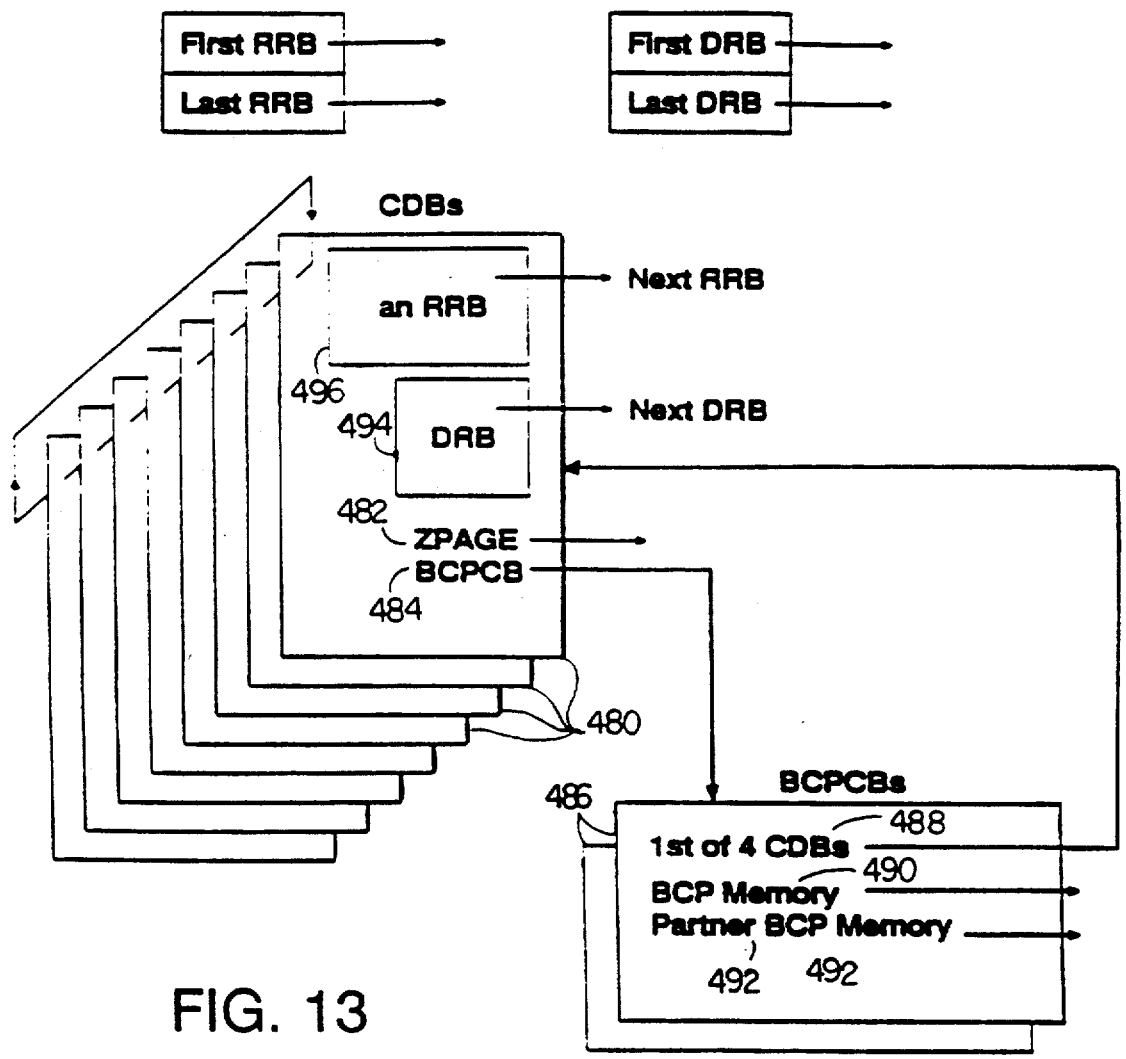
FIG. 13 is a diagram of the data structures used by the BPP to manipulate session state information.

Referring to FIG. 13, the data stored in the CC and TC BCP's is tracked and manipulated by the BPP using linked list structures (note that the BPP controls the IBUS and therefore must keep track of the storage in the two BCP's so that it may accurately perform data transfers on the IBUS).

On the card, each coax connector and its attendant hardware is known as a "channel" (there are eight channels); depending upon the software installed in the BCP that manages the channel, the information (screen images, keystrokes) associated with the data received at the channel may be stored in the BCP data memory. Where required, this information may then be moved through the IBUS and/or through the MIBUS by the BPP.

To facilitate these operations, the BPP registers the information for each channel in a channel data block, or CDB 480. The eight CDB's (one for each channel) are connected in a non-terminated (ring-type) linked list. Each CDB, in addition to a pointer to the next CDB in the linked list, includes other pointers and data structures. First, each CDB has a ZPAGE pointer 482, which points to the memory offset in the BCP memory (for the BCP that handles that channel) where pointers to the screen memory contents and other buffers (such as the EAB) for that channel may be found. In addition, the ZPAGE includes various counters and terminal identifiers necessary to identify and communicate with a particular 3270.

To indicate which BCP handles the CDB's channel, the CDB also includes a pointer 484 to a BCP control block (BCPCB) 486. In the present embodiment, there are two BCPCB's: one for each BCP. The BCPCB stores a pointer 490 to the location of the memory of the BCP it represents. In addition, for cross-referencing, each BCPCB contains a pointer to the first of the four CDB's 480 that represent channels handled by BCP of the BCPCB. Also, each BCPCB stores a pointer 492 to the memory location of the other "partner" 3CP.

As seen from the above cross-referenced structures, the CDB's and the BCPCB's may be used by the BPP software to quickly find the memory location for the screen contents on any channel.

The CDB's also serve another purpose, however, Each CDB stores a DMA Request Block (DRB) 494 and RBUF Request Blocks (RRB's) 496. Each DRB or RRB represents a request for use of a BPP resource which must be shared among all of the channels. When data must be sent to the Q-bus, an RRB is added to the RRB from the appropriate channel's CDB list. When data must be sent from the Q-bus using the DMA capability provided by the QIC, a DRB from the appropriate channl's CDB is added to the DRB list.

The BPP services the list of DRB's and RRB's in a FIFO fashion as the requested resource becomes available. The CDB's are serviced in a round-robin manner. As a result, the BPP resources are fairly distributed among the various channels.

Hot Key Routines

The BPP makes use of the CDB in performing screen memory and other data transfers that occur when the user hot-keys a port between IBM (i.e., pass-through on) and DEC modes (i.e., pass-through off). FIGS. 14 through 17 illustrate the sequences of events which occur under various conditions when the user hot keys.

FIG. 14 depicts the sequence of actions performed when the user hot keys to DEC mode from IBM mode, and the CC BCP's screen memory is valid (the CC BCP screen memory may become invalid—this possibility is discussed below). First 500, the CC BCP (which is listening) detects the hot key sequence. Next, the CC 3CP waits 510 until the terminal responds to a CCU poll. Immediately after the poll response, the CC BCP opens 512 the pass-through switch and signals 514 the BPP to wake up the TC BCP to communicate with the terminal. Finally 516, the CC BCP switches from listen mode to respond mode, so that the next poll from the CCU will be responded to by the card. Note that the time between the response from the terminal and the switching to respond mode should be as short as possible so that no polls are missed. Also, note that the CC BCP opens the pass-through switch just after the terminal responds to a poll to ensure that the terminal is not cut off in the middle of a response, and that the maximum amount of time is provided for the CC BCP responder to become functional.

Eventually 518, the BPP notices the command from the CC BCP to wake up the TC 3CP. In response, the BPP changes the "dispatch timer" for the appropriate channel in the TC BCP.

A dispatch timer is stored for each channel by the TC BCP. The timer is used to determine whether the TC BCP is awake on a certain channel, and how often the TC BCP services the channel once it is awake. The TC BCP sequentially services each of its four channels. Before performing any actions on a channel, the TC BCP checks the value of the dispatch timer. If the timer is not zero, then the TC BCP performs no action on the channel, and simply moves on to the next channel. If the dispatch timer is zero then the TC BCP will service that channel. What is done when a channel gets serviced depends on what was happening the last time the channel got serviced. Usually servicing consists of polling the terminal to see if there have been any keys pressed by the user, and checking to see if there is any data available to be sent to the screen. There is a timer interrupt service routing that runs every 5 milliseconds which will check the timers for each channel. If the dispatch timer for a channel is not zero, and also is not 81, then this routine will decrement it. Thus, if the dispatch timer for a channel is 81, that channel is asleep; if it is zero, that channel is ready to be serviced, and if it is between 81 and zero, then it will be ready to be serviced soon.

In addition to the dispatch timer, each TC BCP channel has a scroll timer. The purpose of the scroll timer is to slow the TC BCP down in the case where data arriving from the UART driver is causing the screen to "scroll" (i.e., new data is painted on the bottom line, and old data is being lost off of the top of the screen.) If the TC BCP were allowed to run unchecked in this case, the rate of scrolling might be so fast that a human could not read it. So the scroll timer is used. If the screen needs to be scrolled, no more data will be sent to it until the scroll timer for that channel has expired. Provision has been made so that the user may adjust the scroll timer on his/her terminal. The dispatch timer was not used for this function, so that keyboard input could still be processed even though the screen may be waiting to be scrolled.

With this background, when the BPP modifies the dispatch timer in the TC 3CP 518, it will clearly result in the TC BCP waking up on the channel. Subsequently 520 the TC BCP awakens, and seeing that it is in IBM mode on the selected channel (and wishes to be in VT mode), signals the VT emulator to clear the VT screen contents, and releases 522 control to the VT emulator.

As a result, after the hot key sequence, the user will begin his DEC session with a blank screen. However, unlike IBM applications, in DEC applications the screen may be rewritten, typically by pressing CONTROL-W or (at the VMS command line) by pressing a key such as ENTER. As there is no standard keystroke for screen refreshes from DEC applications, the user is left to select the appropriate screen refresh command. Usually, this does not present a problem because the user is not forced to reinitialize the DEC session.

FIG. 14 illustrates the hot key switch from IBM to DEC when the CC screen memory contents are valid. However, as mentioned above, while the card is operating in IBM mode there are conditions which may cause the screen memory to become invalid. The CC and TC BCP software isolates and deals with these conditions.

One way the CC screen memory may be invalid is if the card power is removed during an IBM session (note that the pass-through switch defaults to closed when power is removed and thus the card power may be removed without affecting an ongoing IBM session).

To account for this possibility, following power-up initialization, the card assumes that CC BCP's screen memory is invalid. (In fact, this assumption may be incorrect if the CC BCP has overhead an update of the entire screen by the time of the first transition to VT mode. However, in one embodiment of the invention, there is no way to determine whether or not this is the case, so the card always assumes that the CC BCP screen image memory is invalid on the first transition to VT mode following power up.

The CC screen memory may become invalid even if the card power is not removed because of "races" that may occur between the 3270 terminal and the CC listener. The "race" scenario is as follows: the 3270 is in IBM mode and thus is connected through the pass-through switch to the CCU. Because the 3270 is in IBM mode, the TC BCP is asleep and the CC BCP is in listen mode—updating its screen memory to be consistent with that in the terminal. The race begins when the CCU issues a screen-modifying command to the 3270. The 3270 then begins to update its screen, and, at the same time, the CC listener also begins to update its screen memory.

The 3270 may finish updating its version of the screen before the CC listener, because the CC hardware is simultaneously attempting to update the screens for three other channels, whereas the hardware in the 3270 is dedicated just to updating one screen. When the 3270 finishes, it will tell the CCU that it is ready for more commands. In response, the CCU may issue another screen-modifying command to the 3270. If the CC listener has not yet finished processing the first screen-modifying command, this second command creates a problem.

There are two ways the CC listener could deal with the new command. First, it could queue the new command, finish the old command, and then perform the new command. Second, it could attempt to perform the modifications of the new command in parallel with those of the old command. In either case, however, the screen may become invalid. In the first option, the queue may eventually overflow as a result of several screen-modifying commands issued by the CCU in rapid succession. In the second option, if the result of the second screen modification depends upon the results of the first screen modification (for example, where the second modification modifies the screen to reverse-video in a particular area), the second modification will not be properly executed. Thus, in either case, some screen modifications may be lost, resulting in an invalid version of the screen in CC memory.

To indicate invalid memory, the card sets a flag that is checked when the user hot keys to DEC. If the flag is set when the user hot keys, the card attempts to refresh the CC screen memory by reading the screen contents from the 3270 (via the TC BCP) and writing it to the CC BCP memory before connecting the 3270 to DEC.

When the card powers up or CC encounters a "lost race", that is, when it receives a screen-modifying command while it is already processing another screen modifying command, the card sets the flag to indicate that the CC screen memory is no longer valid. In response, the card reads the screen contents from the 3270 when the user hot keys the card to DEC mode.

Referring to FIGS. 15A and 15B, when the user hot keys to DEC and the CC screen memory needs to be refreshed, as in FIG. 14, the hot key is detected 530 by the CC listener, which then waits 532 until the terminal has finished responding to a poll, and opens 534 the pass-through switch.

At this point, the card must signal the TC BCP to read the screen contents from the terminal, and then transfer these screen contents to the CC BCP memory. However, while this is being done, the CCU may issue a screen modification command. This command (which is received only by the CC side because the pass-through switch is open) may be received before the CC BCP memory obtains a valid version of the terminal screen. In this case, some of the resulting changes to the CC 3CP memory may later be erased when the screen (fetched by the TC BCP) from the terminal is written to the CC memory. As a result, the CC BCP memory will be invalid. Therefore, there is another race condition that must be detected and dealt with.

To indicate the beginning of this race, the CC BCP clears 536 the CUNEWS byte in memory. The CUNEWS byte is an eight bit word, each bit of which indicates one of the possible screen-modifying commands that may be received from the CCU. Whenever a screen-modifying command is received by the CC BCP, the corresponding bit in CUNEWS is set; however, CUNEWS is never cleared other than at the beginning of races. Therefore, at the end of a race, CUNEWS will only remain cleared if no screen-modifying commands were received by the CC BCP during the race.

Next 538, the CC BCP requests the BPP to use the TC 3CP to refresh the screen memory from the 3270 terminal. Subsequently, the BPP orders 540 the TC BCP to refresh its screen memory by setting a flag. Next, the CC BCP requests 542 the BPP to awaken the TC BCP, and puts 544 the CC listener to sleep and awakens the CC responder. After step 542, the BPP wakes up the TC BCP by modifying 546 its dispatch delay timer.

The TC BCP first responds to the request to refresh memory from the terminal. To this end, it (polls the terminal and then) reads 548 the cursor address counter, and tells 550 the BPP to transfer the counter to the CC memory. Later, the BPP transfers 552 the counter. Next, the TC BCP (polls the terminal and then) reads 554 the contents of the terminal screen into the TC memory, and tells 556 the BPP to transfer the screen contents to the CC memory. Later, the BPP transfers 558 the screen contents. Next, if the terminal has an extended attributes buffer (EAB), the TC BCP (polls the terminal and then) reads 560 the EAB in the TC memory, and tells 562 the BPP to transfer the EAB contents to the CC memory. Later, the BPP transfers 564 the EAB to the CC memory.

After the EAB is transferred to the CC memory, the entire terminal state has been transferred to the CC memory, and thus the race condition is over. The TC 3CP then checks whether any screen-modifying commands have been received by the CC responder during the transfer of screen data to the CC memory. This is done by requesting 566 the BPP to copy the CUNEWS byte from the CC BCP's ZPAGE to the TC BCP's ZPAGE. Later, the BPP responds 568 by moving this byte. Next, the TC BCP awakens 570 the VT emulator and commands it to clear the terminal screen contents (as discussed above), and then checks 572 CUNEWS. If any of the bits in CUNEWS have been set, the CC BCP received a screen-modifying command before it had a valid version of the screen, and therefore, the screen in the CC BCP memory may be invalid. If CUNEWS has been modified, there is no valid version of the screen available anywhere because the version in the terminal is outdated and the version in CC memory is invalidated; therefore, the CC BCP warns the user by signalling the VT emulator to begin with a control screen that states 3270 Mode screen image memory is obsolete, POR may be needed (POR stands for power-on reset, which is invoked in IBM mode to terminate an IBM session and re-initialize the 3270.) This screen tells the user that, when he/she returns to IBM mode, the screen contents may be invalid and a POR should be performed to re-validate the screen contents. Whether or not CUNEWS has been modified, the TC BCP switches 574 to VT emulation mode.

Referring to FIGS. 16A through 16C, once in DEC mode, if the contents of the CC screen memory are valid and the user hot keys back to IBM mode, the CC screen memory is written to the TC memory and then to the terminal. Once the terminal screen corresponds to the CC memory, the pass-through switch may be closed, reconnecting the terminal to the CCU. Although this process appears to be straightforward, as illustrated below and in the FIGS. there are some complexities, The process is initiated 580 when the TC BCP (as part of its VT terminal emulation) detects the hot key sequence. As the CC memory contents are valid at this point, the first task is to transfer the CC screen memory to the terminal. However, while the CC memory is being written to the terminal, a screen-modifying command may be received by the CC responder. In this case, the CC responder would modify its screen memory; the result of this modification is that the version of the screen that was transferred to the terminal becomes obsolete. In this way, there is another race condition (a race to transfer the CC memory to the terminal before the CCU modifies the CC memory) which must be dealt with.

To mark the beginning of the race, the TC BCP requests 582 the BPP to clear CUNEWS in the CC memory. In response, the BPP clears 584 CUNEWS, Next, the TC BCP requests 586 the BPP to transfer the cursor address (and other screen parameters) from the CC memory into the TC memory. In response, the BPP transfers 588 the parameters. Next, the TC BCP requests 590 the BPP to transfer the screen contents from the CC memory to the TC memory. In response, the BPP transfers 592 the screen contents. Finally, if the terminal has an EAB, the TC BCP requests 594 the BPP to transfer the EAB from the CC memory to the TC memory. In response, the BPP transfers 596 the EAB.

At this point, the TC memory contains the full representation of the screen from the CC memory, Next, the TC BCP issues 598 a command to the terminal to refresh its screen with the stored information. After the terminal refresh is finished, in the absence of an error condition, the TC BCP will not issue any further polls to the terminal. To keep track of the time elapsed before the CCU begins polling the terminal, the TC BCP requests 600 the BPP to reset a CCU inactivity timer for later reference. In response, the BPP resets 602 the timer.

The CCU inactivity timer works as a safeguard against the possibility that the CCU may be down (or disconnected from the card); without the timer, if the CCU was down, it would not poll the terminal, and thus the user could not perform any actions or even enter the hot-key sequence to switch back to DEC mode. While in IBM mode, the CC BCP resets the inactivity timer every time the CCU polls the terminal. If the timer reaches a given value, the CC BCP assumes that the CCU is down (or disconnected), and switches the card back to DEC mode (in a manner similar to FIG. 14) and displays a control screen that informs the user that the CCU is down or disconnected.

Next, the TC BCP prepares to put itself to sleep by setting 604 its dispatch timer to 81, and requesting 606 the BPP to switch the CC BCP to IBM (listening) mode. In response, the BPP modifies 608 a control byte in the CC BCP. When the CC BCP reads 610 the modified control byte, it immediately signals the responder to close the pass-through switch.

The CC responder cannot close the pass-through switch at an arbitrary time, for two reasons. First, the terminal cannot respond to CCU polls unless it is exposed to the entire coax frame of the poll. To ensure that the terminal sees the entire poll frame, the pass-through switch must be thrown just after the CC responder responds to a poll from the CCU. However, if the CC responder is in the midst of a transaction with the CCU (for example, if the CCU is modifying the screen or obtaining information from the responder), even if the terminal sees the entire poll it may not always be possible for the terminal to properly respond. This is particularly true where the CCU is in the midst of modifying the screen—under this condition, there is zero probability that the terminal has a correct version of the screen or will be able to respond correctly.

For these two reasons, the CC responder waits until it responds 612 to a CCU poll with a TTAR response (a Transmission Turnaround Auto Response, essentially a no-comment response that performs no modifications and provides no information). The fact that the response was a TTAR indicates that no activity is occurring between the CCU and the CC responder, indicating that it is a good time to switch in the terminal. Immediately after a TTAR response is made, the CC responder closes 612 the pass-through switch and switches 614 to the CC listener.

Once the switch is closed, the race discussed above has ended. After the CC responder goes to sleep, it must determine if it "won" the race, i.e., it must check to see if the screen was modified by the CCU while the screen memory was being transferred to the TC memory and the terminal. This is done by checking 616 CUNEWS.

If CUNEWS is still cleared 618, then no modifications occurred during the transfer and the terminal has a valid copy of the screen memory. In this case, the CC responder is put to sleep, and the CC listener is awakened.

If, on the other hand, CUNEWS is not still cleared 620, then the screen was modified during the transfer and the terminal may have an obsolete version of the screen. In this case, the CC BCP waits for a response to a poll and opens the pass-through switch, then requests the BPP to restart the TC BCP at step 582 (the beginning of the race, where the TC memory is first updated with the contents of the CC memory). A counter keeps track of how many re-tries of this type are made. If three retries fail, the CC BCP gives up 622, and returns to DEC mode with control screen displaying the message:

3270 Mode screen image is obsolete, POR may be needed

In response, the user may enter IBM mode and perform a POR to re-initialize the session.

The pass-through switch is closed before CUNEWS is checked to avoid a subtle race condition. The routine that closes the switch is asynchronous with the routine that checks CUNEWS. If CUNEWS were checked first, a change to CC memory occurring after the check and before closing the switch would not be registered in the terminal, and would cause an error. By closing the switch first and then checking CUNEWS, CUNEWS is guaranteed to reflect all changes to CC memory before the switch closed (as well as some after the switch closed). Although a change to CC memory after the switch closes may cause the card to re-write the terminal memory when it is not necessary to do so, this will not result in an invalid IBM screen, which would be the result if CUNEWS was checked first.

Referring to FIG. 17, in any one of the above-described error conditions, the CC memory contents may become invalid so that the user must do a POR to re-initialize the IBM session.

When a POR is required, the user can only enter IBM mode from a control screen that says "3270 Mode send POR". When an exit from this screen is detected 630, the TC BCP issues 632 a command to the BPP to inform the CC responder to expect a POR from the terminal. In response, the BPP modifies 634 a control byte in the CC BCP.

Next, the TC BCP clears 636 the terminal screen and writes 638 "Please wait" to the screen. To cause the terminal to response (to the next poll) with a POR, the TC BCP sends 640 a reset command.

This is the last time that the TC will interact with the terminal.

In order for the CC BCP to keep track of whether or not the CCU is polling the terminal, the TC BCP request 642 that the BPP reset the CCU inactivity timer in CC BCP memory. In response, the BPP resets 644 the CCU inactivity timer. (If this timer should expire, without the CC BCP having seen any polls from the CCU (and thus leaving the user's terminal dead), then the CC BCP will open the switch and notify TC to take control of the terminal.)

At this point, the pass-through switch is closed and the terminal will receive the next poll from the CCU. Since the terminal was previously 640 sent a reset command, it will respond to that poll with a POR. And the CCU will respond to the POR by (re)initializing the IBM session. As the CCU re-writes the terminal screen, the CC listener will update the CC memory.

Copyright Notice

A portion of this disclosure is subject to copyright protection (for example, the Figures. The copyright owner has no objection to the reproduction of the patent document as it appears in the United States Patent and Trademark Office, but otherwise reserves all copyright rights whatsoever.

Other Embodiments

Other embodiments are within the claims that follow the glossary.

Appendix A: Glossary Following is an alphabetical glossary of acronyms and technical terms.

3270

3270 is an encompassing term referring to a family of IBM terminals, printers, and Cluster Control Units. It is also the term used to describe the protocol used to interface this equipment.

3270 Mode

3270 Mode (or IBM mode) describes the state when a port pair is passing data from the terminal through to the CCU (also known as pass-through mode). In 3270 mode the pass-through switch for that port pair is closed and the terminal is electrically connected to the CCU.

BCP

DP8344 Bi-phase Communications Processor made by National Semiconductor Corporation of Santa Clara, Calif. The BCP is a RISC processor containing an integral Coax-A interface.

BPP

"Backport Processor"—The processor on the interface card which controls the interaction of the BCP's and the DS550 terminal server's Q-bus. The BPP is an 80186 processor, available from Intel, Santa Clara, Calif.

Buffer Code

The data sent from the CCU to a 3270 CUT mode terminal which causes a character to be shown on the 3270 screen is called a buffer code. Each displayable character has a unique buffer code.

CC

"CCU Coax"—the coaxial cable connected to the CCU. CC is also the name of an operational firmware image that may run in the CC BCP.

CC BCP

Refers to the BCP which controls the pass-through switch. When the invention is used to provide session support, the CC BCP runs CC BCP code, and the cable attached to the CC BCP connects to a CCU. When session support is not provided, the CC BCP runs TC BCP code, and the cable attached to the CC BCP may be connected to a 3270 type CUT mode display station.

CCU

"Cluster Control Unit"—The CCU is an IBM device that provides the interface between an IBM mainframe and user peripheral devices (such as terminals, printers). The CCU connects to the host through either an SNA/SDLC or BSC link. A CCU may support between 8 and 32 devices connected in a star topology.

Coax-A

The name of the protocol used to transfer information via the coaxial cables between a CCU and the attached CUT mode display stations.

CSR

"Control Status Register"—A register used to get status from or provide control to the card or one of its subsystems.

CUT

"Control Unit Terminal"—A class of 3270 type terminals. The CCU must handle each keystroke and each character displayed. CUT mode terminals are the only ones supported by the present embodiment of the invention.

DHU

DHU is a term that comes from a DEC UNIBUS line card called the DHU-11. The software interface for the DHU-11 line card has tended to become of a defacto standard for line cards. Here it refers to that standard interface and register set. The DHU-11 interface is described in DHU11 Interface Technical Manual, 2nd Edition, November, 1986, Document Number EK-DHU11-TM-002, published by Digital Equipment Corporation and incorporated herein by reference.

DIBUS

"Demultiplexed Internal BUS"—The demultiplexed version of the 80186's address/data bus.

DFT

"Distributed Function Terminal"—A class of 3270 type terminals. DFT type terminals contain a processing capability which relieves the CCU of the burden of handling each individual keystroke and displayed character. DFT type displays are not supported by the present embodiment of the invention.

FEP

"Front End Processor"—IBM's communication processor.

Hot-Key

A keystroke or sequence of keystrokes which causes a change in state. When the invention's software recognizes a Hot-Key sequence the terminal is changed from VT Mode to 3270 Mode or vice versa.

I-Bus

The I-Bus is the common bus between the two BCP's and the BPP. The BPP controls the transfer of data over the I-Bus.

IL

"IBM Line"—IL is a general term that is used interchangeably with "CC" to describe the portion of the Coax Interface Subsystem that can interface to a CCU.

LAT

"Local Area Transport"—LAT is a protocol designed to allow asynchronous terminal traffic to make efficient use of a Local Area Network.

MIBUS

"Multiplexed Internal BUS"—The multiplexed version of the 80186's address/data bus. The actual bus that comes out of the 80186.

Pass-Through

Refers to the mode when a CCU Port and a Terminal Port are electrically connected. In this state a 3270 terminal can access IBM applications.

Q-bus

The hardware bus (designed at DEC) used by the invention to interface to the DS550 terminal server. Using the Q-bus, the registers of a general purpose processor on hardware expansion cards (such as the invention) may be accessed in the same manner as memory locations.

Q-bus Processor

The processor on the Q-bus which is manipulating the registers of a Q-bus option. In the DS550 terminal server the Q-bus processor is a PDP11.

RG62

RG62 is the cable specified by IBM as the interconnect for 3270 devices. It is 93 ohm coax cable.

RIC

"Remote Interface Control"—The RIC is a register in the BCP which will cause the BCP to start/stop, or single-step. It also determines the destination of an access by the 80186 to the memory space occupied by that BCP; the destination may be the address counter of the BCP, the instruction memory, or the data memory.

RISC

"Reduced Instruction Set Computing"—A method of performing programmed calculations implemented using a "reduced" instruction set. Elaborate instructions and addressing modes are omitted. Because the remaining set of instructions is simpler, each instruction can execute faster. Programs which do not need the omitted instructions or addressing modes thus perform better.

Scan Code

The data returned by a 3270 CUT mode display station in response to a poll command from the CCU which indicates that a key on the keyboard has been pressed is called a scan code. Each key sends a unique scan code. Some keys send a scan code to indicate that the key has been pressed, and another scan code or pair of scan codes to indicate that the key has been released.

TC

"Terminal Coax"—the coaxial cable connected between the invention and a 3270 CUT mode display station. TC is also the name of the operational firmware image which runs in the TC BCP. If there is no session support, the TC code will also run in the CC BCP.

TC BCP

Refers to the BCP which is connected to the coaxial cable between the invention and a 3270 CUT mode display station.

Token

The scan code to ASCII translation process is made easier to implement with the introduction of the abstraction known as a "token". There is a token for each unit of VT Mode functionality that is associated with a keystroke.

UART

"Universal Asynchronous Receiver Transmitter'—A UART is a hardware device that makes the transformation between the serial data, such as on an asynchronous transmission line, and parallel data, such as inside of a computer system.

VL

"VT220 Line"—This term is synonymous with TC and describes the portion of the Coax Interface Subsystem that interfaces to a Terminal.

VT Mode

VT Mode (or DEC Mode) describes the state of a port pair when the terminal is connected to the DS550 terminal server and the IBM session is being supported by the CC code. While in VT Mode, the Pass-Through Switch is open.

We claim:

1. A method utilizing digital circuitry for removing crossover distortion to derive a processed digital signal from positive and negative digital signal sample components that were formed by positive and negative threshold comparisons, said crossover distortion manifested by periods during which both said negative and said positive digital signal sample components have a logic zero value, comprising
   A. forming a replica of said positive digital signal sample component which is delayed by a predetermined time period,
   B. forming a first intermediate signal represented a logical OR of said replica with said positive digital signal sample component,
   C. forming a second intermediate signal representing a negation of said negative digital signal sample component, and
   D. forming a logical AND of said first and second intermediate signals, to form said processed digital signal.

2. Apparatus for removing crossover distortion to derive a processed digital signal from positive and negative digital signal sample components that were formed by positive and negative threshold comparisons, said crossover distortion manifested by periods during which both said negative and said positive digital signal sample components have a logic zero value, comprising;
   A. digital circuit means for forming a replica of said positive digital signal sample component which is delayed by a predetermined time period,
   B. digital circuit means for forming a first intermediate signal representing a logical OR of said replica with said positive digital signal sample component,
   C. digital circuit means for forming a second intermediate signal representing a negative of said negative digital signal sample component, and
   D. digital circuit means for forming a logial AND of said first and second intermediate signals, to form said processed digital signal.

* * * * *

UNITED STATES PATENT AND TRADEMARK OFFICE
CERTIFICATE OF CORRECTION

PATENT NO. : 5,287,534

DATED : February 15, 1994

INVENTOR(S) : Thomas Reuther

It is certified that error appears in the above-identified patent and that said Letters Patent is hereby corrected as shown below:

Title Page:

Under [75] Inventors: The names "Neil Bloomberg", "William J. Gist, Jr.". and "Albra M. Welch" should be deleted.

Column 7, line 38, "A" should be deleted.

Column 7, line 44, "215" should be --214--.

Column 12, line 5, "discriminates" should be --discriminator--.

Column 14, line 4, delete "and the Q bus" and insert --to-- after "attempting--.

Column 15, line 12, "Inport" should be --I-port--.

Column 15, line 18, "Inport" should be --I-port--.

Column 19, line 3, "CCLA" should be --CC1A--.

Column 19, line 20, "YVRAM" should be --NVRAM--.

Column 24, line 8, "Mux" should be -MUX--.

Column 25, line 19, "CO)MA" should be --COXDA--.

UNITED STATES PATENT AND TRADEMARK OFFICE
CERTIFICATE OF CORRECTION

PATENT NO.  : 5,287,534

DATED       : February 15, 1984

INVENTOR(S) : Thomas Reuther

It is certified that error appears in the above-identified patent and that said Letters Patent is hereby corrected as shown below:

Column 25, line 46, "mvolt" should be --mVolt--.

Column 25, line 48, "mvolt" should be --mVolt--.

Column 26, line 2, "mvolt" should be --mVolt--.

Column 26, line 13, "pert" should be --port--.

Column 26, line 40, "CCL" should be --CC1--.

Column 26, line 46, "CCL" should be --CC1--.

Column 26, line 50, "CCL" should be --CC1--.

Column 26, line 54, "CCL" should be --CC1--.

Column 26, line 58, "CCL" should be --CC1--.

Column 28, line 39, "CCL" should be --CC1--.

Column 28, line 51, "CCL" should be --CC1-- (in both places).

Column 28, line 53, "CCL" should be --CC1--.

Column 28, line 54, "CCL" should be --CC1--.

Column 31, line 65, "writtn" should be --written--.

Column 33, line 16, "3CP." should be --BCP.--.

Column 33, line 66, "3CP" should be --BCP--.

UNITED STATES PATENT AND TRADEMARK OFFICE
CERTIFICATE OF CORRECTION

PATENT NO.   : 5,287,534
DATED        : February 15, 1994
INVENTOR(S)  : Thomas Reuther It is certified that error appears in the above-identified patent and that said Letters Patent is hereby corrected as shown below:

Column 34, line 42, "3CP" should be --BCP--.

Column 36, line 30, "3CP" should read --BCP--.

Column 36, line 56, "3CP" should read --BCP--.

Column 39, line 35, "3CP" should read --BCP--.

Column 39, line 53, insert ")" after --Figures--.

Column 39, line 63, start new paragraph at "Following".

Signed and Sealed this

Twenty-third Day of August, 1994

Attest:

BRUCE LEHMAN

Attesting Officer

Commissioner of Patents and Trademarks